United States Patent
Sasaki et al.

(10) Patent No.: US 6,667,849 B2
(45) Date of Patent: Dec. 23, 2003

(54) THIN FILM MAGNETIC HEAD AND THE MANUFACTURING METHOD

(75) Inventors: Yoshitaka Sasaki, Tokyo (JP); Nobuya Oyama, Tokyo (JP)

(73) Assignee: TDK Corporation, Tokyo (JP)

( * ) Notice: Subject to any disclaimer, the term of this patent is extended or adjusted under 35 U.S.C. 154(b) by 309 days.

(21) Appl. No.: 09/888,543

(22) Filed: Jun. 26, 2001

(65) Prior Publication Data

US 2002/0024766 A1 Feb. 28, 2002

(30) Foreign Application Priority Data

Jun. 29, 2000 (JP) ........................................ 2000-197054

(51) Int. Cl.[7] .............................................. G11B 5/147
(52) U.S. Cl. ........................................................ 360/126
(58) Field of Search ................................. 360/126, 125, 360/121, 119, 122, 324.11; 29/603.14, 603.15

(56) References Cited

U.S. PATENT DOCUMENTS 5,438,747 A    8/1995   Krounbi et al.
5,995,343 A  * 11/1999  Imamura ..................... 360/126
6,088,197 A  *  7/2000  Tsuda ......................... 360/126
6,118,624 A  *  9/2000  Fukuzawa et al.
6,249,406 B1 *  6/2001  Gill et al. .............. 360/324.11
6,305,072 B1 * 10/2001  Yoda et al. .............. 29/603.14

FOREIGN PATENT DOCUMENTS

JP         A 7-262519        10/1995

* cited by examiner

*Primary Examiner*—Allen Cao
(74) *Attorney, Agent, or Firm*—Oliff & Berridge PLC

(57) ABSTRACT

A thin film magnetic head that suppresses "leakage of magnetic flux" and has an excellent overwrite characteristic and a method of manufacturing the same are provided. Between a top pole tip and a bottom pole, first and second non-magnetic layer patterns are disposed in order from the bottom pole. The position of a front end of the second non-magnetic layer pattern recedes rearward of the position of a front end of the first non-magnetic layer pattern, and thereby a step is formed between the first non-magnetic layer pattern and the second non-magnetic layer pattern. Due to the existence of the first and second non-magnetic layer patterns, the propagation of the magnetic flux between the top pole tip and the bottom pole is suppressed, and the flow of the magnetic flux in the top pole tip is smoothed so that the excellent overwrite characteristic can be assured.

29 Claims, 30 Drawing Sheets

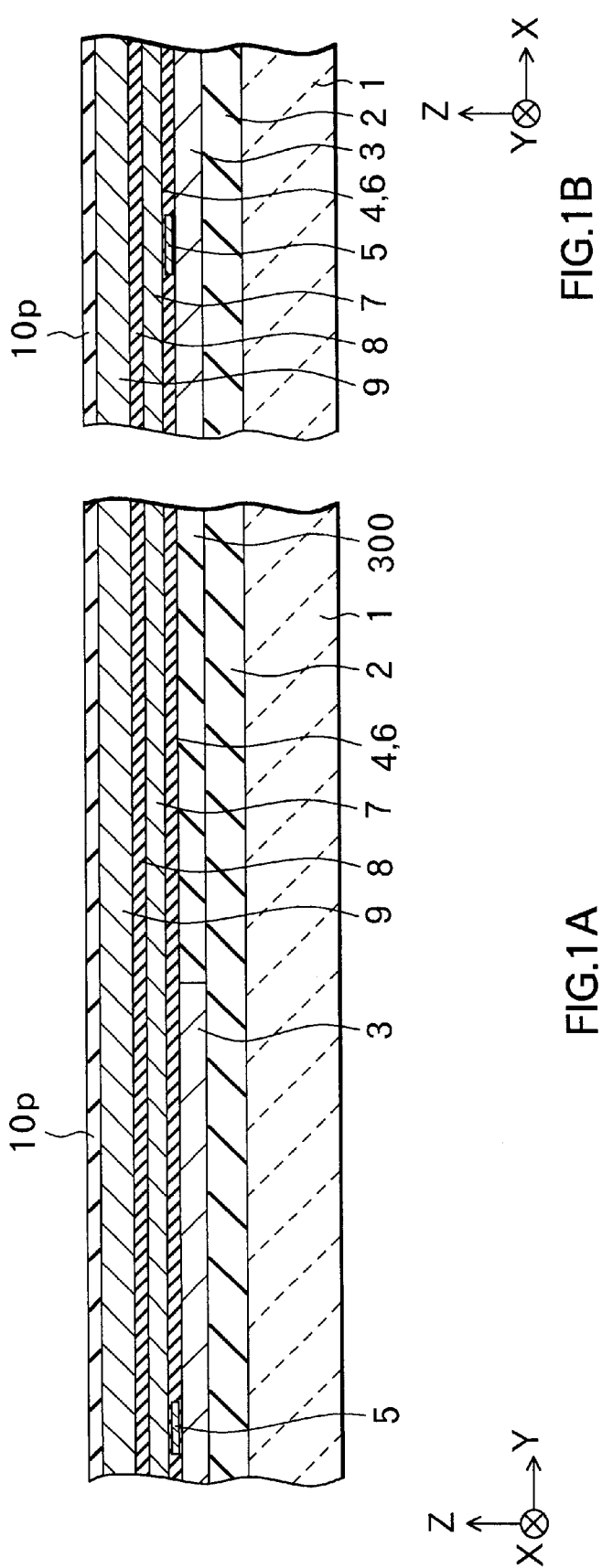

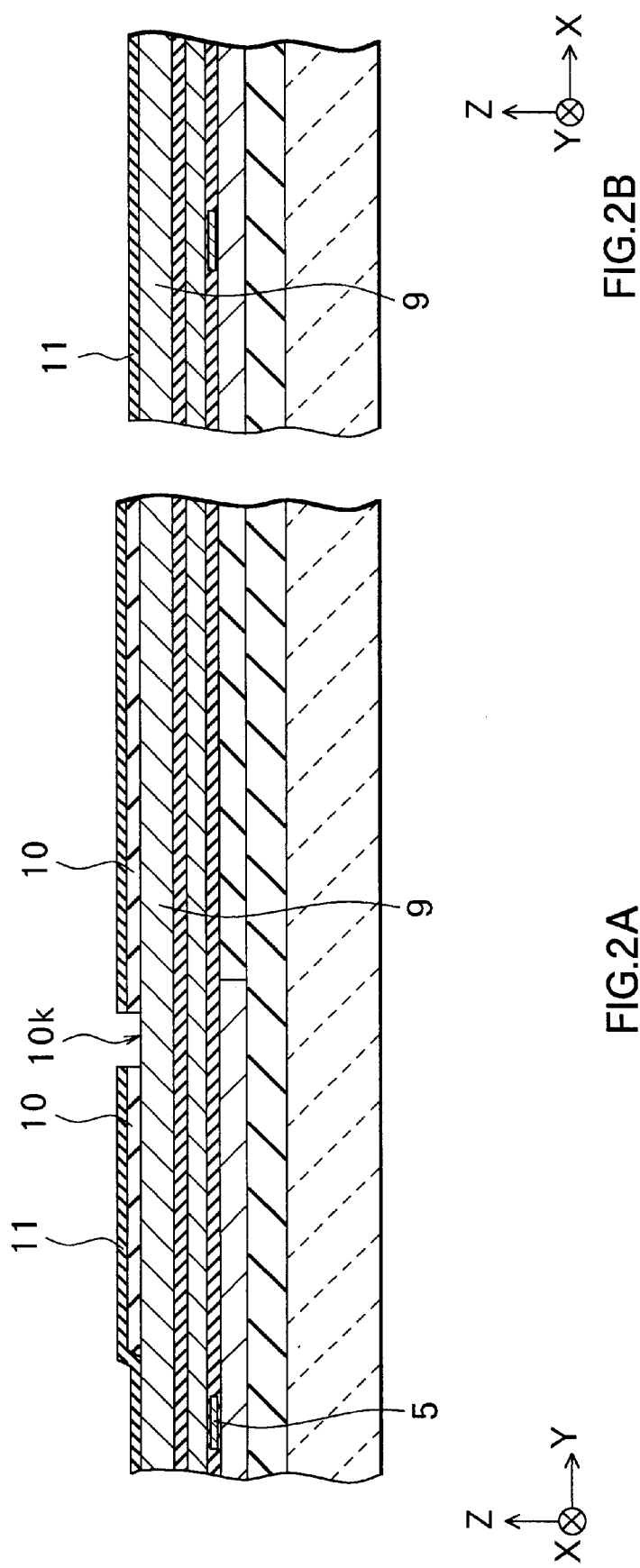

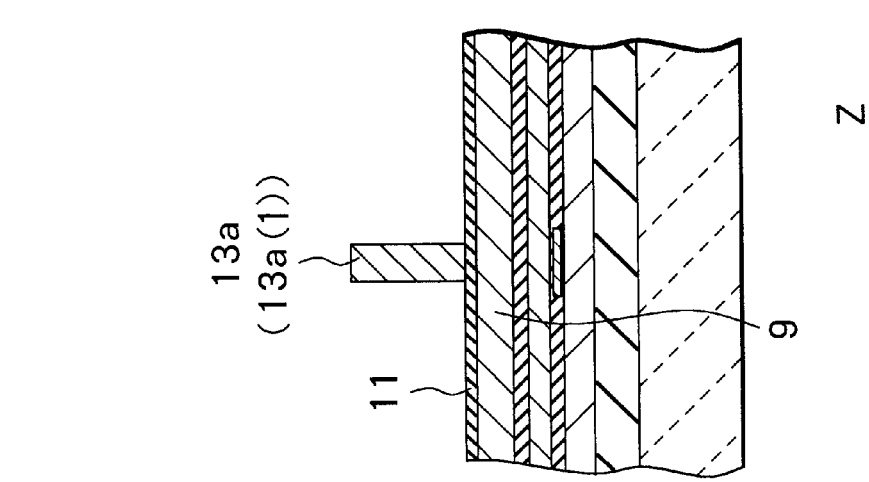
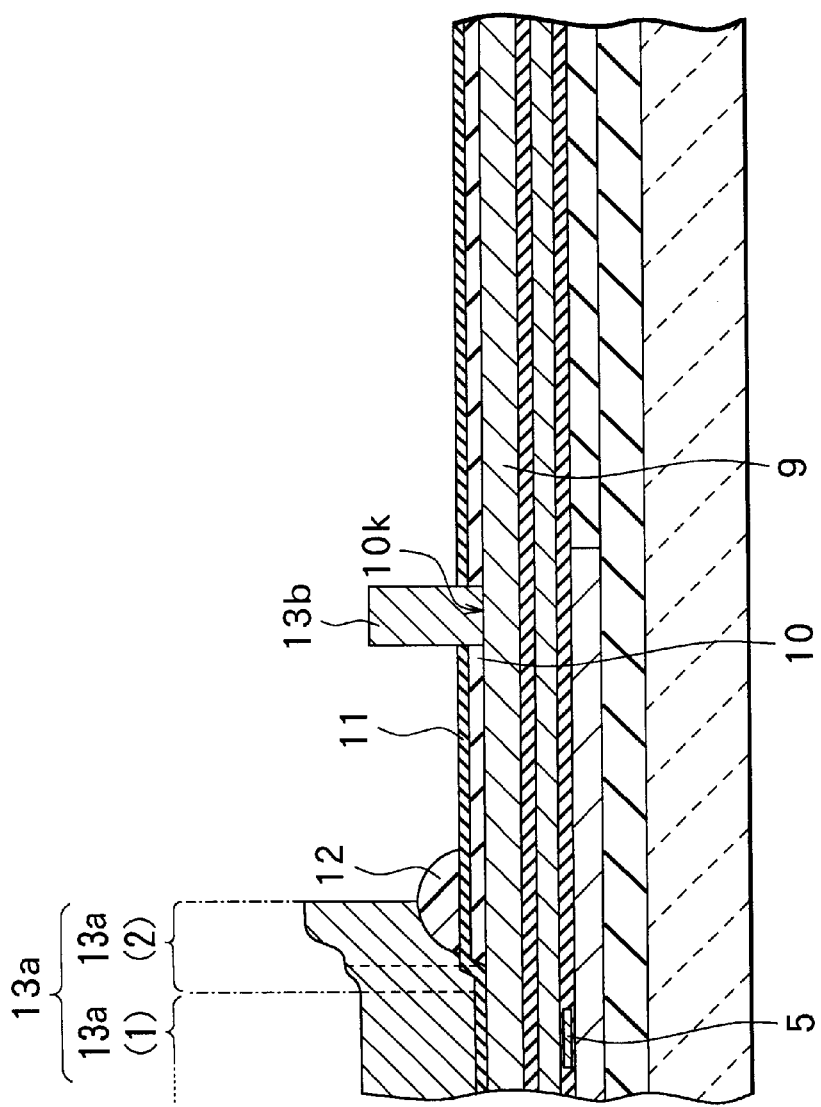
FIG.3A
FIG.3B

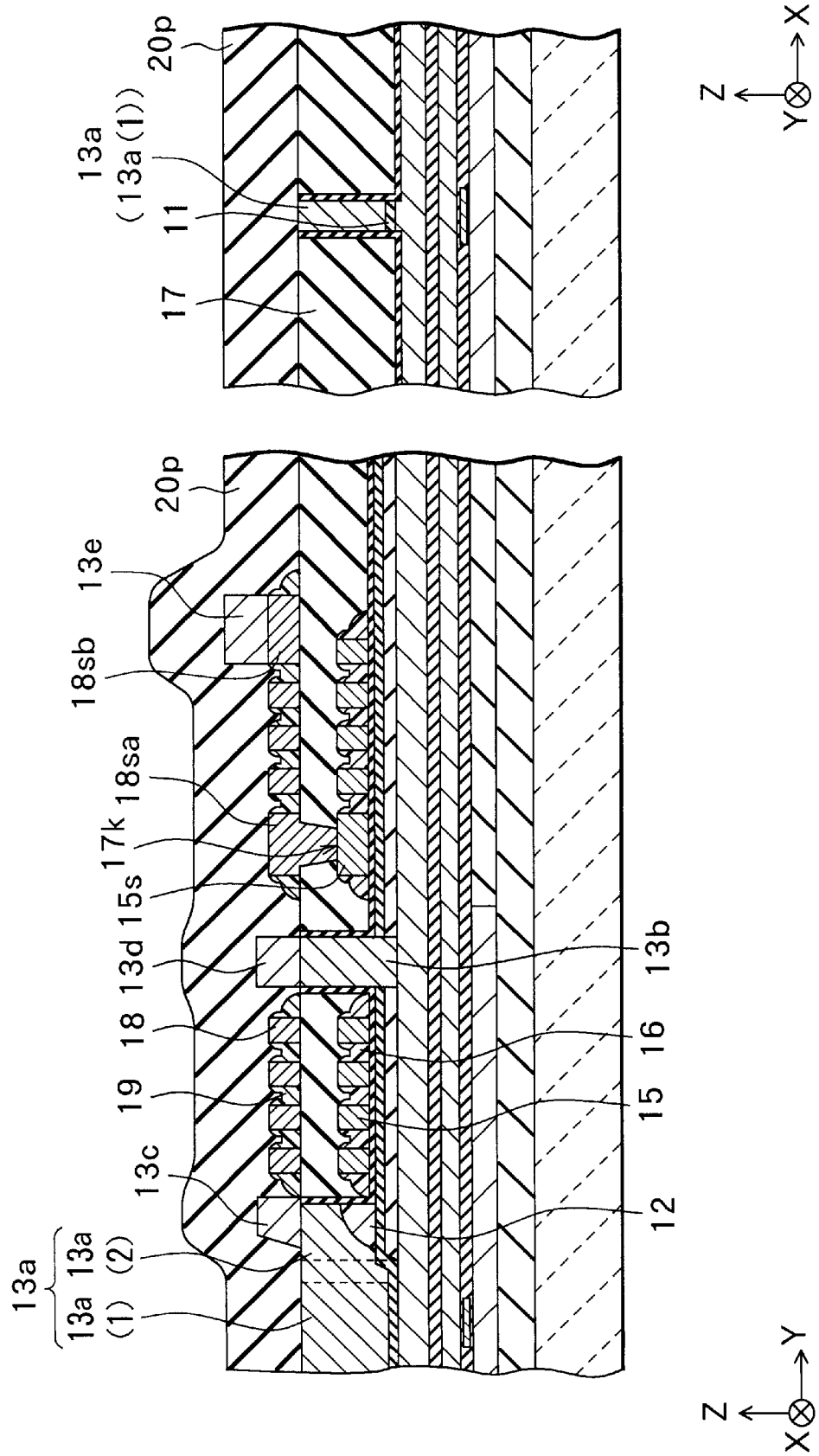

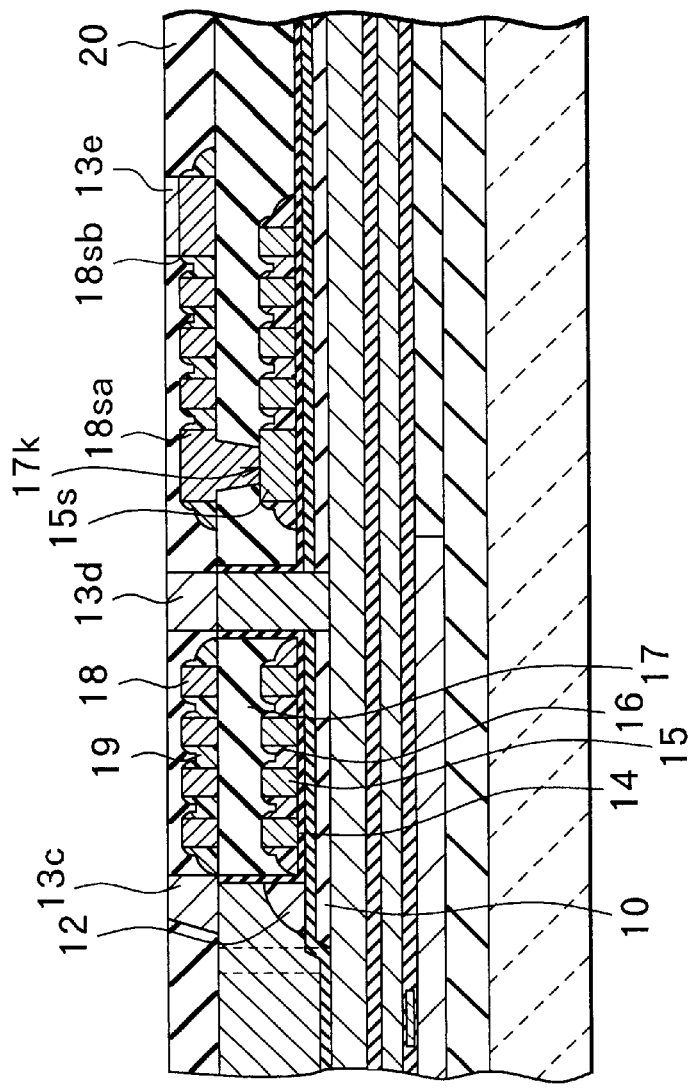
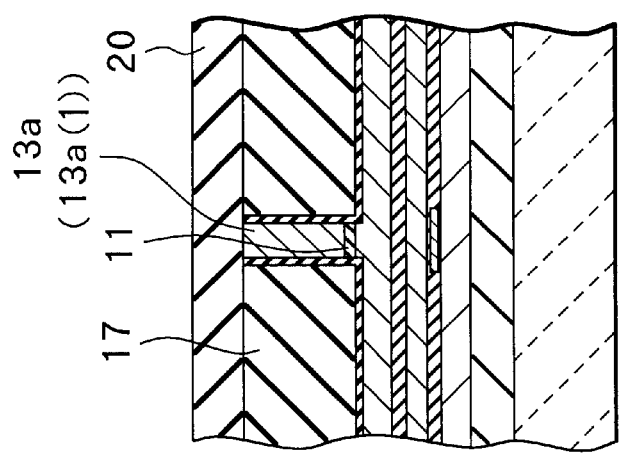
FIG.8A
FIG.8B

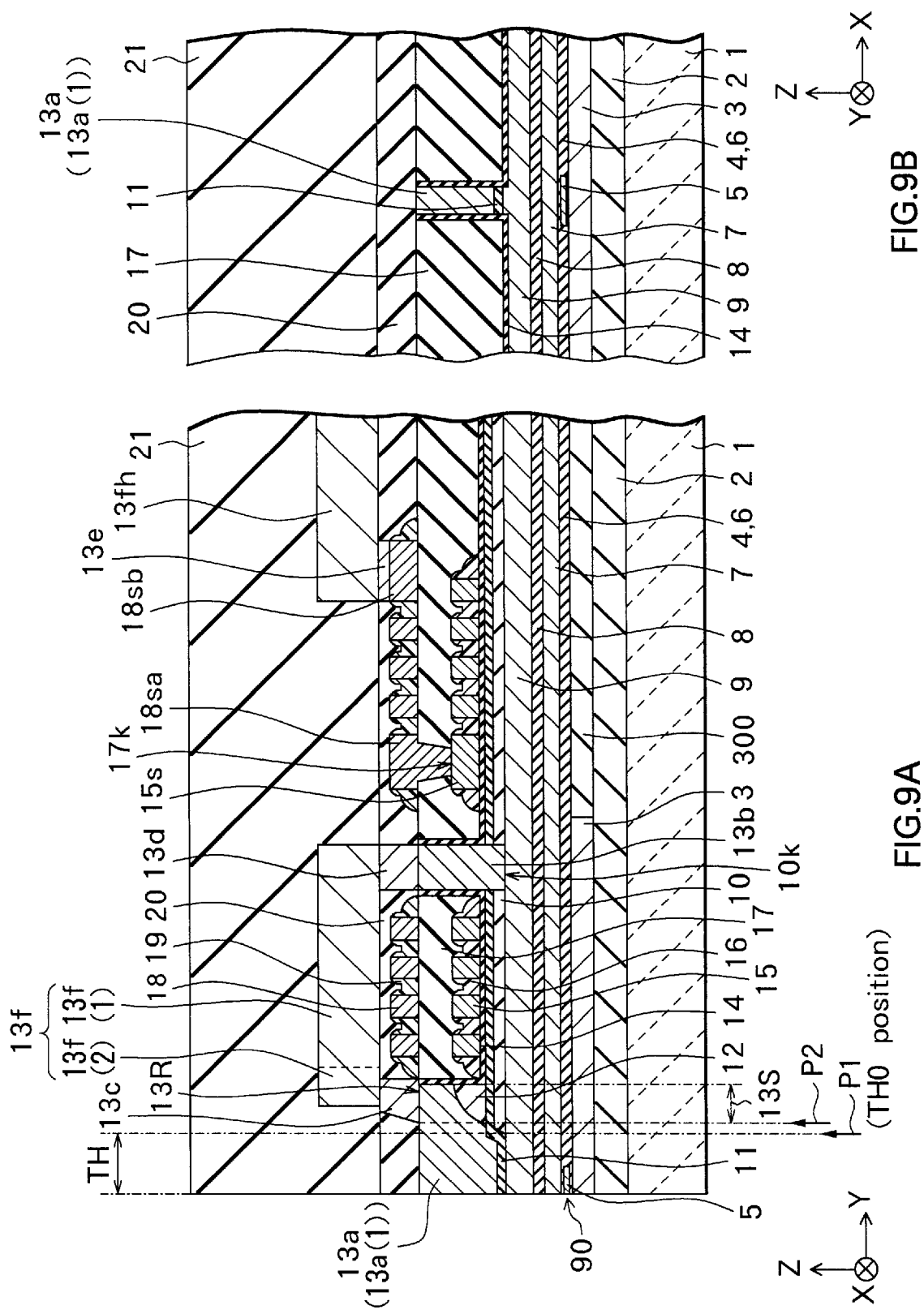

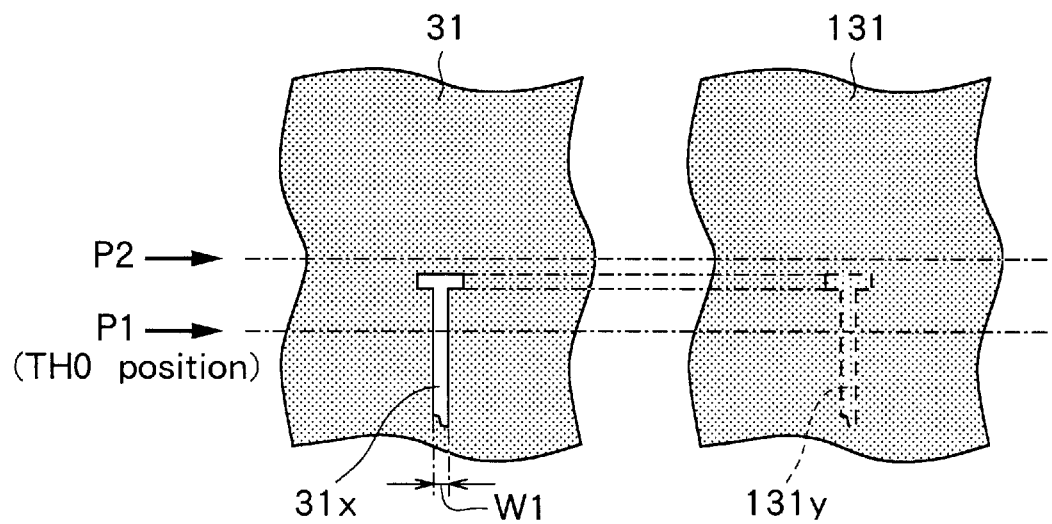
FIG.13A  FIG.13B
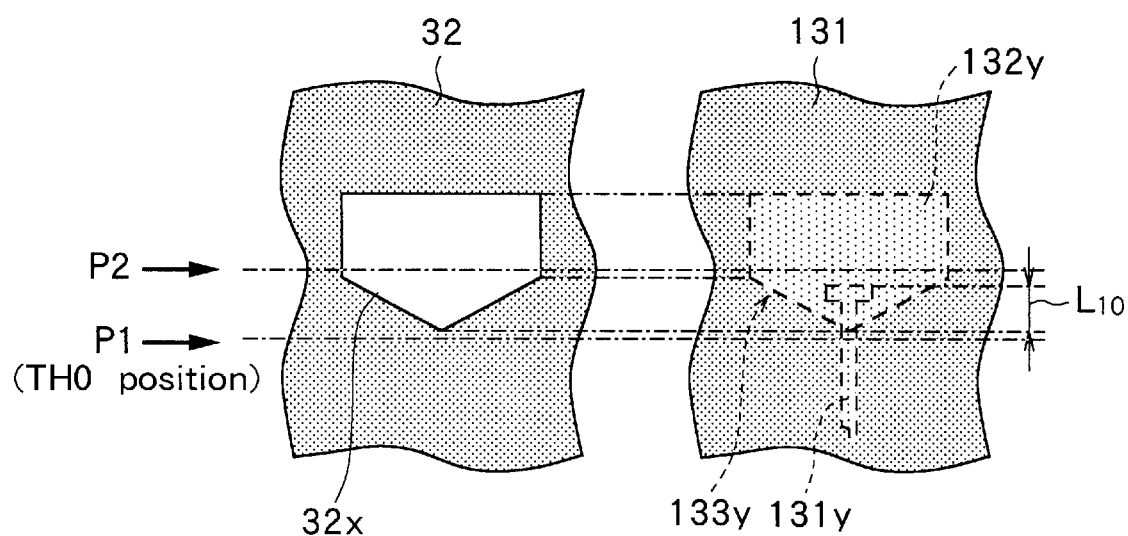
FIG.13C  FIG.13D
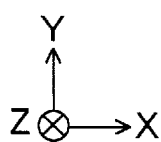

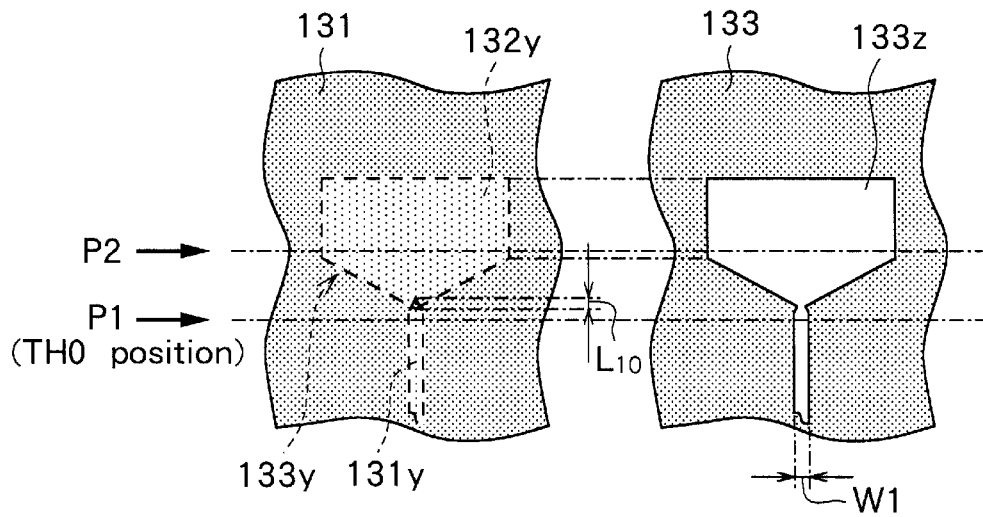
FIG.15A  
RELATED ART
FIG.15B  
RELATED ART
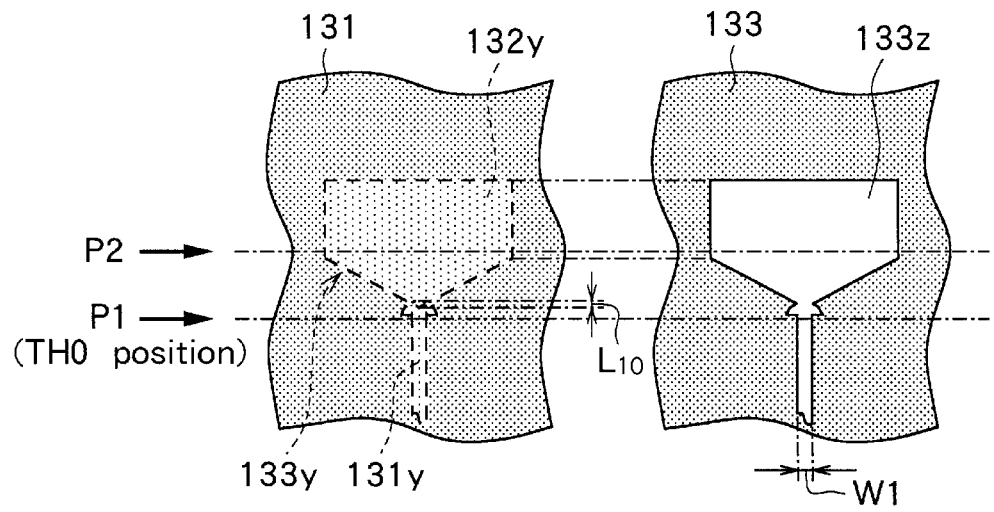
FIG.16A
FIG.16B

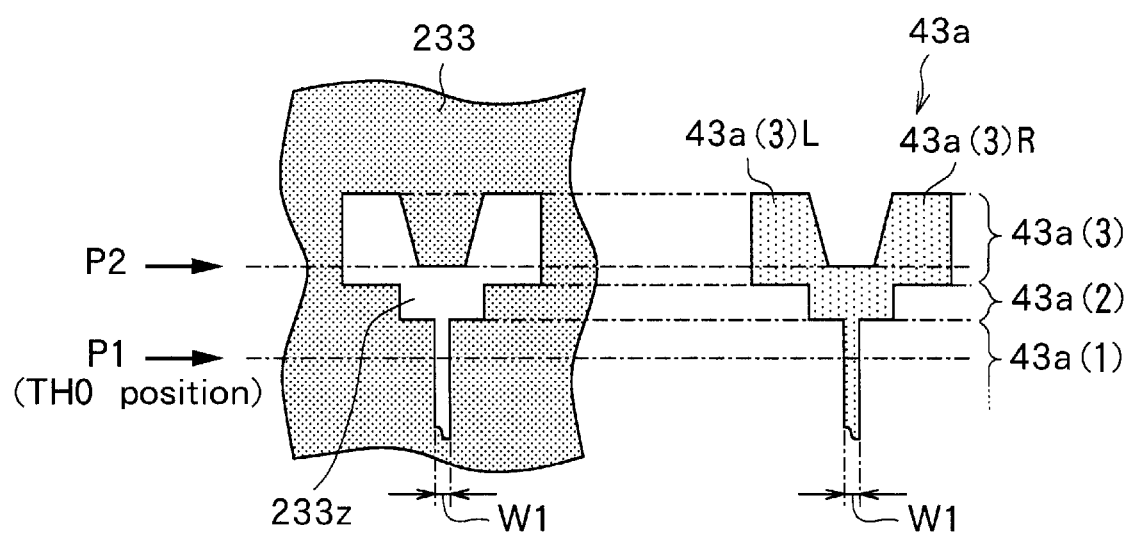
FIG.29A  FIG.29B
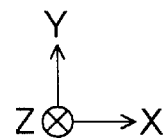

THIN FILM MAGNETIC HEAD AND THE MANUFACTURING METHOD

BACKGROUND OF THE INVENTION

1. Field of Invention

The present invention relates to a thin film magnetic head having at least an inductive magnetic transducer for writing and a method of manufacturing the same.

2. Description of Related Art

In recent years, an improvement in performance of a thin film magnetic head has been demanded in accordance with an increase in surface recording density of a hard disk drive. As a thin film magnetic head, a composite thin film magnetic head in which a recording head having an inductive-type magnetic transducer for writing and a reproducing head having a magnetoresistive (hereinbelow, referred to as MR) element for reading are stacked is widely used.

In order to improve the recording density in the performance of the recording head, it is necessary to increase track density of a magnetic recording medium. For this purpose, it is necessary to realize a recording head of a narrow track structure in which the width on the air bearing surface of each of a bottom pole and a top pole formed while sandwiching a write gap is reduced to the order of a few microns to submicrons. In order to achieve this, semiconductor processing techniques are used.

Referring to FIGS. 30 to 35, as an example of a method of manufacturing a conventional thin film magnetic head, a method of manufacturing a composite thin film magnetic head will be described.

According to the manufacturing method, first, as shown in FIG. 30, an insulating layer 102 made of, for example, an aluminum oxide ($Al_2O_3$; hereinbelow, simply called "alumina") is deposited in a thickness of about 5.0 to 10.0 $\mu$m on a substrate 101 made of altic ($Al_2O_3 \cdot TiC$) or the like. Subsequently, a bottom shield layer 103 for a reproducing head is formed on the insulating layer 102. For example, alumina layer is then sputter-deposited in a thickness of 100 to 200 nm on the bottom shield layer 103 to form a shield gap film 104. Then, an MR film 105 for constructing an MR device for reproducing is formed in a thickness of tens nm on the shield gap film 104 and is patterned in a desired shape by high-precision photolithography. Then, lead layers (not shown) as lead electrode layers, which are electrically connected to the MR film 105, are formed on both sides of the MR film 105. After that, a shield gap film 106 is formed on the lead layers, the shield gap film 104, and the MR film 105, and the MR film 105 is buried in the shield gap films 104 and 106. Then, a top shield-cum-bottom pole (hereinbelow, referred to as a bottom pole) 107 made of a magnetic material such as nickel iron alloy (NiFe; hereinbelow, also simply called "Permalloy (trade name)") used for both of the reproducing head and the recording head is formed on the shield gap film 106.

As shown in FIG. 31, on the bottom pole 107, a write gap layer 108 made of an insulating material such as alumina is formed. Further, a photoresist film 109 is formed in a predetermined pattern on the write gap layer 108 by high-precision photolithography. Then, on the photoresist film 109, a thin film coil 110 for an inductive-type recording head made of, for example, copper (Cu) is formed by plating or the like. Then, a photoresist film 111 is formed in a predetermined pattern by high-precision photolithography so as to cover the photoresist film 109 and the thin film coil 110. Then, in order to insulate the winding portions of the thin film coil 110 from each other, a heat treatment is conducted at a temperature of, for example, 250 degrees on the photoresist film 111.

As shown in FIG. 32, in a position rearward of the thin film coil 110 (the right side in FIG. 32), an opening 108a is formed by partially etching the write gap layer 108 in order to form a magnetic path, thereby exposing part of the bottom pole 107. Then, a top yoke-cum-top pole (hereinbelow, called a top pole) 112 made of a magnetic material having a high saturation magnetic flux density such as Permalloy is selectively formed so as to cover the exposed face of the bottom pole 107, the photoresist film 111 and the write gap layer 108.

As a method of forming the top pole 112, for example, as disclosed in Japanese Unexamined Patent Publication No. Hei 7-262519, a frame plating is used. When the top pole 112 is formed by using the frame plating, first, on the whole coil portion (hereinbelow, called an "apex portion") which is projected like a mountain and covered with the photoresist film 111, a thin electrode film made of, for example, Permalloy is formed by sputtering or the like. A photoresist is then applied on the electrode film, thereby forming the photoresist film. After that, the photoresist film is patterned by photolithography to form a frame (outer frame) for plating. Then, by using the electrode film formed beforehand as a seed layer, a plating film made of Permalloy is grown by plating, thereby forming the top pole 112.

The top pole 112, for example, has a shape in plane as shown in FIG. 35 which will be described hereinafter, and includes a yoke part 112a and a pole tip part 112b. The top pole 112 is in contact with and magnetically coupled to the bottom pole 107 in the opening 108a. Subsequently, by using part (pole tip part 112b) of the top pole 112 as a mask, both the write gap layer 108 and the bottom pole 107 are selectively etched by about 0.5 $\mu$m through ion milling (refer to FIG. 34) and, after that, an overcoat layer 113 made of, for example, alumina is formed on the top pole 112. Finally, by machining and polishing, the track surface, that is, an air bearing surface 120 of the recording head and the reproducing head is formed, thereby completing a thin film magnetic head.

FIGS. 33 to 35 show the structure of the thin film magnetic head in a completed state. FIG. 33 shows a cross section of the thin film magnetic head in the direction perpendicular to the air bearing surface 120. FIG. 34 shows an enlarged cross section in the direction parallel to the air bearing surface 120 of the pole part. FIG. 35 shows a plane structure. FIG. 32 corresponds to a cross section taken along the line XXXII—XXXII in FIG. 35. In FIGS. 33 to 35, it is omitted to graphically express the overcoat layer 113 and the like. In FIG. 35, with respect to the thin film coil 110 and the photoresist film 111, only their outlines are shown.

In FIGS. 33 and 35, "TH" denotes the throat height and "MRH" indicates the MR height. The "throat height (TH)" is one of factors which determine the performance of the recording head and corresponds to a length from the position of the edge on the side closest to the air bearing surface 120 of the insulating layer (photoresist film 111) for electrically isolating the thin film coil 110 from the other conductive portions, that is, from the throat height zero position (TH0 position) to the position of the air bearing surface 120. In order to improve the performance of the recording head, it is necessary to rightsize the throat height (TH). The throat height (TH) is controlled by a polishing amount at the time of forming the air bearing surface 120. The "MR height (MRH)" denotes a length from the position of the edge on the side furthest from the air bearing surface 120 of the MR film 105, that is, the MR height zero position (MRHO position) to the position of the air bearing surface 120. The MR height (MRH) is also controlled by the polishing amount at the time of forming the air bearing surface 120.

Besides the throat height (TH) and the MR height (MRH) and the like, another factor that determines the performance of the thin film magnetic head is an apex angle (θ) shown in FIG. 33. The apex angle θ is an average inclination angle of an inclined face close to the air bearing surface 120 of the photoresist film 111.

As shown in FIG. 34, a structure such that part of the write gap layer 108 and part of the bottom pole 107 are both etched in a self-aligned manner to the pole tip part 112b of the top pole 112 is called a trim structure. According to the trim structure, an increase in the effective track width due to expansion of the magnetic flux which occurs at the time of writing data to a narrow track can be prevented. "P2W" shown in the drawing indicates the width of the portion having the trim structure (hereinbelow, simply called "pole part 500"), that is, the pole width (hereinbelow, also called "track width"). The processing dimension of the pole width P2W depends on the width of a portion corresponding to the pole part 500 in a mask (photoresist film pattern in the above case) used at the time of performing an etching process to form the trim structure. "P2L" shown in the drawing denotes the thickness of the pole tip part 112b constituting part of the pole part 500, that is, the pole length. As shown in FIG. 34, the lead layers 121 as the lead electrode layer electrically connected to the MR film 105 are provided on both sides of the MR film 105. In FIGS. 30 to 33, it is omitted to graphically express the lead layers 121.

As shown in FIG. 35, the top pole 112 has the yoke part 112a which occupies a major part of the top pole 112, and the pole tip part 112b which has an almost uniform width as the pole width P2W. In the connecting portion between the yoke part 112a and the pole tip part 112b, the outer edge of the yoke part 112a forms an angle α to a plane parallel to the air bearing surface 120. In the above-mentioned connecting portion, the outer edge of the pole tip part 112b forms an angle β to the plane parallel to the air bearing surface 120. For example, α is 45 degrees and β is 90 degrees. As described above, the pole tip part 112b serves as a mask when forming the trim structure of the pole part 500. As understood from FIGS. 33 and 35, the pole tip part 112b extends on the flat write gap layer 108 and the yoke part 112a extends on the apex portion.

Detailed structural characteristics of the top pole are described in, for example, Japanese Unexamined Patent Publication No. Hei 8-249614.

In the conventional thin film magnetic head having the structure as shown in FIG. 32, the magnetic flux generated by the thin film coil 110 at the time of recording information propagates through the top pole 112 from the yoke part 112a toward the pole tip part 112b and finally reaches the tip of the pole tip part 112b. The magnetic flux reached the tip of the pole tip part 112b generates a signal magnetic field to the outside. By the signal magnetic field, information is recorded onto a recording medium (not shown).

In order to assure the excellent overwrite characteristics of the thin film magnetic head, generally, it is necessary to smoothly and sufficiently supply the magnetic flux to the tip of the pole tip part 112b in the top pole 112 to sufficiently generate the above-described signal magnetic field.

In the conventional thin film magnetic head shown in FIG. 32, however, only the thin write gap layer 108 is provided between the pole tip part 112b of the top pole 112 and the bottom pole 107. Part of the magnetic flux flowed from the yoke part 112a toward the pole tip part 112b does not therefore reach the tip of the pole tip part 112b, but passes through the write gap layer 108 and propagates to the bottom pole 107. In the following, the propagation of the magnetic flux from the top pole 112 to the bottom pole 107 due to passing through the write gap layer 108 will be called "leakage of magnetic flux". Such a tendency is conspicuous especially in a region 112S, because a flow of the magnetic flux in the top pole 112 which heads in the downward direction in the drawing occurs in a part corresponding to the region 112S in the top pole 112.

The above-mentioned "leakage of the magnetic flux" induces inconveniences as described below.

1) Due to the leakage of the magnetic flux from the top pole 112 to the bottom pole 107, the absolute volume of the magnetic flux propagating through the top pole 112 from the yoke part 112a to the pole tip part 112b decreases. In such a case, the magnetic flux generated by the thin film coil 110 cannot be sufficiently supplied to the tip of the pole tip part 112b. Consequently, the overwrite characteristic of the thin film magnetic head deteriorates severely.

2) Local concentration of the magnetic flux on the bottom pole 107 due to the leakage of the magnetic flux exerts an adverse influence on the reading operation of the thin film magnetic head. For example, when the magnetic flux concentrates on the bottom pole 107 more than necessary and part of the magnetic flux passes through the bottom pole 107 and reaches the MR film 105, the magnetic flux reached the MR film 105 acts as magnetic noises at the time of the reading operation of the reproducing head. Due to this, the normal reading operation of the thin film magnetic head is disturbed.

SUMMARY OF THE INVENTION

The invention has been achieved in consideration of the problems. An object is to provide a thin film magnetic head having an excellent overwrite characteristic by suppressing "leakage of magnetic flux" and a method of manufacturing the same.

According to the invention, there is provided a thin film magnetic head comprising: a first magnetic layer and a second magnetic layer magnetically coupled to each other and having two magnetic poles which face each other with a gap layer having a flat surface in between near and in a recording-medium-facing surface to be faced with a recording medium, the first magnetic layer including a first magnetic layer portion having a uniform width portion which extends from the recording-medium-facing surface in a direction so as to be apart from the recording-medium-facing surface and which defines a recording track width of the recording medium; and a thin film coil provided between the first magnetic layer and the second magnetic layer with an insulating layer in between, wherein: a first non-magnetic layer pattern and a second non-magnetic layer pattern are disposed between the first magnetic layer portion of the first magnetic layer and the second magnetic layer in order from the second magnetic layer, the first non-magnetic layer pattern extending in a manner that a rear part thereof is connected to the insulating layer and a front end thereof terminates at a predetermined position recessed from the recording-medium-facing surface; and a second non-magnetic layer pattern extending in a manner that a rear end thereof is connected to the insulating layer and a front end thereof terminates at a position rearward of the front end of the first non-magnetic layer pattern.

In the thin film magnetic head of the invention, the first non-magnetic layer pattern and the second non-magnetic layer pattern are disposed between the first magnetic layer portion of the first magnetic layer and the second magnetic layer in order from the second magnetic layer. The front end of the second non-magnetic layer pattern is positioned rearward of the front end of the first non-magnetic layer pattern, and thereby a step is formed between the surface of the first non-magnetic layer pattern and the surface of the second non-magnetic layer pattern.

In the thin film magnetic head of the invention, the front end of the first non-pattern layer pattern may be positioned rearward of the uniform width portion in the first magnetic layer portion.

Furthermore, in the thin film magnetic head of the invention, a surface of the vicinity of the front end of the first non-magnetic layer pattern and a surface of the vicinity of the front end of the second non-magnetic layer pattern may be inclined with respect to a flat surface of the gap layer.

Furthermore, in the thin film magnetic head of the invention, at least the uniform width portion in the first magnetic layer portion may extend on the flat surface of the gap layer.

Furthermore, in the thin film magnetic head of the invention, the first magnetic layer portion may further comprise: at least two connection portions disposed so as to be separated from each other in a track width direction; and a coupling portion for magnetically coupling the uniform width portion to at least two connection portions. In such a case, in a region surrounded by the coupling portion and at least the two connection portions in the first magnetic layer portion, a third non-magnetic layer pattern connected to the insulating layer may be further disposed.

Furthermore, in the thin film magnetic head of the invention, the first magnetic layer may further include: a second magnetic layer portion which is magnetically coupled to the first magnetic layer portion so as to be partially overlapped with each other; and a third magnetic layer portion for magnetically coupling the second magnetic layer portion to the second magnetic layer.

Furthermore, in the thin film magnetic head of the invention, at least one part of both of the first magnetic layer and the second magnetic layer may be made of a material containing either a nickel iron alloy or an iron nitride, and may be made of a material containing an amorphous alloy such as a cobalt iron alloy, a cobalt iron nickel alloy or a zirconium cobalt iron alloy oxide.

According to the invention, there is provided a method of manufacturing a thin film magnetic head comprising: a first magnetic layer and a second magnetic layer magnetically coupled to each other and having two magnetic poles which face each other with a gap layer having a flat surface in between near and in a recording-medium-facing surface to be faced with a recording medium, the first magnetic layer including a first magnetic layer portion having a uniform width portion which extends from the recording-medium-facing surface in a direction so as to be apart from the recording-medium-facing surface and which defines a recording track width of the recording medium; and a thin film coil provided between these two magnetic layers with an insulating layer in between, wherein the method comprises: a step of selectively forming a first non-magnetic layer pattern so as to extend on the second magnetic layer so that a rear end thereof is connected to the insulating layer and a front end thereof terminates at a predetermined position recessed from the recording-medium-facing surface; a step of selectively forming a second non-magnetic layer pattern so as to extend on the first non-magnetic layer pattern so that a rear end thereof is connected to the insulating layer and a front end thereof terminates at a position rearward of the front end of the first non-magnetic layer pattern; and a step of forming the first magnetic layer portion so as to cover at least both of the first non-magnetic layer pattern and the second non-magnetic layer pattern.

In the method of manufacturing the thin film magnetic head of the invention, after the first non-magnetic layer pattern is selectively formed so as to extend on the second magnetic layer so that the rear end thereof is connected to the insulating layer and the front end thereof terminates at the predetermined position recessed from the recording-medium-facing surface, the second non-magnetic layer pattern is selectively formed so as to extend on the first non-magnetic layer pattern so that the rear end thereof is connected to the insulating layer and the front end thereof terminates at the position rearward of the front end of the first non-magnetic layer pattern. After that, the first magnetic layer portion is formed so as to cover both of the first non-magnetic layer pattern and the second non-magnetic layer pattern.

In the method of manufacturing the thin film magnetic head of the invention, a step of forming a photoresist pattern in the step of forming the first magnetic layer portion may include: a step of forming a photoresist layer so as to cover at least all of the flat surface of the gap layer, an inclined surface of the first non-magnetic layer pattern and an inclined surface of the second non-magnetic layer pattern; a first exposing step of selectively exposing a first region in the photoresist layer of a region extending from the flat surface of the gap layer to the inclined surface of the first non-magnetic layer pattern, the first region including a region corresponding to a planer shape of the uniform width portion of the first magnetic layer portion; a second exposing step of selectively exposing a second region in the photoresist layer of a region extending from the flat surface of the gap layer to the inclined surface of the second non-magnetic layer pattern, the second region corresponding to a planar shape of a part other than the uniform width portion of the first magnetic layer portion; and a step of forming the photoresist pattern by developing, in a lump, both of the first region and the second region in the photoresist layer. In such a case, it is preferable that the second exposing step is performed so that the first region and the second region are partially overlapped with each other.

Furthermore, in the method of manufacturing the thin film magnetic head of the invention, in the case where the first magnetic layer further includes: a second magnetic layer portion which is magnetically coupled to the first magnetic layer portion so as to be partially overlapped with each other; and a third magnetic layer portion for magnetically coupling the second magnetic layer portion to the second magnetic layer, the method may comprise: a step of forming the third magnetic layer portion and a coil connection pattern, simultaneously with the step of forming the first magnetic layer portion, the coil connection pattern being part of the thin film coil and being located at the end of the thin film coil; a step of forming a coil embedding layer as a preparatory layer of the insulating layer so as to cover at least all of the first magnetic layer portion, the third magnetic layer portion and the coil connection pattern; a step of planarizing a surface of the coil embedding layer by polishing until at least all of the first magnetic layer portion, the third magnetic layer portion and the coil connection pattern are exposed; and a step of forming the second magnetic layer portion so as to be in magnetic contact with exposed faces of each of the first magnetic layer portion and the third magnetic layer portion and, simultaneously, forming a conductive layer pattern so as to be in electrical contact with an exposed face of the coil connection pattern on the surface planarized by the polishing.

Furthermore, in the method of manufacturing the thin film magnetic head of the invention, as a material of forming at least one part of both of the first magnetic layer and the second magnetic layer, a material containing either a nickel iron alloy or an iron nitride may be used, and a material containing an amorphous alloy such as a cobalt iron alloy, a cobalt iron nickel alloy or a zirconium cobalt iron alloy oxide may be used.

Other and further objects, features and advantages of the invention will appear more fully from the following description.

BRIEF DESCRIPTION OF THE DRAWINGS

FIGS. 1A and 1B are cross sections for explaining a process in a method of manufacturing a thin film magnetic head according to a first embodiment of the invention.

FIGS. 2A and 2B are cross sections for explaining a process subsequent to FIGS. 1A and 1B, respectively.

FIGS. 3A and 3B are cross sections for explaining a process subsequent to FIGS. 2A and 2B, respectively.

FIGS. 7A and 7B are cross sections for explaining a process subsequent to FIGS. 6A and 6B, respectively.

FIGS. 8A and 8B are cross sections for explaining a process subsequent to FIGS. 7A and 7B, respectively.

FIGS. 9A and 9B are cross sections for explaining a process subsequent to FIGS. 8A and 8B, respectively.

FIGS. 13A to 13D are plan views for explaining processes of forming a top pole tip in the method of manufacturing the thin film magnetic head according to the first embodiment of the invention.

FIGS. 15A and 15B are another plan views for explaining problems of a comparative example to the first embodiment.

FIGS. 16A and 16B are plan views for explaining the action of the first embodiment.

FIG. 29A is a plan view for explaining a process subsequent to FIG. 28D.

FIG. 29B is a plan view for explaining a process subsequent to FIG. 29A.

DETAILED DESCRIPTION OF PREFERRED EMBODIMENTS

Figures 4A, 4B:
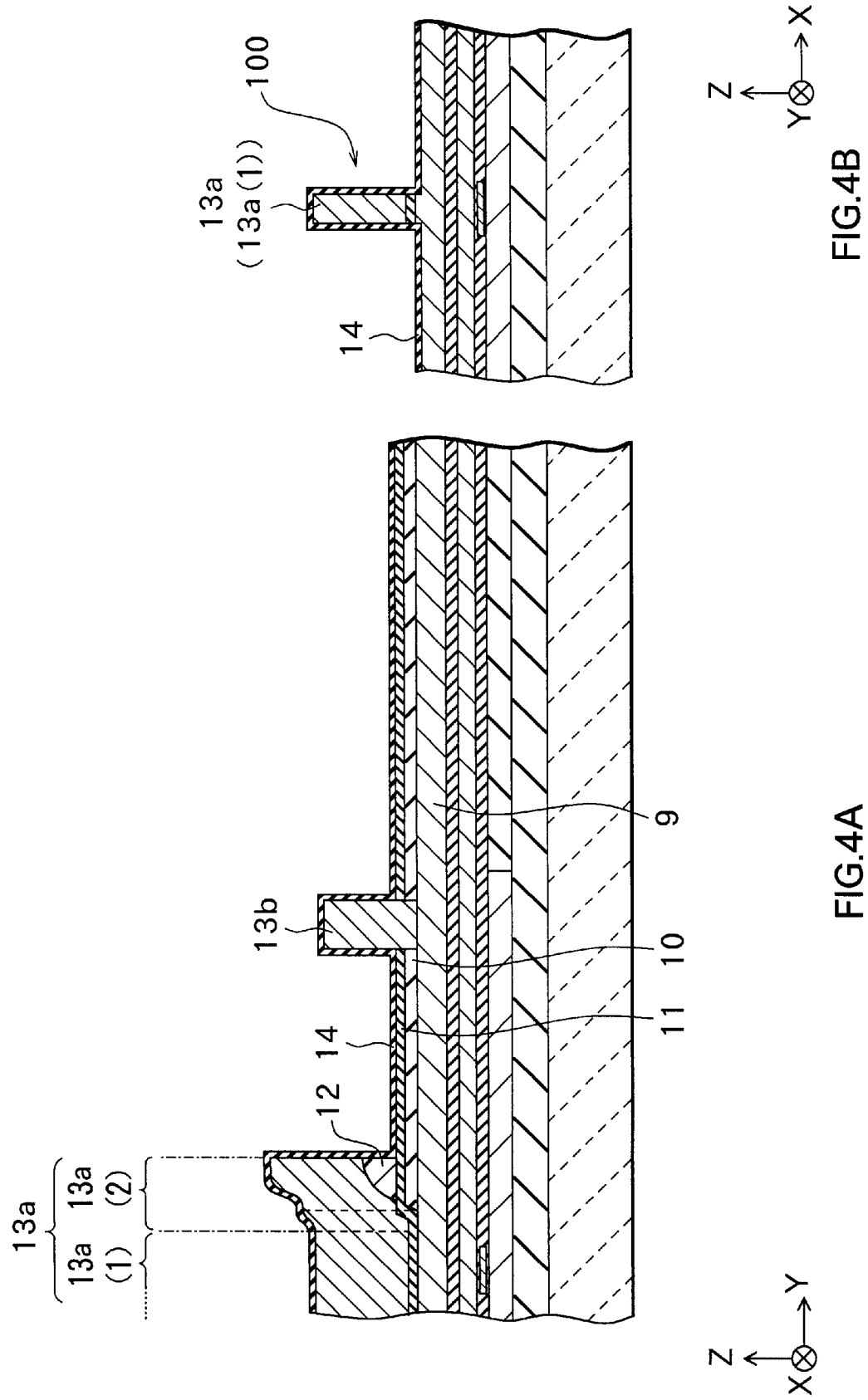
FIGS. 4A and 4B are cross sections for explaining a process subsequent to FIGS. 3A and 3B, respectively.

Embodiments of the invention will be described in detail hereinbelow by referring to the drawings.

First Embodiment
<Method of Manufacturing Thin Film Magnetic Head>

First of all, referring to FIGS. 1A to 12, an example of a method of manufacturing a composite thin film magnetic head as a method of manufacturing a thin film magnetic head according to a first embodiment of the invention will be described.

Figure 10:
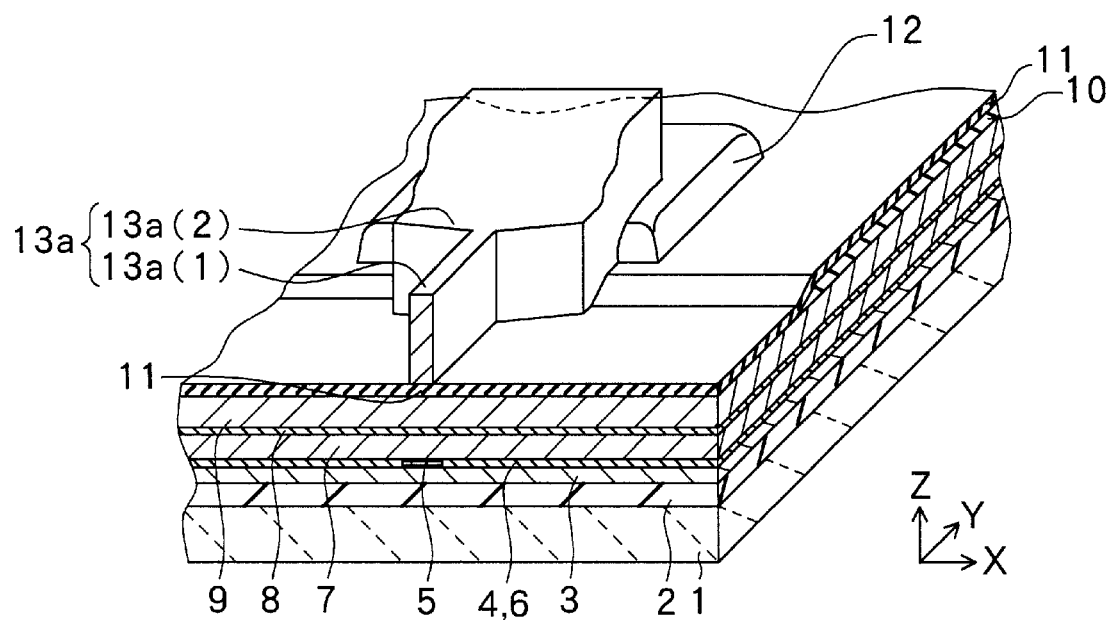
FIG. 10 is a perspective view corresponding to the cross sections shown in FIGS. 3A and 3B.
Figure 11:
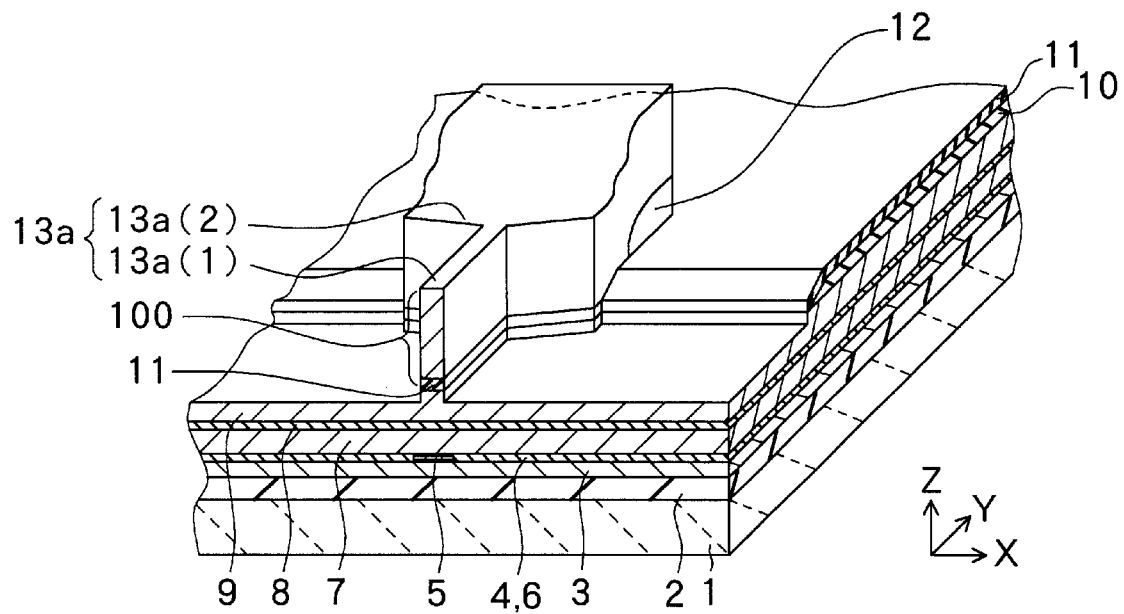
FIG. 11 is a perspective view corresponding to the cross sections shown in FIGS. 4A and 4B.
Figure 12:
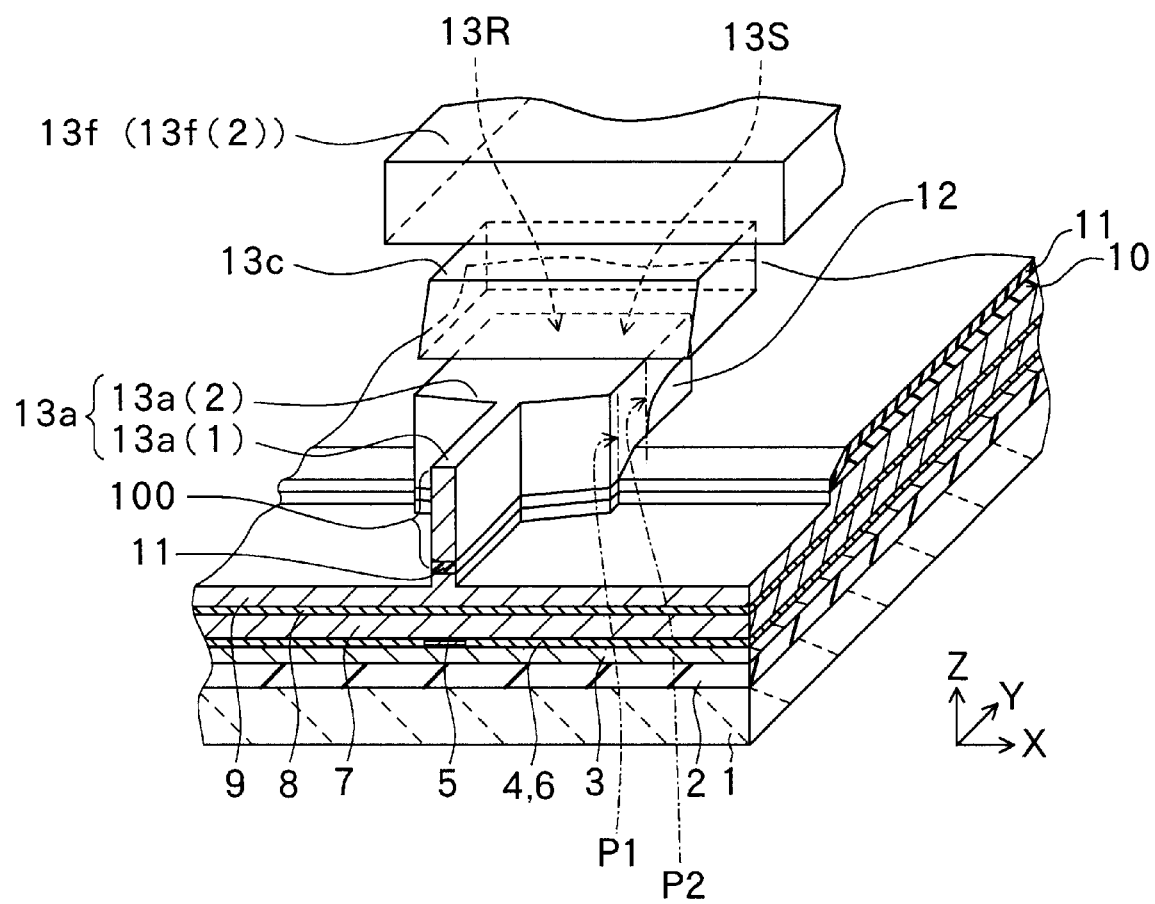
FIG. 12 is a perspective view corresponding to the cross sections shown in FIGS. 9A and 9B.

FIGS. 1A, 2A, 3A, 4A, 5A, 6A, 7A, 8A and 9A show cross sections each of which is perpendicular to the air bearing surface and FIGS. 1B, 2B, 3B, 4B, 5B, 6B, 7B, 8B and 9B show cross sections each of which is parallel to the air bearing surface of the pole part. FIGS. 10 to 12 are perspective views corresponding to main manufacturing processes. FIG. 10 corresponds to a state shown in FIGS. 3A and 3B. FIG. 11 corresponds to a state shown in FIGS. 4A and 4B. FIG. 12 corresponds to a state shown in FIGS. 9A and 9B. In FIG. 11, an insulating film 14 and the like shown in FIGS. 4A and 4B are omitted. In FIG. 12, insulating films 14, 16, 17, 19 and 20, thin film coils 15 and 18, an overcoat layer 21, and the like shown in FIGS. 9A and 9B are omitted.

In the following description, the X axis direction in each of FIGS. 1A to 12 is described as "width direction (or lateral direction)", the Y axis direction is described as "length direction", and the Z axis direction is described as "thickness direction (or longitudinal direction)". The side which is close to an air bearing surface 90 in the Y axis direction (or a side which becomes the air bearing surface 90 in the following process) is described as "front side (or forward)" and the opposite side is described as "rear side (or rearward)".

In the manufacturing method according to the embodiment, first, as shown in FIGS. 1A and 1B, an insulating layer 2 made of, for example, alumina is deposited in a thickness of about 3.0 to 5.0 μm on a substrate 1 made of, for example, altic ($Al_2O_3$□TiC). Then, a bottom shield layer 3 for a reproducing head is formed by selectively depositing, for example, Permalloy (Ni: 80 percent by weight and Fe: 20 percent by weight) in a thickness of about 3.0 μm on the insulating layer 2 by using, for example, photolithography and plating. Then, an insulating film 300 made of alumina or the like is deposited in a thickness of about 4.0 to 5.0 μm so as to cover the entire surface of the layer structure as mentioned above and the surface of the insulating film 300 is polished by, for example, CMP (Chemical Mechanical Polishing) until the bottom shield layer 3 is exposed, thereby planarizing the entire surface of the layer structure as mentioned above.

Subsequently, as shown in FIGS. 1A and 1B, a shield gap film 4 made of alumina or the like is deposited in a thickness of about 100 to 200 nm on the bottom shield layer 3 by, for example, sputtering. Subsequently, an MR film 5 for constituting an MR device as the main part of the reproducing head part is formed on the shield gap film 4 in a desired shape by high-precision photolithography. Then, the lead layers (not shown) as lead electrode layers to be electrically connected to the MR film 5 are formed on both sides of the MR film 5 and, after that, a shield gap film 6 is formed on the lead layers, the shield gap film 4, and the MR film 5, thereby burying the MR film 5 in the shield gap films 4 and 6.

Subsequently, as shown in FIGS. 1A and 1B, a top shield layer 7 is selectively deposited in a thickness of about 1.0 to 1.5 μm on the shield gap film 6. The material, the forming method and the like of the top shield layer 7 are similar to those in the case of the bottom shield layer 3.

Subsequently, as illustrated in FIGS. 1A and 1B, on the top shield layer 7, an insulating film 8 made of alumina or the like is deposited in a thickness of about 0.15 to 0.2 μm by, for example, sputtering. Then, on the insulating film 8, a bottom pole 9 made of a magnetic material having a high saturation magnetic flux density such as iron nitride (FeN) is selectively deposited in a thickness of about 2.0 to 2.5 μm. The deposition of the bottom pole 9 is performed by a procedure as described below. Specifically, first, on the insulating film 8, for example, an iron nitride layer is formed by, for example, sputtering. Subsequently, by using a mask in a predetermined shape made of a predetermined material, the iron nitride layer is etched and patterned by, for example, reactive ion etching (hereinbelow, simply called "RIE"), thereby selectively forming the bottom pole 9. The surface of the bottom pole 9 is almost flat throughout the whole. Generally, the etching speed by the RIE is faster than the etching speed by ion milling. Consequently, by using the RIE as an etching method for patterning the iron nitride layer, the deposition of the bottom pole 9 can be performed in shorter time than the case where the ion milling is used. Furthermore, the RIE does not necessarily have to be used, and the ion milling may be used. In this case, the "predetermined shape" of the above-described mask is a shape corresponding to the plane shape of the bottom pole 9, and the "predetermined material" of the mask is a metallic material such as chromium, a nonmetallic material such as a photoresist film or the like. As materials for forming the bottom pole 9, besides iron nitride as described above, for example, Permalloy (Ni: 45 percent by weight and Fe: 55 percent by weight) or an amorphous alloy, which is a magnetic material having a high saturation magnetic flux density as similar to iron nitride, may be used. As an amorphous alloy, for example, cobalt iron alloy (CoFe), cobalt iron nickel alloy (CoFeNi), zirconium cobalt iron alloy oxide (ZrCoFeO) or the like can be used. The bottom pole 9 corresponds to an example of "second magnetic layer" in the invention.

Subsequently, as shown in FIGS. 1A and 1B, an inorganic insulating material (alumina layer 10$p$) of a non-magnetic material such as alumina or the like is deposited in a thickness of about 0.5 to 1.0 μm on the bottom pole 9 by, for example, sputtering.

Subsequently, by using a mask (not shown) which is formed on the surface of the alumina layer 10$p$, the alumina layer 10$p$ is patterned by etching of the RIE or the like. Through the etching, a region on the front side in the alumina layer 10$p$ is selectively removed, and a region where a magnetic path connection portion 13$b$ will be formed in the following process is selectively removed, and thereby, as shown in FIGS. 2A and 2B, a nonmagnetic layer pattern 10 is selectively formed on the bottom pole 9. The region where the magnetic path connection portion 13$b$ will be formed in the following process becomes an opening 10$k$. The non-magnetic layer pattern 10 is for defining a position that becomes a reference at the time of determining the throat height (TH), that is, the throat height zero position (THO position). At the time of forming the non-magnetic layer pattern 10, for example, the position of the front end thereof is set to recede from the position of the rear end of the MR film 5 by about 0.3 to 0.8 μm. Additionally, for example, the surface in the vicinity of the front end edge portion of the non-magnetic layer pattern 10 is set to incline in contrast to the surface of the underlayer (bottom pole 9). This is for the purpose of smoothing the flow of the magnetic flux in a top pole tip 13$a$, which will be formed over the inclined region of the non-magnetic layer pattern 10 in the following process.

Subsequently, as shown in FIGS. 2A and 2B, a write gap layer 11 made of a non-magnetic material such as alumina or the like is formed in a thickness of about 0.15 to 0.2 μm by, for example, sputtering so as to cover the almost entire surface. When the write gap layer 11 is formed, it is set not to cover the opening 10$k$. In the write gap layer 11, the flat surface of the rearward region which is formed on the non-magnetic layer pattern 10 becomes higher than the flat surface of the forward region which is formed on the bottom pole 9 by the thickness of the non-magnetic layer pattern 10. In the following description, the forward region in the write gap layer 11 is called "lower region", and on the other hand the rearward region is called "upper region". Between the lower region and the upper region in the write gap layer 11, a step portion (hereinbelow, also called "first step portion") is formed. Part of the write gap layer 11 forward of the position of the front end of the non-magnetic layer pattern 10 corresponds to an example of "gap layer" in the invention, and the non-magnetic layer pattern 10 and part of the write gap layer 111 rearward of the position of the front end thereof correspond to an example of "first non-magnetic layer pattern" in the invention.

Subsequently, in a predetermined position on the front side region of the opening 10k in the upper region of the write gap layer 11, a non-magnetic material such as a photoresist film of an organic material is selectively formed in a thickness of about 1.0 μm by a high-precision photolithography process. Then, a heat treatment is conducted on the photoresist film at a temperature of, for example, about 200 to 250 degrees. By the treatment, the region around the end edge of the photoresist film forms a slope rounded and inclined downward in the end edge direction. As shown in FIGS. 3A and 10, a non-magnetic layer pattern 12 made of the photoresist film is formed. The surface of the non-magnetic layer pattern 12 becomes higher than the surface of the upper region of the write gap layer 11 by the thickness of the non-magnetic layer pattern 12. Between the upper region of the write gap layer 11 and the non-magnetic layer pattern 12, a step portion (hereinbelow, also called "second step portion") is formed. The "predetermined position" at the time of forming the non-magnetic layer pattern 12 is, for example, a position in which the position of the front end of the non-magnetic layer pattern 12 is deviated to the rear side of the position of the front end of the non-magnetic layer pattern 10. The distance (length of deviation) from the position of the front end of the non-magnetic layer pattern 10 to the position of the front end of the non-magnetic layer pattern 12 is suitably, for example, about 0.3 to 0.8 μm. By disposing the non-magnetic layer pattern 12 in such a position, the propagation of the magnetic flux (leakage of the magnetic flux) from a rear end part 13a(2) of the top pole tip 13a which will be formed in the following process on the inclined surface on the front side of the non-magnetic layer pattern 12 to the bottom pole 9 can be suppressed, and the flow of the magnetic flux in the rear end part 13a(2) can be smoothed. The non-magnetic layer pattern 12 corresponds to an example of "second non-magnetic layer pattern" in the invention.

Figure 17:
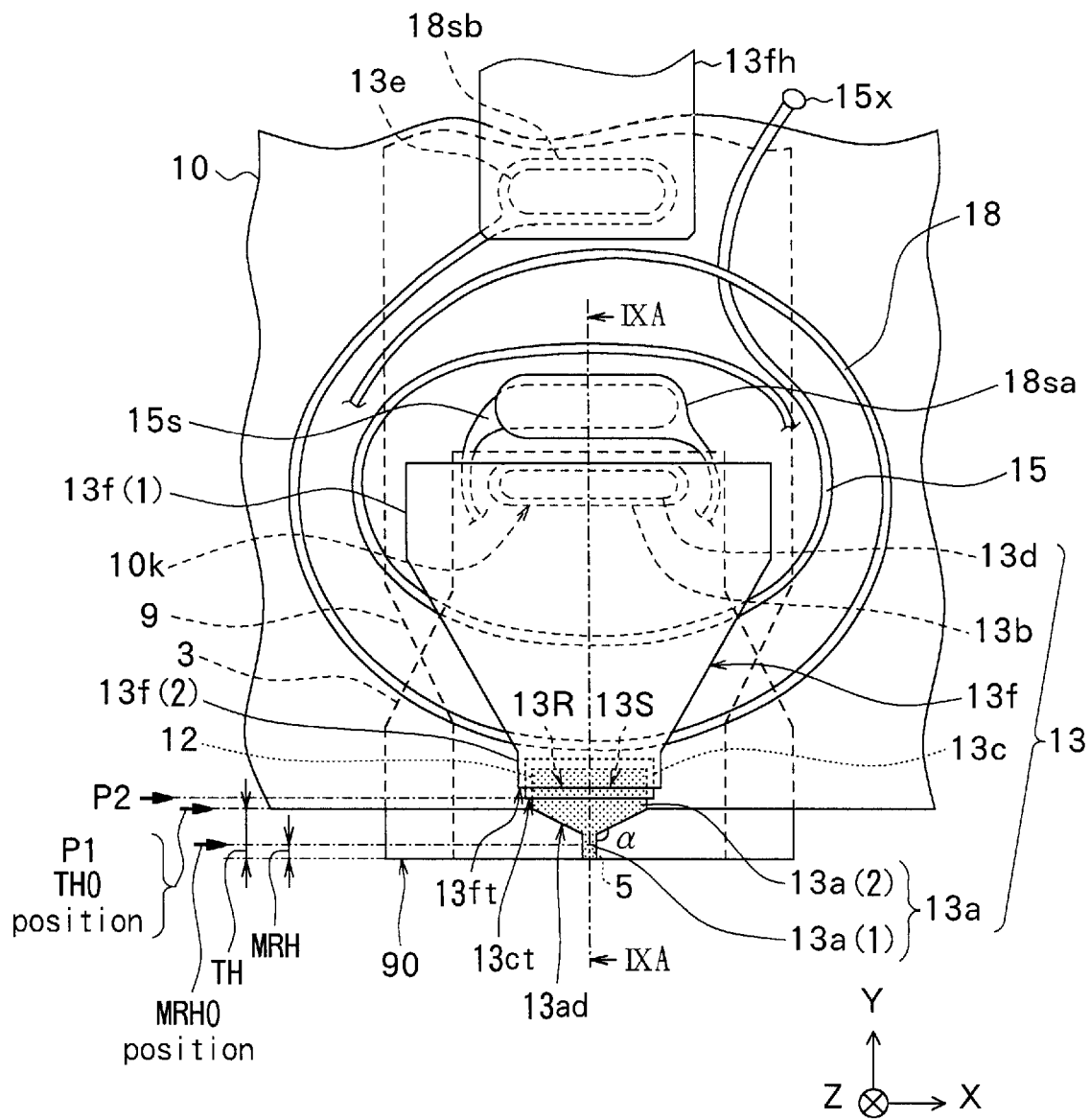
FIG. 17 is a plan view showing the plane structure of the thin film magnetic head according to the first embodiment of the invention.

Subsequently, as shown in FIGS. 3A, 3B and 10, the top pole tip 13a which will constitute part of the top pole 13 is selectively formed in a thickness of about 2.5 to 3.5 μm by, for example, frame plating in the region from the slope on the front side of the non-magnetic layer pattern 12 to the flat lower region of the write gap layer 11. At the time of forming the top pole tip 13a, simultaneously, the magnetic path connection portion 13b (not shown in FIG. 10) which will constitute part of the top pole 13 is formed in the opening 10k. The top pole tip 13a has, for example, a shape in plane as shown in FIG. 17 which will be described later. The top pole tip 13a includes, in accordance with the order from the side which becomes the air bearing surface 90 in the following process (the left side in FIG. 3), a front end part 13a(1) having a uniform width for defining a recording track width on a recording medium, and the rear end part 13a(2) having a wider width than the width of the front end part 13a(1). The structural characteristics of the top pole tip 13a will be described hereinafter. The front end part 13a(1) of the top pole tip 13a corresponds to an example of "uniform width portion" in the invention.

In the case of forming the top pole tip 13a by frame plating, first, on the underlayer, an electrode film (not shown) serving as a seed layer in electrolytic plating is formed in a thickness of about 70 nm by, for example, sputtering. The electrode film is made of, for example, Permalloy (Ni: 45 percent by weight and Fe: 55 percent by weight) having a high saturation magnetic flux density.

Then, for example, a positive photoresist (hereinbelow, simply referred to as "photoresist") is applied on the electrode film, and thereby a photoresist film (not shown) is formed. Subsequently, by using a photo mask (not shown) made of a metallic material such as chromium or the like having a pattern in a predetermined shape in plane, a predetermined region in the photoresist film is selectively exposed. Subsequently, by developing the exposed region in the photoresist film, a frame (outer frame) used at the time of performing plating according to the frame plating method, that is, a photoresist pattern (not shown) is formed. The photoresist pattern comprises an opening having a plane shape corresponding to the shape of the above exposed region.

At this time, the selective exposure to the photoresist film is not performed at once. As will be described hereinafter, for example, it is preferable to perform the selective exposure by dividing into a plurality of times and by using a plurality of kinds of photo masks having different openings and, after that, to develop the whole exposed region in a lump by a single developing process. Particularly, in the embodiment, for example, by using two kinds of photo masks having different openings from each other, the exposing process is performed twice to one and the same photoresist film through the openings of each photo mask. By developing the whole exposed region of the photoresist film in a lump, the photoresist pattern including the opening corresponding to the shape in plane of the top pole tip 13a is formed.

After forming the photoresist pattern by the above developing process, by using the electrode film formed in the above process as a seed layer and by growing a plate film made of, for example, Permalloy (for example, Ni: 45 percent by weight and Fe: 55 percent by weight) of a magnetic material having a high saturation magnetic flux density in the opening of the photoresist pattern by the electrolytic plating, the top pole tip 13a is formed. After that, the photoresist pattern is removed. The magnetic path connection portion 13b is also formed by using a material and a method similar to those of the case of the top pole tip 13a. As the material of the top pole tip 13a and the magnetic path connection portion 13b, besides Permalloy (Ni: 45 percent by weight and Fe: 55 percent by weight) as described above, iron nitride or amorphous alloy (such as cobalt iron alloy, cobalt iron nickel alloy, zirconium cobalt iron alloy oxide or the like) may be used.

Subsequently, as shown in FIGS. 4A, 4B and 11, by using the top pole tip 13a as a mask, the whole surface of the layer structure as mentioned above is etched about 0.3 to 0.4 μm by the RIE or the like. By the etching process, each part of the write gap layer 11 and the bottom pole 9 in the region on the front side of the position of the front end of the non-magnetic layer pattern 10 is selectively removed and etched. At the time of performing the above etching process, by adjusting etching conditions, part of the non-magnetic layer pattern 12 except the region where the top pole tip 13a is disposed is selectively removed. By the etching process, a pole part 100 having the trim structure is formed. The pole part 100 is constituted by the front end part 13a(1) of the top pole tip 13a, part corresponding to the front end part 13a(1) in the bottom pole 9, and part of the write gap layer 111 sandwiched between both of the parts. Each of these parts has almost the same width as one another. By using the RIE, the etching process to the write gap layer 11 and the bottom pole 9 can be performed in shorter time as compared with the case of using the ion milling. Especially, in the case of etching the write gap layer 11 and the bottom pole 9 by the RIE, it is suitable, for example, to use an etching gas containing at least one of chlorine and boron dichloride and to adjust processing temperature so as to be within the range from 100 to 200 degrees. The reason is that, under such conditions, a chemical reaction of the etching process on the bottom pole 9 is promoted and the etching process can be performed in shorter time.

Then, as shown in FIGS. 4A and 4B, an insulating film 14 made of alumina or the like is deposited in a thickness of about 0.3 to 0.5 μm by, for example, sputtering so as to cover the whole surface of the layer structure as mentioned above.

Figures 5A, 5B:
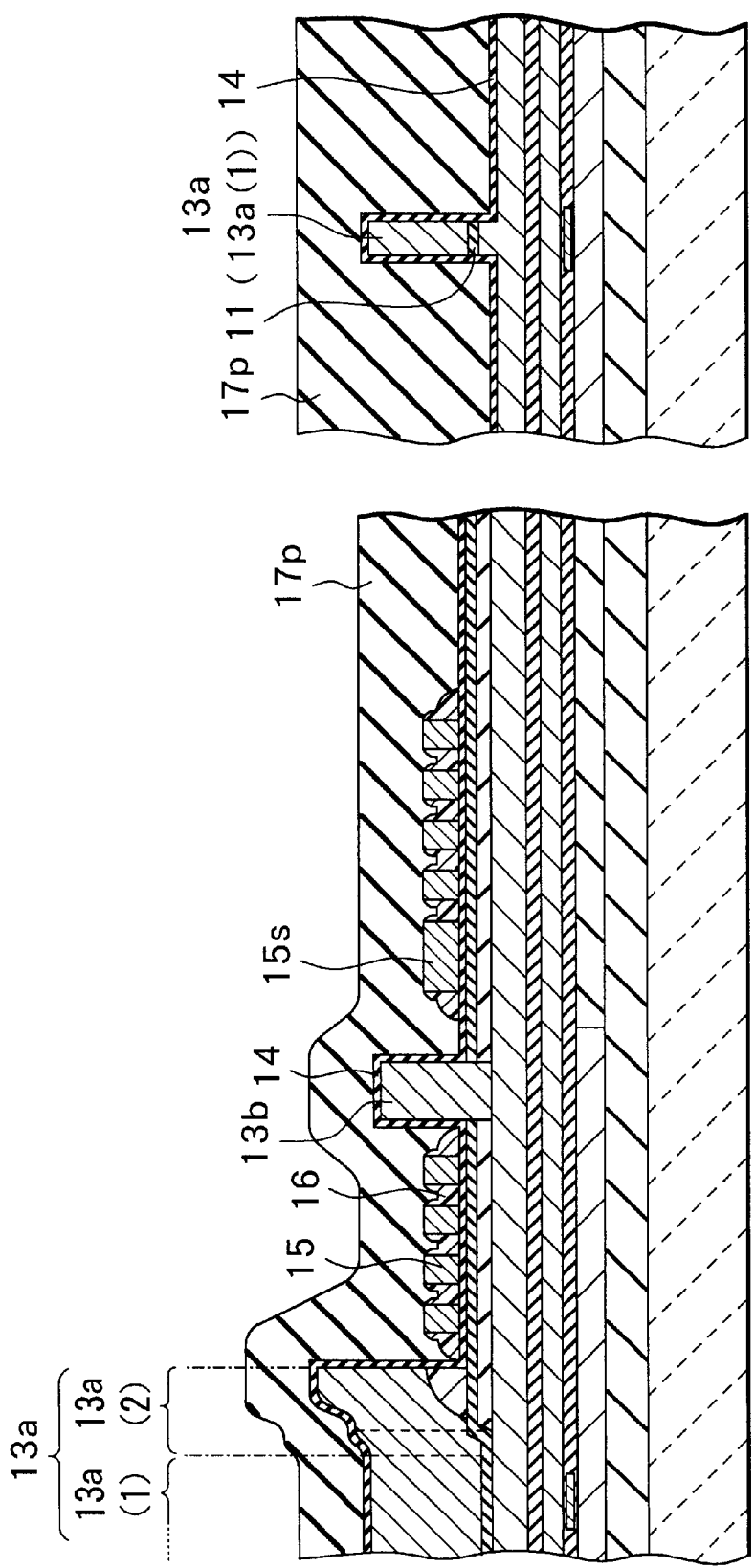
FIGS. 5A and 5B are cross sections for explaining a process subsequent to FIGS. 4A and 4B, respectively.

Then, as shown in FIGS. 5A and 5B, a thin film coil 15 of a first layer for an inductive recording head made of copper (Cu) or the like is selectively formed in a thickness of about 1.0 to 1.5 μm by, for example, electrolytic plating on the flat insulating film 14 in the region (except for the region where the magnetic path connection portion 13b is disposed) rearward of the region in which the top pole tip 13a is disposed. The thin film coil 15 has, for example, the structure of a spiral shape in plane as shown in FIG. 17 which will be described hereinafter. In the case of forming the thin film coil 15, simultaneously, for example, a coil connection portion 15s is formed integrally with the thin film coil 15 on the insulating film 14 at the inner terminating end of the thin film coil 15. The coil connection portion 15s is used to electrically connect the thin film coil 15 to a coil connection portion 18sa (refer to FIG. 7A) which will be formed in the following process.

Then, as shown in FIGS. 5A and 5B, a material which is fluidized when being heated, for example, an organic insulating material such as photoresist is formed in a predetermined pattern in the spacing between turns of the thin film coil 15 (including the coil connection portion 15s) and its peripheral region by a high-precision photolithography process. A heat treatment is conducted on the photoresist at a temperature in the range from, for example, 200 to 250 degrees. By the treatment, the photoresist is fluidized to fill the spacing between turns of the thin film coil 15, thereby forming an insulating film 16 for insulating between turns of the thin film coil 15. In the case of forming the insulating film 16, the insulating film 16 may not cover the top faces of both of the thin film coil 15 and the coil connection portion 15s (refer to FIG. 5), or may cover the top faces.

Then, as shown in FIGS. 5A and 5B, for example, an alumina layer 17p is deposited in a thickness of about 3.0 to 4.0 μm by sputtering or the like so as to cover the whole surface of the layer structure as mentioned above, thereby embedding the uneven structure region constituted by the top pole tip 13a, the magnetic path connection portion 13b, the thin film coil 15, the coil connection portion 15s, and the like.

Figures 6A, 6B:
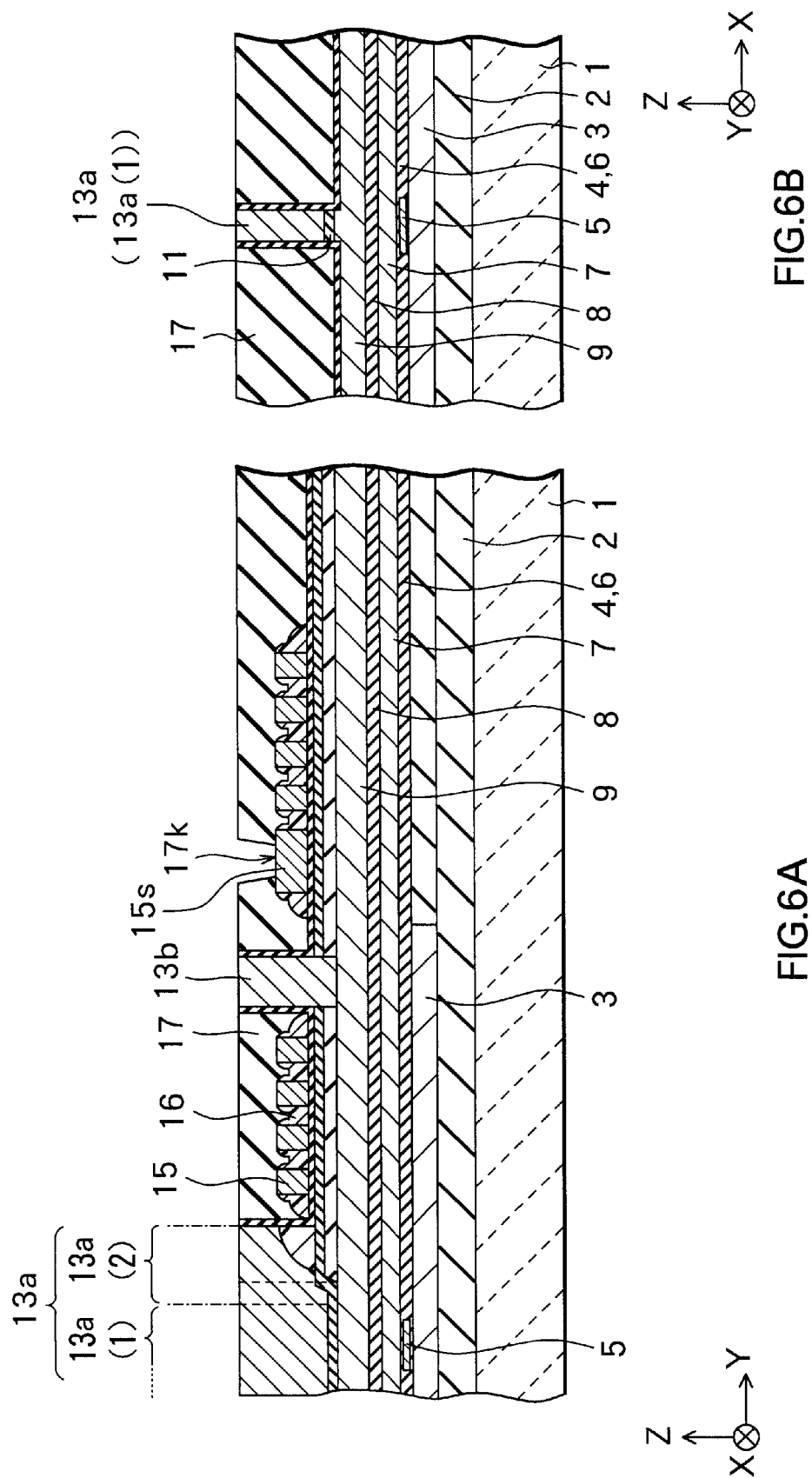
FIGS. 6A and 6B are cross sections for explaining a process subsequent to FIGS. 5A and 5B, respectively.

The entire surface of the alumina layer 17p is then polished by, for example, the CMP, so as to be planarized. By the operation, as shown in FIGS. 6A and 6B, an insulating film 17 that embeds the thin film coil 15, the insulating film 16 and the like is formed. The polishing process in this event is performed at least until both of the top pole tip 13a and the magnetic path connection portion 13b are exposed. The surface of the alumina layer 17p is polished so that the thickness of the polished top pole tip 13a becomes, for example, about 1.5 to 2.5 μm. By using an inorganic insulating material such as alumina to form the insulating film 17, different from the case of using a soft insulating material such as photoresist, the polishing face of a CMP table can be prevented from being clogged and the polished surface can be made smooth.

Subsequently, as shown in FIGS. 6A and 6B, part of the insulating film 17 covering the upper part of the coil connection portion 15s is partially etched and removed by, for example, RIE or ion milling so as to form an opening 17k for connecting the coil connection portion 15s and the coil connection portion 18sa (refer to FIGS. 7A and 7B) which will be formed in the following process.

Then, as shown in FIGS. 7A and 7B, on the planarized insulating film 17 on the upper part of the thin film coil 15, a thin film coil 18 of a second layer made of copper (Cu) or the like is selectively formed in a thickness of about 1.0 to 1.5 μm by electrolytic plating in a manner similar to the case of forming the first thin film coil 15. The thin film coil 18 has a plane structure similar to that of the thin film coil 15. In the case of forming the thin film coil 18, simultaneously, for example, the coil connection portion 18sa is formed integrally with the thin film coil 18 on the coil connection portion 15s at the terminating end on the inner side and a wiring connection portion 18sb is formed integrally with the thin film coil 18 on the insulating film 17 at the terminating end on the outer side. The thin film coil 15 and the thin film coil 18 are electrically connected to each other via the coil connection portions 15s and 18sa in the opening 17k. The wiring connection portion 18sb corresponds to an example of "coil end" in the invention.

Then, as shown in FIGS. 7A and 7B, an insulating film 19 is selectively formed in the spacing between turns of the thin film coil 18 (including the coil connection portion 18sa and the wiring connection portion 18sb) and its peripheral region by using the material and the forming method similar to those of the case of the insulating film 16. In the case of forming the insulating film 19, the insulating film 19 may not cover the top faces of each of the thin film coil 18 and the coil connection portion 18sa (refer to FIGS. 7A and 7B), or may cover the top faces. Since an intermediate connection pattern 13e for being in contact with and electrically connected to the wiring connection portion 18sb will be formed in the following process on the wiring connection portion 18sb, it is preferable that the surface of the wiring connection portion 18sb is not covered with the insulating film 19.

Then, as shown in FIGS. 7A and 7B, on a planarized upper surface of the rear end part 13a(2) in the top pole tip 13a, for example, by using a material and a forming method similar to those of the case of forming the bottom pole 9 or the like, the intermediate connection portion 13c which will constitute part of the top pole 13 is selectively formed in a thickness of about 2.0 to 3.0 μm. The intermediate connection portion 13c has; for example, a plane shape as shown in FIG. 17 which will be described hereinafter. The intermediate connection portion 13c is partially overlapped with and in contact with the rear end part 13a(2) in the top pole tip 13a. Both of the intermediate connection portion 13c and the rear end part 13a(2) are magnetically coupled to each other.

At the time of forming the intermediate connection portion 13c, simultaneously, a magnetic path connection portion 13d which will constitute part of the top pole 13 is formed on the magnetic path connection portion 13b, and the intermediate connection pattern 13e is formed on the wiring connection portion 18sb. At this time, the thin film coil 18 is covered with the insulating film 19, so that the thin film coil 18 is prevented from being damaged by an influence of the etching process or the like at the time of forming the intermediate connection portion 13c and the like. The intermediate connection pattern 13e is used to electrically connect the thin film coils 15 and 18 to a coil connection wiring 13fh (refer to FIG. 9A) which will be formed in the following process. The material, the method and the like for forming the magnetic path connection portion 13d and the intermediate connection pattern 13e are similar to those in the case of the intermediate connection portion 13c. In the case of forming the intermediate connection portion 13c, for example, the position of the front end of the intermediate connection portion 13c almost coincides with the position of the front end of the insulating layer pattern 12. For instance, the surface of the end edge portion on the front side of the intermediate connection portion 13c is inclined to the flat face of the underlayer. A group of the top pole tip 13a and the intermediate connection portion 13c corresponds to an example of "first magnetic layer portion" in the invention. A group of the magnetic path connection portions 13b and 13d corresponds to an example of "third magnetic layer portion" in the invention. The intermediate connection pattern 13e corresponds to an example of "coil connection pattern" in the invention. A group of the thin film coils 15 and 18, the coil connection portions 15s and 18sa, the wiring connection portion 18sb and the intermediate connection pattern 13e corresponds to an example of "thin film coil" in the invention.

Then, as shown in FIGS. 7A and 7B, for example, an alumina layer 20p is deposited in a thickness of about 3.0 to 4.0 μm by sputtering or the like so as to cover the entire surface of the layer structure as mentioned above, thereby embedding the uneven region constituted by the intermediate connection portion 13c, the magnetic path connection portion 13d, the intermediate connection pattern 13e, the thin film coil 18, and the like. A group of the insulating films 14, 16, 17 and 19 and the alumina layer 20p corresponds to an example of "coil embedding layer" in the invention.

Then, by polishing the whole surface of the alumina layer 20p by, for example, the CMP method so as to be planarized, as shown in FIGS. 8A and 8B, an insulating film 20 that embeds the thin film coil 18 and the like is formed. The polishing process at this time is performed at least until the intermediate connection portion 13c, the magnetic path connection portion 13d and the intermediate connection pattern 13e are exposed. A group of the insulating films 14, 16, 17, 19, and 20 corresponds to an example of "insulating layer" in the invention.

Then, as shown in FIGS. 9A and 9B, on the planarized surface of the region from the upper part of the magnetic path connecting portion 13d to the upper part of the intermediate connection portion 13c, a top yoke 13f which will constitute part of the top pole 13 is selectively formed in a thickness of about 2.0 to 3.0 μm. At the time of forming the top yoke 13f, simultaneously, a coil connection wiring 13fh is formed in the region extending from the upper part of the intermediate connection pattern 13e to an external circuit (not shown). The coil connection wiring 13fh is used for electrically connecting the intermediate connection pattern 13e to the external circuit (not shown). As a method of forming the top yoke 13f and the coil connection wiring 13fh, for example, the forming technique similar to that in the case of forming the above bottom pole 9 is used. More specifically, after depositing a magnetic material having a high saturation magnetic flux density such as iron nitride layer, the iron nitride layer is patterned through the etching process by the RIE. As a material of forming the top yoke 13f and the coil connection wiring 13fh, as similar to that in the case of forming the above bottom pole 9, besides iron nitride, Permalloy or an amorphous alloy (cobalt iron alloy, cobalt iron nickel alloy, or zirconium cobalt iron alloy oxide) or the like may be used.

The top yoke 13f has, for example, a plane shape as shown in FIG. 17 which will be described hereinafter, and includes a yoke part 13f(1) extending above the thin film coils 15 and 18 and a connection portion 13f(2) extending so as to partially overlap with the intermediate connection portion 13c in front of the yoke part 13f(1). The structural characteristics of the top yoke 13f will be described hereinafter. The rear part of the top yoke 13f is magnetically coupled to the bottom pole 9 sandwiching the magnetic path connection portions 13b and 13d via the opening 10k. The front part of the top yoke 13f is also magnetically coupled to the top pole tip 13a through the intermediate connection portion 13c. By disposing the top yoke 13f on the flat underlayer, the surface of the top yoke 13f becomes flat.

On formation of the top yoke 13f, for example, the position of its front end is set to recede from the position of the upper end on the front end edge surface of the intermediate connection portion 13c, and the position of its rear end is set to almost coincide with the position of the rear end of the magnetic path connection portions 13b and 13d. The stereoscopic structure around the connection portion 13f(2) at this time is as shown in FIG. 12. The top yoke 13f corresponds to an example of "second magnetic layer portion" in the invention, and the coil connection wiring 13fh corresponds to an example of "conductive layer pattern" in the invention. The top pole 13 constituted by the top pole tip 13a, the magnetic path connection portions 13b and 13d, the intermediate connection portion 13c, and the top yoke 13f corresponds to an example of "first magnetic layer" in the invention.

Then, as shown in FIGS. 9A and 9B, an overcoat layer 21 made of alumina or the like is formed in a thickness of about 20 to 40 μm by, for example, sputtering so as to cover the whole surface of the layer structure as mentioned above. Finally, an air bearing surface 90 of the recording head and the reproducing head is formed through machining and polishing, and thereby the thin film magnetic head is completed.

In the method of manufacturing the thin film magnetic head according to the present embodiment, as mentioned above, particularly, by performing the exposure twice on the same photoresist film by using two kinds of photo masks, the photoresist pattern which is used for forming the top pole tip 13a is formed. By using the photoresist pattern formed in such a method, especially, the front end part 13a(1) of the top pole tip 13a can be formed with high accuracy. In the following description, first, by referring to FIGS. 13A to 14B, the method of forming the top pole tip 13a as one of the characteristics of the method of manufacturing the thin film magnetic head according to the embodiment and the action and effects of the forming method will be explained in detail. Each denotation of the X, Y and Z axes directions in the drawings is as similar to the cases of FIGS. 1A to 12.

Figures 14A, 14B:
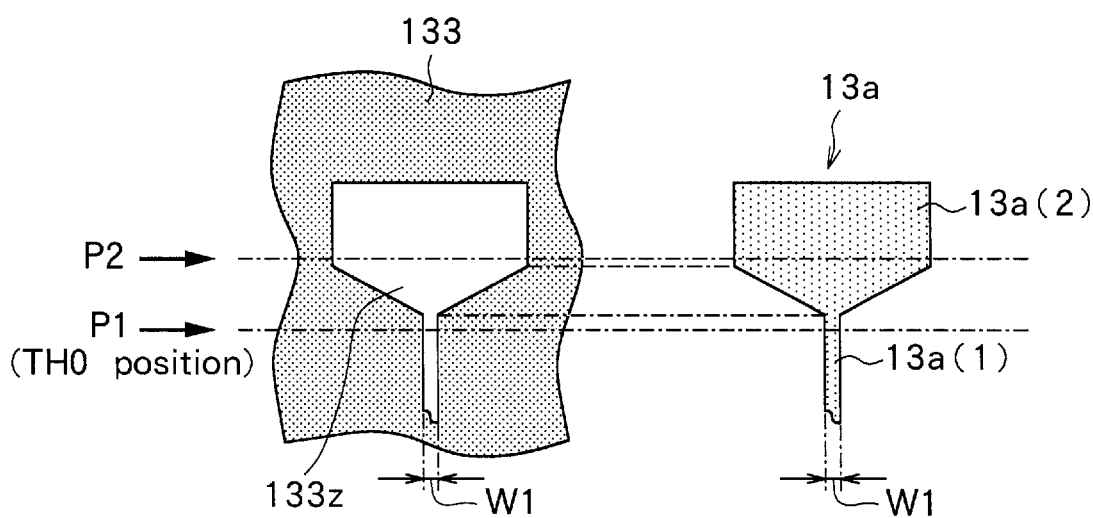
FIG. 14A is a plan view for explaining a process subsequent to FIG. 13D.
FIG. 14B is a plan view for explaining a process subsequent to FIG. 14A.

FIG. 13A shows a plane shape of a first photo mask 31 used in the first exposing process. FIG. 13B shows a plane shape of a region (first exposure region 131y) in a photoresist film 131 exposed by the first exposing process. FIG. 13C shows a plane shape of a second photo mask 32 used in the second exposing process. FIG. 13D shows a plane shape of a region (second exposure region 132y) in the photoresist film 131 exposed in the second exposing process. FIG. 14A shows a plane shape of a photoresist pattern 133 obtained by developing the whole exposure region (synthetic exposure region 133y) in the photoresist film 131 shown in FIG. 13D. FIG. 14B shows a plane shape of the top pole tip 13a formed by using the photoresist pattern 133.

The first photo mask 31 shown in FIG. 13A includes, for example, an opening 31x having a T-shape in plane. The opening 31x includes: a portion of a uniform width longer than the plane shape corresponding to the front end part 13a(1) in the top pole tip 13a (refer to FIG. 17); and a portion of a wider width which occupies the rear side. The uniform width is similar to a width W1 of the front end part 13a(1) of the top pole tip 13a finally formed. As shown in FIG. 13B, in the first exposing process, the first photo mask 31 is disposed in a predetermined position on the photoresist film 131, so as to allow a predetermined region in the photoresist film 131 to be selectively exposed via the opening 31x of the first photo mask 31.

The "predetermined position" on the photoresist film 131 at the time of disposing the first photo mask 31 corresponds to the position in which the front end part 13a(1) of the top pole tip 13a is formed in the following process. At the time of disposing the first photo mask 31, alignment is performed on the photoresist film 131 so that the rear end of the opening 31x is positioned on the front side with respect to a "position P2 (position of the front end of the non-magnetic layer pattern 12; refer to FIGS. 9, 12 and 17)". Specifically, the opening 31x is positioned in a region including the first step portion from the lower region to the upper region of the write gap layer 11 in the photoresist film 131 so that the whole of the front end part 13a(1) of the top pole tip 13a is formed on the lower region of the write gap layer 11. In such a state, the first exposing process is performed.

By the first exposing process, the first exposure region 131y is formed in the photoresist film 131 (refer to FIG. 13B). The first exposure region 131y is a region extending rearward with respect to the region corresponding to the front end part 13a(1) of the top pole tip 13a, but its rear end is set not to reach the position P2. As described above, according to the present embodiment, by performing the first exposing process only in the portion formed on the write gap layer 11 on the front side with respect to the region of disposing the non-magnetic layer pattern 12 in the photoresist film 131, the exposure region can be prevented from being enlarged for the following reason.

While, as explained in FIGS. 2A and 2B, a level difference between the surface of the upper region and the surface of the lower region of the write gap layer 11 in the first step portion is about 0.5 to 1.0 μm corresponding to the thickness of the non-magnetic layer pattern 10, a level difference between the surface of the non-magnetic layer pattern 12 in the second step portion and the surface of the upper region of the write gap layer 11 is about 1.0 μm corresponding to the thickness of the non-magnetic layer pattern 12. That is, a larger difference in level is made in the second step portion than the first step portion. Additionally, while the whole surface on the front side of the non-magnetic layer pattern 12 forms a slope in the second step portion, only part of the surface on the front side of the non-magnetic layer pattern 10 forms a slope in the first step portion. That is, the proportion occupied by the slope region in the first step portion is small, as compared with the proportion occupied by the slope region in the second step portion. Generally, in the case of performing the exposing process on the underlayer including the slope portion, numbers of rays of light reflecting in the lateral or oblique directions from the slope portion occur. In such a case, a portion other than the original exposure region in the photoresist film 131 is also exposed due to the influence of the reflection light, and thereby the exposure region is enlarged. The larger a level difference in a step portion becomes and the larger the proportion occupied by the slope region in the step portion becomes, the more conspicuous such a tendency becomes. In the embodiment, since the first exposing process is carried out on the underlayer that includes only the first step portion and does not include the second step portion, the tendency of expansion of the exposure region is suppressed as compared with the case where the first exposing process is performed on the underlayer including the second step portion. The first exposure region 131y corresponds to an example of "first region" in the invention.

In the embodiment, an adverse influence by defocusing (going out of focus) due to variations in the height of the underlayer can be also avoided. Specifically, for example, the best focal point at the time of exposure naturally varies in the flat region and the inclined region. Consequently, when both of the regions are exposed in a lump, defocusing occurs in one of or both of the flat region and the inclined region. In the case where the underlayer includes a step portion, the larger the level difference in the step portion becomes, the more conspicuous such a tendency becomes. In the embodiment, since the first exposing process is performed on the underlayer including only the first step portion where the level difference is small, the focusing state at the time of exposure can be made appropriate, as compared with the case where the first exposing process is performed on the underlayer including the second step portion where the level difference is large. Consequently, especially, sharp patterning of the microscopic uniform width portion corresponding to the front end part 13a(1) in the top pole tip 13a can be performed.

A second photo mask 32 shown in FIG. 13C includes an opening 32x having a shape in plane corresponding to the rear end part 13a(2) (refer to FIG. 17) in the top pole tip 13a. As shown in FIG. 13D, in the second exposing process, after the second photo mask 32 is disposed in a predetermined position on the photoresist film 131 having the first exposure region 131y, a predetermined region in the photoresist film 131 is selectively exposed through the opening 32x of the second photo mask 32. By the second exposing process, the second exposure region 132y is formed in the photoresist film 131. When the second photo mask 32 is disposed, the front end of the opening 32x is positioned on the front side of the position of the rear end of the first exposure region 131y. By the operation, part (the upper part in the drawing) of the rear side in the first exposure region 131y and part (the lower part in the drawing) of the front side in the second exposure region 132y are partially overlapped, and thereby the synthetic exposure region 133y including the overlapped region is formed. The shape in plane of the synthetic exposure region 133y corresponds to the shape in plane of the top pole tip 13a. The second exposure region 132y corresponds to an example of "second region" in the invention.

Finally, by developing the synthetic exposure region 133y in the photoresist film 131 in a lump, the photoresist pattern 133 having an opening 133z as shown in FIG. 14A is formed. The shape in plane of the opening 133z corresponds to the shape in plane of the top pole tip 13a, in which the plane shape of the synthetic exposure region 133y shown in FIG. 13D is approximately reflected. Therefore, by performing the frame plating by using the photoresist pattern 133, as shown in FIG. 14B, especially, the width of the front end part 13a(1) becomes the design width W1 and the top pole tip 13a can be formed with high precision so that the width of the front end part 13a(1) is uniform throughout the whole region.

Referring now to FIGS. 15A to 16B, more useful action and effects in the case of using the above-described method of forming the top pole tip 13a will be described.

In the example shown in FIG. 13D, length L10 of the region in which the first exposure region 131y and the second exposure region 132y are overlapped with each other is sufficiently assured. However, for example, when there is a demand of setting the length of the rear end part 13a(2) to be short, it is necessary to shorten the length L10 of the overlapped region as much as possible. When the length L10 is too long, the first exposure region 131y exceeds the "position P2" and extends onto the second step portion. As a result, an influence by the reflection light reflected from the slope portion of the non-magnetic layer pattern 12 enlarges the exposure region. Consequently, it is preferable to shorten the length L10 of the overlapped region of both of the exposure regions as much as possible.

When the length L10 is, however, excessively shortened by, for example, making the first exposure region 131y have only the part of the uniform width as shown in FIG. 15A, the following inconveniences occur. To be specific, in the first exposing process, the rear end part of the first exposure region 131y is rounded by the influence of a slight amount of reflection light reflected by the surface of the slightly uneven region of the underlayer. As a result, as shown in FIG. 15B, the part corresponding to the overlapped part of the first exposure region 131y and the second exposure region 132y in the opening 133z of the photoresist pattern 133 which is finally formed becomes extremely narrow and a shape as gathered up. The above-described part corresponding to the overlapped part in the photoresist pattern 133 is reflected in the shape of the connection portion of the front end part 13a(1) and the rear end part 13a(2) of the top pole tip 13a formed by using the photoresist pattern 133. That is, the connection portion of the front end part 13a(1) and the rear end part 13a(2) in the top pole tip 13a becomes a narrowed shape. Such a shape of the top pole tip 13a seriously disturbs the propagation of the magnetic flux from the rear end part 13a(2) to the front end part 13a(1).

In contrast to the above, in the embodiment, since the first exposure region 131y has a shape like a letter T, as shown in FIG. 16A for example, even when the rear part of the first exposure region 131y is rounded, a connection portion with a sufficient width is formed in the part corresponding to the overlapped part of the first exposure region 131y and the second exposure region 132y in the photoresist pattern 133 which is finally formed (FIG. 16B). In such a case, the width of the part corresponding to the connection portion between the front end part 13a(1) and the rear end part 13a(2) of the top pole tip 13a which is finally formed is sufficiently assured, so that the magnetic flux smoothly propagates from the rear end part 13a(2) to the front end part 13a(1). Thus, sufficient overwrite characteristics can be assured.

Other effects of the method of manufacturing the thin film magnetic head according to the embodiment other than the above will now be described.

In the embodiment, since the intermediate connection pattern 13e is disposed on the wiring connection portion 18sb so that the top face of the intermediate connection pattern 13e is positioned higher than the top faces of both of the intermediate connection portion 13c and the magnetic path connection portion 13d (refer to FIG. 7A), when each of these parts is covered with the alumina layer 20p and then the surface of the alumina layer 20p is polished, the intermediate connection pattern 13e, together with both of the intermediate connection portion 13c and the magnetic path connection portion 13d, can be also exposed (refer to FIG. 8A). Consequently, different from the case where the intermediate connection pattern 13e is not formed, a process of forming the opening by removing part of the insulating film 20 in order to connect the wiring connection portion 18sb and the coil connection wiring 13fh is unnecessary. Moreover, since the intermediate connection pattern 13e is formed in the same process as both of the intermediate connection portion 13c and the magnetic path connection portion 13d, a new process for forming the intermediate connection pattern 13e is not required. Therefore, the number of manufacturing steps can be reduced.

Additionally, in the embodiment, as the material of forming the insulating films 16 and 19 to fill the spacing between each turns of the thin film coil 15 (including the coil connection portion 15s) and the thin film coil 18 (including the coil connection portion 18sa and the wiring connection portion 18sb), an organic insulating material such as photoresist which shows fluidity when being heated is used. Consequently, different from the case of using an inorganic insulating material such as alumina which does not show fluidity when being heated, the spacing between each turns of the thin film coils 15 and 18 and the like can be filled up so that each turns of the thin film coils 15 and 18 can be certainly insulated.

Additionally, in the embodiment, since the top yoke 13f is made to be formed on the flat underlayer after being polished, the top yoke 13f can be formed with high precision. This is because, due to the surface of the iron nitride layer as a preparatory layer for forming the top yoke 13f being flat, patterning of the iron nitride layer by etching can be performed with high precision. Such an effect is similarly taken in the case where the intermediate connection portion 13c, the magnetic path connection portion 13d, the coil connection wiring 13fh and the like are, besides the top yoke 13f, formed on the flat underlayer.

<Structure of Thin Film Magnetic Head>

Referring now to FIGS. 9A, 9B, 12 and 17, the structure of the thin film magnetic head according to the embodiment will be described.

FIG. 17 schematically shows the plane structure of the thin film magnetic head manufactured by the method of manufacturing the thin film magnetic head according to the embodiment. In FIG. 17, the insulating films 14, 16, 17, 19 and 20, the overcoat layer 21 and the like are omitted. Only the outermost regions are shown with respect to the thin film coils 15 and 18. FIG. 9A corresponds to a cross section taken along line IXA—IXA in FIG. 17. Each denotation of the X, Y and Z axes directions in FIG. 17 is as similar to the cases of FIGS. 1A to 16B.

The position of the front end of the non-magnetic layer pattern 10 is the position as a reference at the time of determining the throat height (TH), that is, the throat height zero position (THO position). The throat height (TH) is specified as a length from the position (THO position) of the front end of the non-magnetic layer pattern 10 to the position of the air bearing surface 90. "MRHO position" in the drawings denotes the position of the rear end of the MR film 5, that is, the MR height zero position. The MR height (MRH) is a length from the MR height zero position to the position of the air bearing surface 90.

The top pole 13 is constituted by, for instance, the top pole tip 13a, the magnetic path connection portions 13b and 13d, the intermediate connection portion 13c, and the top yoke 13f, each of which is separately formed. That is, the top pole 13 is a collection of those parts.

The top yoke 13f, for example, includes the yoke part 13f(1) having a large area for housing the magnetic flux generated by the thin film coils 15 and 18 and the connection portion 13f(2) having a uniform width narrower than that of the yoke part 13f(1). For example, the rear part of the yoke part 13f(1) has almost uniform width and the front part is gradually narrowed toward the air bearing surface 90. The connection portion 13f(2) is wider than, for example, the intermediate connection portion 13c which will be described hereinafter. However, the invention is not necessarily limited to such a case. For example, the connection portion 13f(2) may be narrower than the intermediate connection portion 13c.

The intermediate connection portion 13c has, for example, a rectangular shape in plane and the width thereof is wider than that of the rear end part 13a(2) in the top pole tip 13a. However, the width of the intermediate connection portion 13c may be narrower than that of the rear end part 13a(2).

For example, the top pole tip 13a includes the front end part 13a(1) and the rear end part 13a(2) in accordance with the order from the air bearing surface 90 side. Each of these parts has, for example, an almost rectangular shape in plane. The front end part 13a(1) has an almost uniform width throughout the whole area, and the width defines the recording track width at the time of recording. The width of the rear end part 13a(2) is wider than that of the front end part 13a(1). That is, in the connection portion between the front end part 13a(1) and the rear end part 13a(2), a step in the width direction is formed.

The front end part 13a(1) extends on the flat lower region of the write gap layer 11. The rear end part 13a(2) extends from the lower region of the write gap layer 11 toward the slope of the non-magnetic layer pattern 12. A front edge face 13ct of the intermediate connection portion 13c is positioned, for example, rearward of the THO position, and nearly coincides with the position of the front end of the non-magnetic layer pattern 12. A front edge face 13ft of the top yoke 13f is positioned, for example, rearward of the front edge face 13ct of the intermediate connection portion 13c. That is, both of the intermediate connection portion 13c and the top yoke 13f are disposed away from the air bearing surface 90. The disposing positions of the intermediate connection portion 13c and the top yoke 13f are not always limited to the above case. For instance, the position of the edge face 13ct may nearly coincide with the THO position, or both of the positions of the edge face 13ct and the edge face 13ft may nearly coincide with the THO position. The center in the width direction of the top yoke 13f, that of the intermediate connection portion 13c and that of the top pole tip 13a coincide with each other.

At the step portion of the front end part 13a(1) and the rear end part 13a(2) in the top pole tip 13a, it is preferable to set an angle α at the corner where a step face 13ad on the rear end part 13a(2) side and a side edge face of the front end part 13a(1) cross each other, for example, within the range from 90 to 120 degrees, in order to make the magnetic flux smoothly flow from the rear end part 13a(2) to the front end part 13a(1). For reference sake, FIG. 17 shows the case where the angle α is, for example, about 120 degrees.

Part on the front side of the top yoke 13f is overlapped with and magnetically coupled to part of the intermediate connection portion 13c. Part of the intermediate connection portion 13c is overlapped with and magnetically coupled to part of the rear end part 13a(2) of the top pole tip 13a. On the other hand, part on the rear side of the top yoke 13f is also magnetically coupled to the bottom pole 9 sandwiching the magnetic path connection portions 13b and 13d in the opening 10k. That is, by connecting the top pole 13 (the top pole tip 13a, the magnetic path connection portions 13b and 13d, the intermediate connection portion 13c, and the top yoke 13f) and the bottom pole 9, a propagation path of the magnetic flux, that is, a magnetic path is formed.

The position P1 of the front end of the non-magnetic layer pattern 10, for example, lies within the region where the rear end part 13a(2) in the top pole tip 13a extends. For example, the non-magnetic layer pattern 10 is disposed in a wide range including the regions in which the top pole 13 and the thin film coils 15 and 18 are disposed (excluding the region where the magnetic connection portions 13b and 13d are formed). For example, the position P2 of the front end of the non-magnetic layer pattern 12 is rearward of the position P1 (THO position) of the front end of the non-magnetic layer pattern 10, and the non-magnetic layer pattern 12 is disposed in the lower region of the rear part of the rear end part 13a(2) in the top pole tip 13a.

As shown in FIG. 17, both of the thin film coils 15 and 18 are a coil winding member having a spiral shape in plane. The coil connection portion 15s and a terminal 15x are formed respectively at the inner terminating end and the outer terminating end of the thin film coil 15. Both are integral with the thin film coil 15. The coil connection portion 18sa and the wiring connection portion 18sb are formed respectively at the inner terminating end and the outer terminating end of the thin film coil 18. Both are integral with the thin film coil 18. The thin film coils 15 and 18 are electrically connected to each other via the coil connection portions 15s and 18sa. Additionally, the intermediate connection pattern 13e is formed on the wiring connection portion 18sb, and the thin film coils 15 and 18 and the coil connection wiring 13fh are electrically connected to each other via the wiring connection portion 18sb and the intermediate connection pattern 13e. Both of the terminal 15x and the rear end part (not shown) of the coil connection wiring 13fh are connected to an external circuit (not shown), and a current can be passed through the thin film coils 15 and 18 by the external circuit.

Next, referring to FIGS. 9A, 9B, 12 and 17, the action of the thin film magnetic head according to the embodiment will be described.

First, the basic operation of the thin film magnetic head, that is, an operation of recording data onto a recording medium and an operation of reproducing the data from the recording medium will be briefly described.

In the thin film magnetic head according to the embodiment, when current is passed to the thin film coils 15 and 18 via the external circuit (not shown) at the time of recording information, magnetic flux is accordingly generated. The magnetic flux generated at this time propagates through the top yoke 13f from the yoke part 13f(1) to the connection portion 13f(2), and further propagates through the intermediate connection portion 13c and the rear end part 13a(2) of the top pole tip 13a which are magnetically coupled to the top yoke 13f, and then to the front end part 13a(1). The magnetic flux propagated to the front end part 13a(1) further reaches the front end thereof on the air bearing surface 90 side, thereby generating a signal magnetic field for recording on the outside very near to the write gap layer 11. By the signal magnetic field, the magnetic recording medium is partially magnetized so as to be able to record information.

On the other hand, upon reproducing, a sense current is passed through the MR film 5 in the reproducing head. Because a resistance value of the MR film 5 changes according to a signal magnetic field for reproducing from the magnetic recording medium, by detecting the change in resistance on the basis of a change in the sense current, information recorded on the magnetic recording medium can be read out.

Action and Effect of Thin Film Magnetic Head

Referring now to FIGS. 9A, 9B, 12 and 17, the characteristic action and effects of the thin film magnetic head according to the embodiment will be described.

Figure 32:
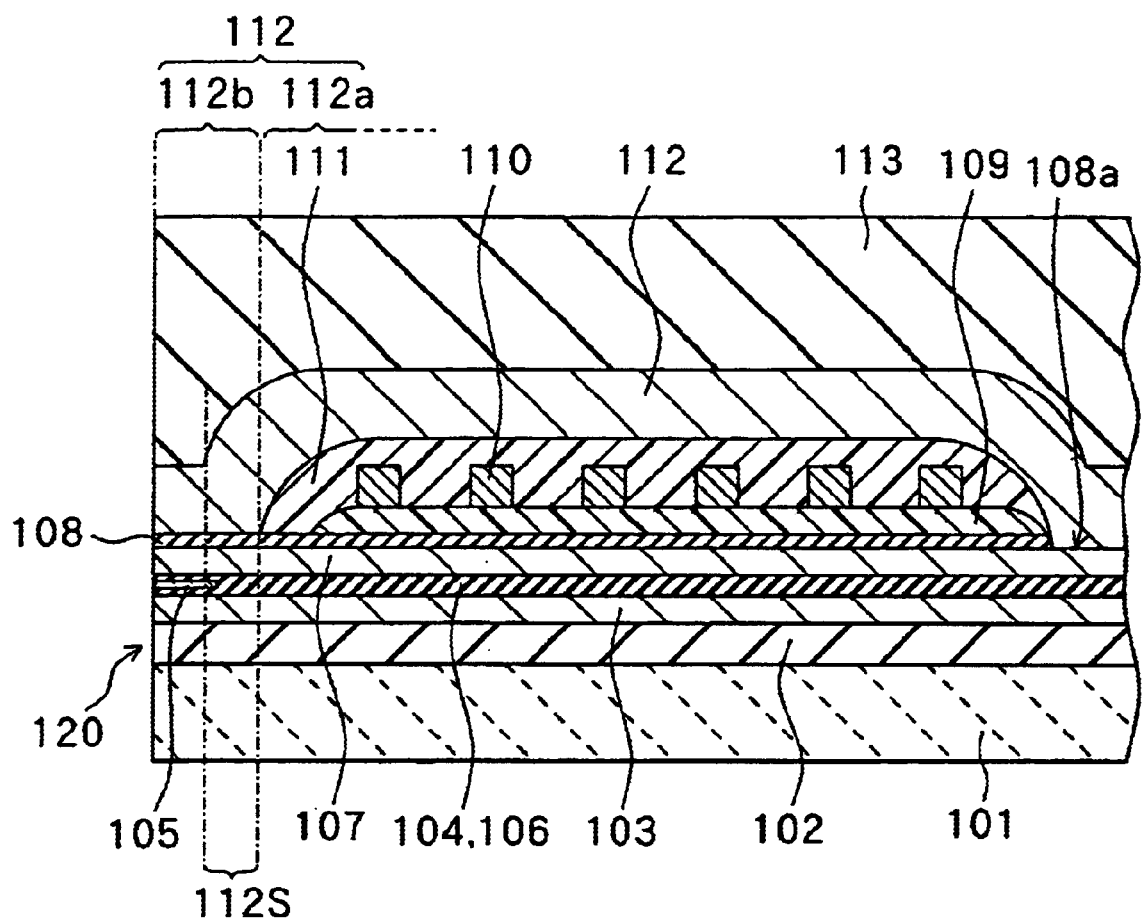
FIG. 32 is a cross section for explaining a process subsequent to FIG. 31.
Figure 33:
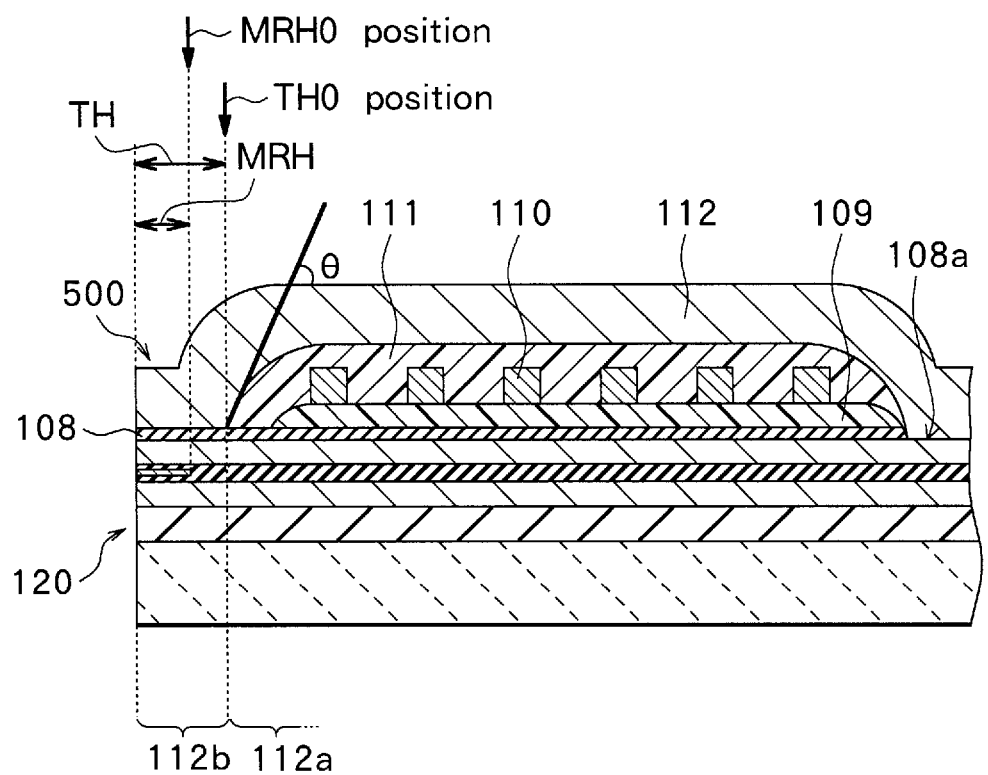
FIG. 33 is a cross section showing the structure of the main part of the thin film magnetic head of the related art.
Figure 34:
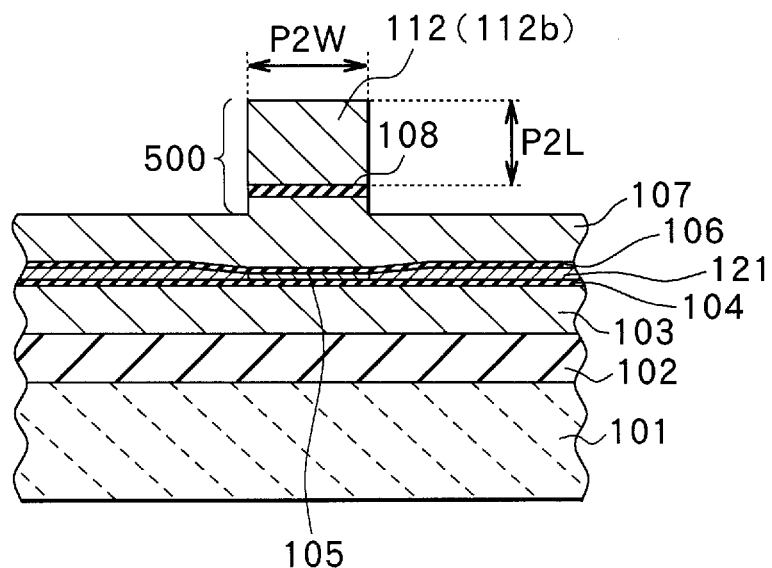
FIG. 34 is a cross section taken parallel to the air bearing surface of the pole part in the thin film magnetic head shown in FIG. 31.
Figure 35:
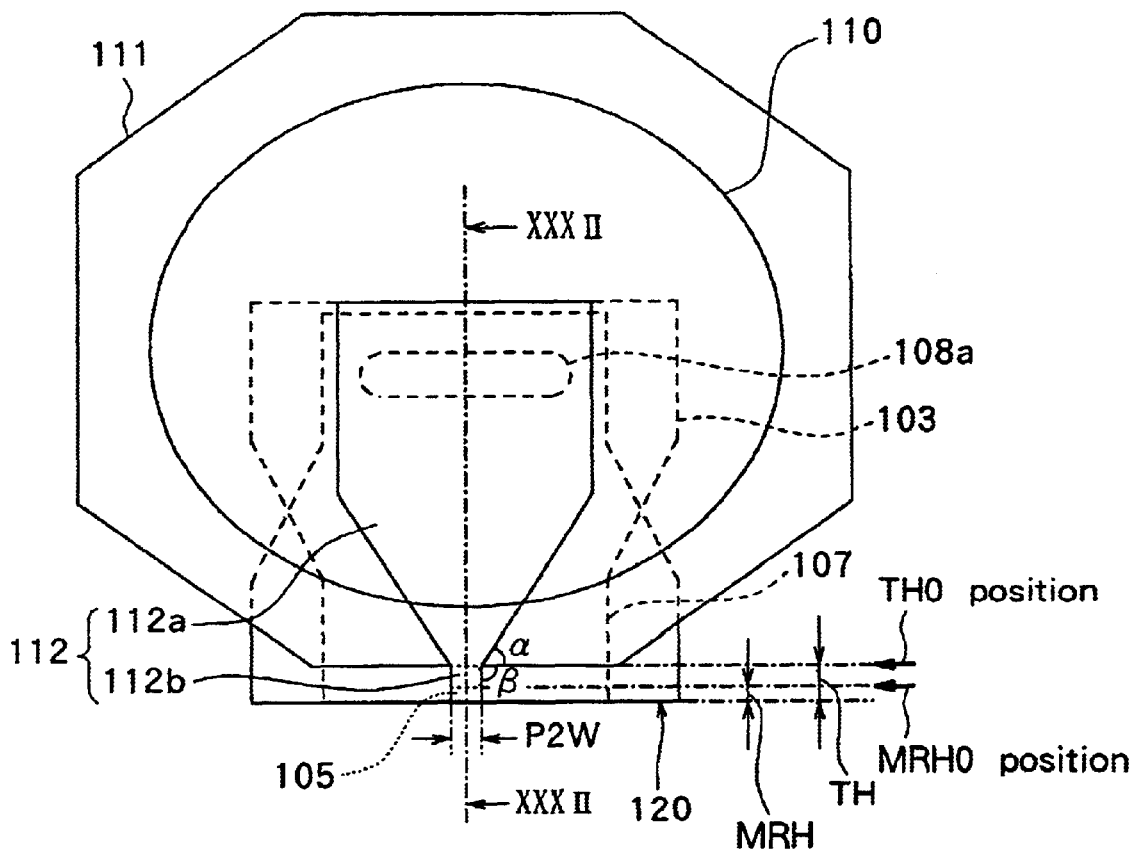
FIG. 35 is a plan view showing the structure of the thin film magnetic head of the related art.

In the thin film magnetic head according to the embodiment, between the rear end part 13a(2) in the top pole tip 13a and the bottom pole 9, the non-magnetic layer pattern 10 made of alumina and the non-magnetic layer pattern 12 made of photoresist film are disposed in accordance with the order from the side near to the bottom pole 9. Both of the non-magnetic layer pattern 10 and the non-magnetic layer pattern 12 have a function as a "magnetic flux shielding member" which suppresses the flow of the magnetic flux (leakage of the magnetic flux) from the upper region toward the lower region. By the existence of the non-magnetic layer patterns 10 and 12, the propagation of the magnetic flux (leakage of the magnetic flux) from the top pole tip 13a to the bottom pole 9 can be suppressed better than the case where only the thin write gap layer 11 is disposed between the top pole tip 13a and the bottom pole 9. Additionally, by the existence of the non-magnetic layer patterns 10 and 12, the propagation of the magnetic flux from the bottom pole 9 to the top pole tip 13a can be also suppressed. Especially, in the embodiment, parts of the non-magnetic layer patterns 10 and 12 are disposed in the region corresponding to the region 112S shown in FIG. 32, that is, the region 13S corresponding to a face 13R (hereinbelow, also simply referred to as "magnetic connection face") with which part of the rear end part 13a(2) of the top pole tip 13a and part of the intermediate connection portion 13c are overlapped and in contact, so that the propagation of the magnetic flux between the top pole tip 13a and the bottom pole 9 can be more certainly suppressed. As a result, different from the conventional case shown in FIG. 32, the magnetic flux flowed into the top pole tip 13a can be supplied to the front end of the front end part 13a(1) without any big loss, and the excellent overwrite characteristic can be therefore assured. Furthermore, as the above-described "leakage of the magnetic flux" is suppressed, it is suppressed that the magnetic flux reaches parts other than the recoding head (for example, the MR film 5 in the reproducing head). Consequently, inconveniences caused by the "leakage of the magnetic flux" on operating the thin film magnetic head (for example, reading-in fault or the like) can be also avoided.

In the embodiment, the front end of the non-magnetic layer pattern 12 is positioned rearward of the forefront end of the non-magnetic layer pattern 10, so that the step is formed between both of them. Consequently, part of the magnetic flux flowed into the top pole tip 13a is, while propagating along the above step portion, concentrated in accordance with a step-by-step decrease of the magnetic volume. The "magnetic volume" is the permissible volume of the magnetic flux that can be accommodated in the parts (for example, the front end part 13a(1), the rear end part 13a(2) and the like) constituting the propagation path of the magnetic flux. As described above, the magnetic flux in the top pole tip 13a is made to flow smoothly, so that the necessary and sufficient volume of the magnetic flux can be supplied to the front end of the front end part 13a(1). From this viewpoint, the embodiment also contributes to the assurance of the excellent overwrite characteristic.

Furthermore, in the embodiment, since the portion around the front end of each of the non-magnetic layer patterns 10 and 12 forms a slope, the flow of the magnetic flux in the top pole tip 13a over each of the slope portions can be smoothed.

Furthermore, in the embodiment, since Permalloy, iron nitride, amorphous alloy (such as cobalt iron alloy, cobalt iron nickel alloy or zirconium cobalt iron alloy oxide) or the like, which has a high saturation magnetic flux density, is used as a material of forming the top pole 13 (including the top pole tip 13a or the like) and the bottom pole 9, the magnetic flux in the top pole 13 and the bottom pole 9 can be made to propagate smoothly.

Furthermore, in the embodiment, since the surface of the front end edge of the intermediate connection portion 13c is inclined relative to the flat face of the underlayer, the flow of the magnetic flux from the intermediate connection portion 13c into the top pole tip 13a can be smoothed.

Furthermore, in the embodiment, since the front end of each of the intermediate connection portion 13c and the top yoke 13f is positioned rearward of and apart from the position of the air bearing surface 90, the magnetic flux can be prevented from being directly discharged from these parts toward the air bearing surface 90 side. Thus, occurrence of a side-erasing phenomenon can be prevented.

<Modification of the First Embodiment>

Although the top pole tip 13a is formed by performing the exposing process twice in the method of manufacturing the thin film magnetic head according to the embodiment, it is not always limited to the above. For example, it can be formed by performing the exposing process three times or more. In such a case, effects similar to those in the case of the foregoing embodiment can be obtained as well. Additionally, the magnetic layer portions other than the top pole tip 13a, such as the magnetic path connection portions 13b and 13d, the intermediate connection portion 13c, the intermediate connection pattern 13e, the top yoke 13f, the coil connection wiring 13fh and the like are not always formed through a plurality of exposing processes. Each of them may be formed through a single exposing process. The method of forming the magnetic layer portion by the plurality of exposing processes as described above is useful in the case where, in the magnetic layer portions (such as the top pole tip 13a) which is constituted including a part A (such as the front end part 13a(1)) with an extremely narrow width, at least the part A is formed on the flat region of the underlayer which has both of the inclined region and the flat region. When the region in which the magnetic layer portion is formed is flat, in order to simplify the forming process, it is preferable to form the magnetic layer portion by a single exposing process.

Furthermore, although the top shield layer 7, the top pole tip 13a and the like are formed through the electrolytic plating in the embodiment, the invention is not always limited to the method. For example, as similar to the case of forming the bottom pole 9, after forming the preparatory layer made of a predetermined material (such as iron nitride) by sputtering, each of the above parts may be formed by etching and patterning the preparatory layer with a mask made of a predetermined material having a predetermined shape. As the etching method in such a case, besides the above-described RIE, the ion milling can be used. However, in the case where it is desired that the patterning of the preparatory layer be completed in a shorter time, it is suitable to use the RIE.

Furthermore, although the photoresist is used as the material of forming the insulating films 16 and 19 in the embodiment, the invention is not necessarily limited to the above. For example, polyimide resin, SOG (Spin On Glass) and the like which are fluidized when being heated in a manner similar to the photoresist may be used.

Furthermore, in the embodiment, as the material of forming the top pole 13 (including the top pole tip 13a, the top yoke 13f and the like), the bottom pole 9 and the like, Permalloy, iron nitride, amorphous alloy or the like, each of which has a high saturation magnetic flux density, is used. Besides the materials, for example, iron nickel cobalt alloy (CoNiFe) may be used. In such a case, it is suitable to set the ratio of metal components in the iron nickel cobalt alloy, for example, to Co:Ni:Fe=30:30:40 (percent by weight). The iron nickel cobalt alloy of such a composition has a high saturation magnetic flux density equal to or higher than that of the above-described Permalloy or the like.

Furthermore, although Permalloy having the composition of Ni:Fe=80:20 (percent by weight) is used as the material of forming the bottom shield layer 3 and the top shield layer 7 in the embodiment, the invention is not necessarily limited to the material but iron nitride or amorphous alloy (such as cobalt iron or zirconium cobalt iron) may be used. Permalloy of another composition (for example, Ni:Fe=45 percent by weight: 55 percent by weight or the like) may be used.

Furthermore, although alumina is used as the material of forming the write gap layer 11 and the sputtering is used as the forming method in the embodiment, the invention is not necessarily limited to the above. As the material of forming the write gap layer 11, besides alumina, for example, an inorganic insulating material such as aluminum nitride (AlN), silicon oxide, or silicon nitride may be used, or a non-magnetic metal such as tantalum (Ta), titanium tungsten alloy (WTi) or titanium nitride (TiN) may be also used. As a method of forming the write gap layer 11, besides the sputtering, CVD (Chemical Vapor Deposition) may be also used. By forming the write gap layer 11 by using such a method, it can be suppressed that a pin hole or the like is included in the gap layer. Therefore, this point also contributes to avoiding the leakage phenomenon of the magnetic flux via the write gap layer 11.

Figure 18:
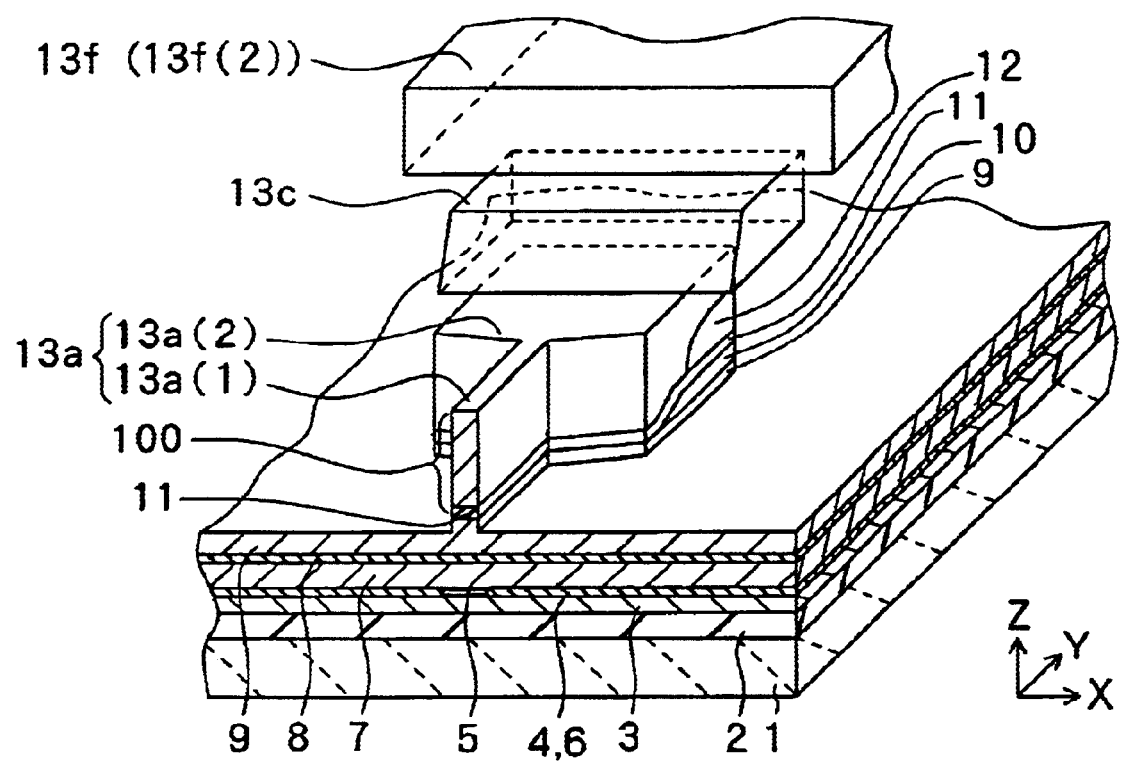
FIG. 18 is a perspective view showing a modification of the thin film magnetic head according to the first embodiment of the invention.

Furthermore, in the embodiment, as shown in FIG. 12, when the pole part 100 is formed by the etching process, part of each of the write gap layer 111 and the bottom pole 9 in a region on the front side of the position of the front end of the non-magnetic layer pattern 10 is etched to be dug down. However, the invention is not always limited to the case. For example, as shown in FIG. 18, the write gap layer 11, the non-magnetic layer pattern 10, the bottom pole 9 and the like in a region except for the region where the top pole tip 13a is disposed may be uniformly etched to be dug down. The structure in FIG. 18 except for the above-mentioned is similar to that shown in FIG. 12.

Figures 19A, 19B:
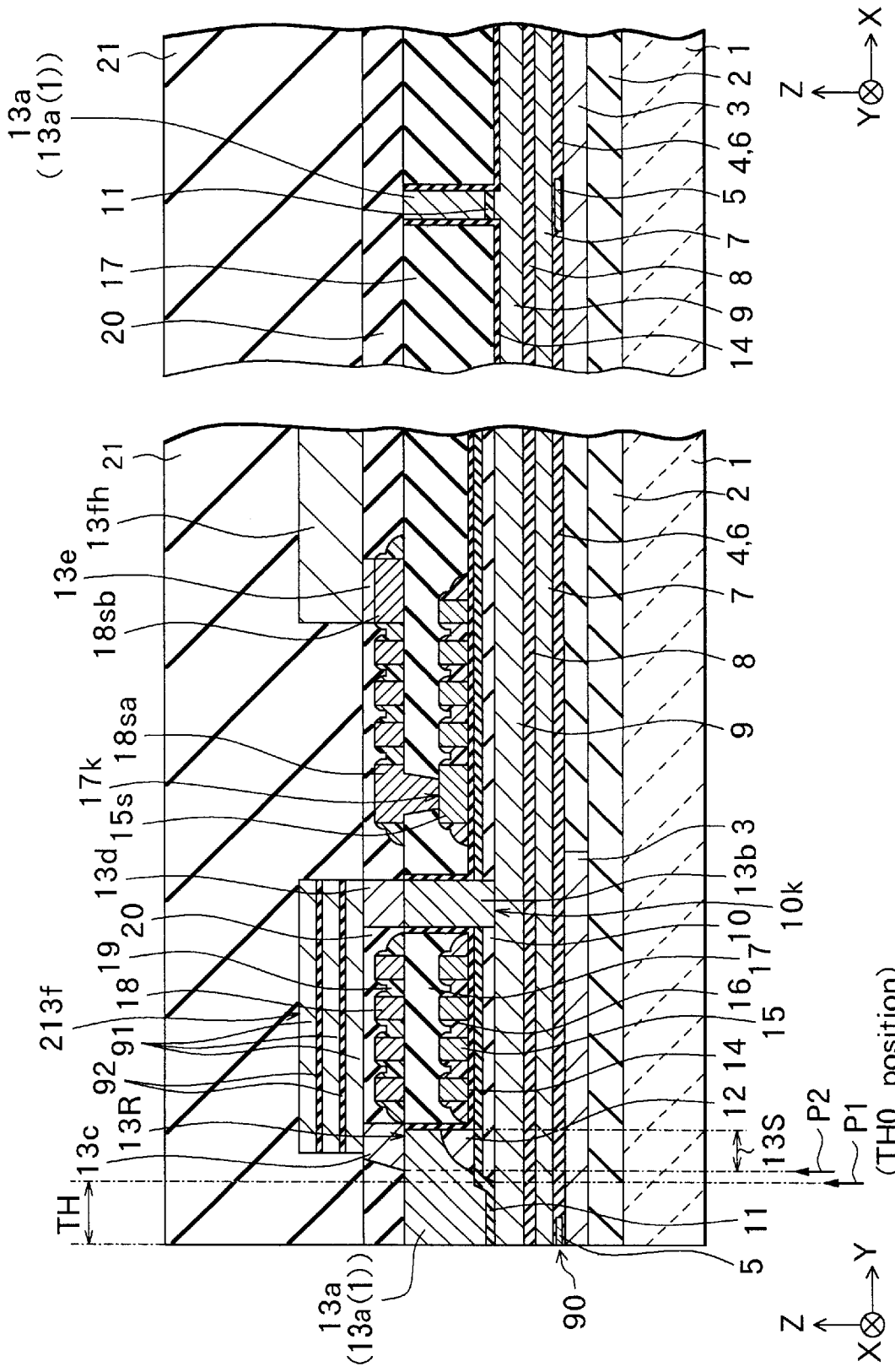
FIGS. 19A and 19B are cross sections showing another modification of the thin film magnetic head according to the first embodiment of the invention.

Furthermore, although the case where the top yoke (13f) is constructed of a single layer structure of Permalloy has been described in the embodiment (refer to FIG. 9A), the invention is not necessarily limited to the case. For example, as shown in FIGS. 19A and 19B, the top yoke may have a structure (213f) in which layers 91 made of a material having a high saturation magnetic flux density such as Permalloy and layers 92 made of an inorganic insulating material such as alumina are alternately stacked. By making the top yoke have such a structure, occurrence of eddy currents in the magnetic path can be prevented, and high frequency characteristics can be improved. The structure in FIGS. 19A and 19B except for the above-mentioned is similar to that in FIGS. 9A and 9B.

Furthermore, although the top shield layer 7 and the bottom pole 9 are formed separately from each other and the insulating film 8 is interposed between both of them in the embodiment, the invention is not necessarily limited to the arrangement. For example, the insulating film 8 may not be interposed between both of them. In such a case, the top shield layer 7 and the bottom pole 9 may be integrally formed so as to be a single layer.

Furthermore, in the embodiment, the coil connection portions 15s and 18sa are disposed at the inner terminating ends of the thin film coils 15 and 18, respectively, and the wiring connection portion 18sb is disposed at the outer terminating end of the thin film coil 18. The invention is not necessarily limited to the arrangement. For example, the disposing positions of the coil connection portions 15s and 18sa may be changed from the inner side to the outer side, and the disposing position of the wiring connection portion 18sb may be changed from the outer side to the inner side. In such a case, in association with the change in the disposing position of the wiring connection portion 18sb, it is preferable to similarly change the disposing positions of the intermediate connection pattern 13e and the coil connection wiring 13fh.

Second Embodiment

A second embodiment of the invention will now be described.

Figures 23A, 23B:
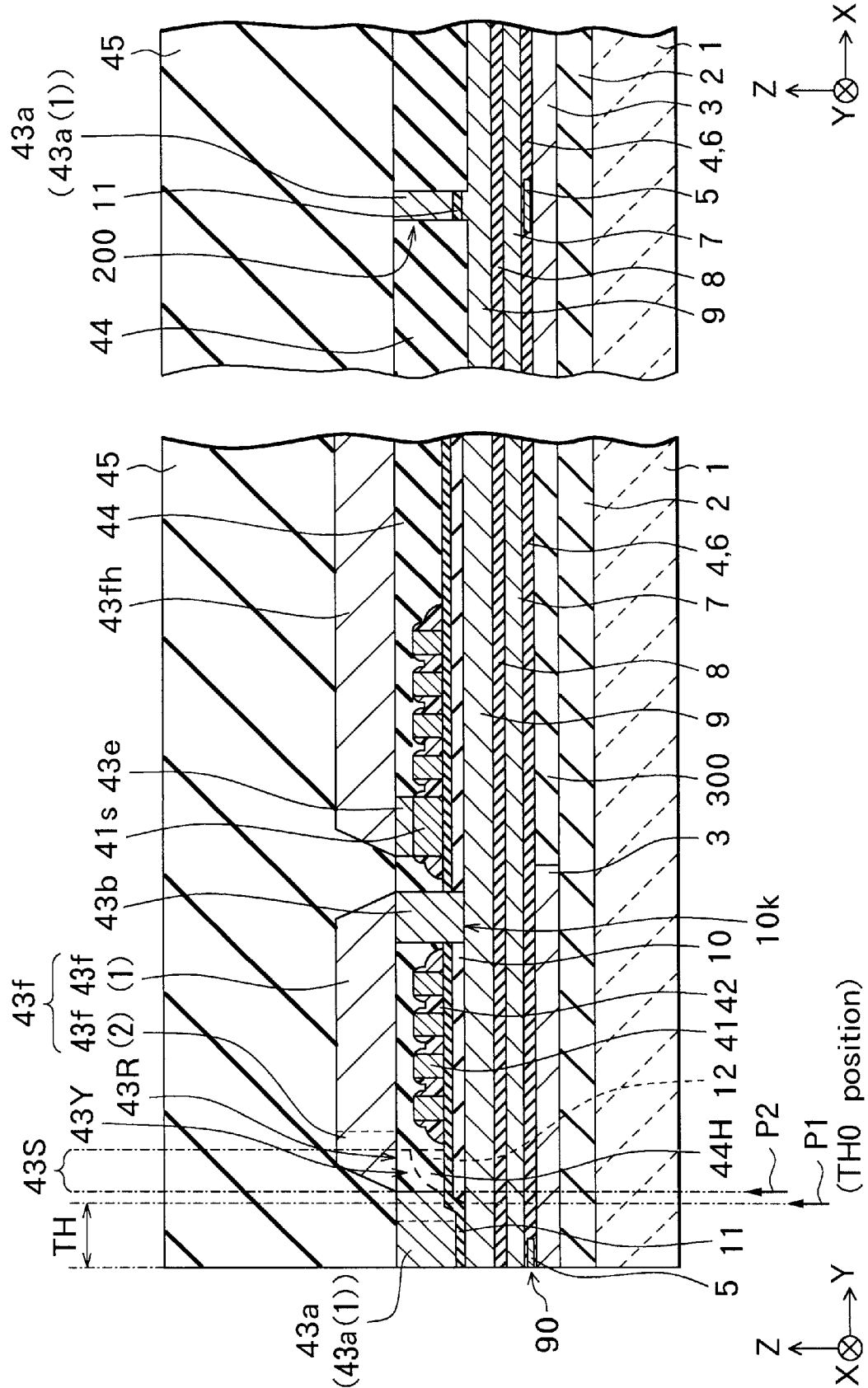
FIGS. 23A and 23B are cross sections for explaining a process subsequent to FIGS. 22A and 22B, respectively.
Figure 24:
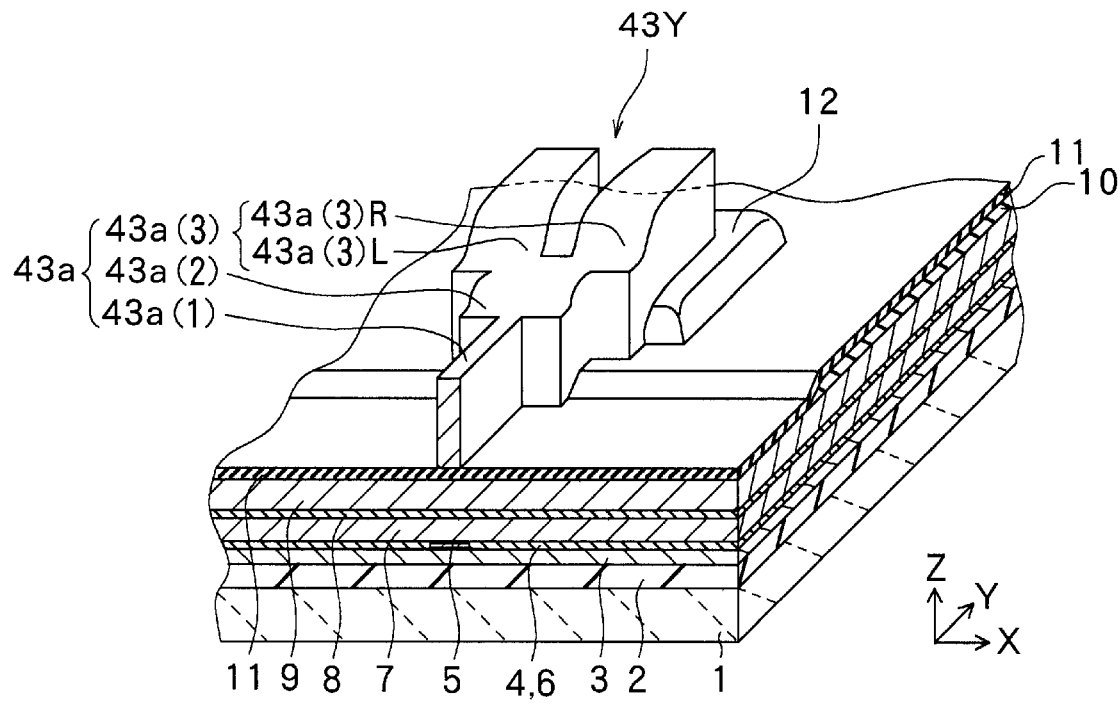
FIG. 24 is a perspective view corresponding to the cross sections shown in FIGS. 21A and 21B.
Figure 25:
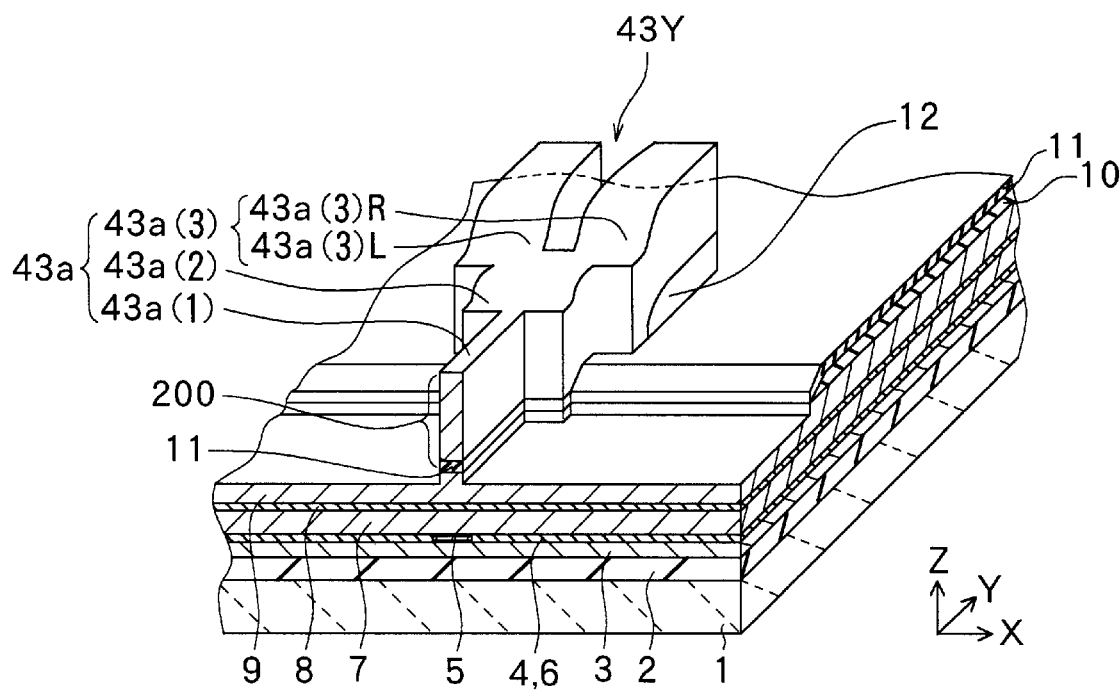
FIG. 25 is a perspective view corresponding to the cross sections shown in FIGS. 22A and 22B.
Figure 26:
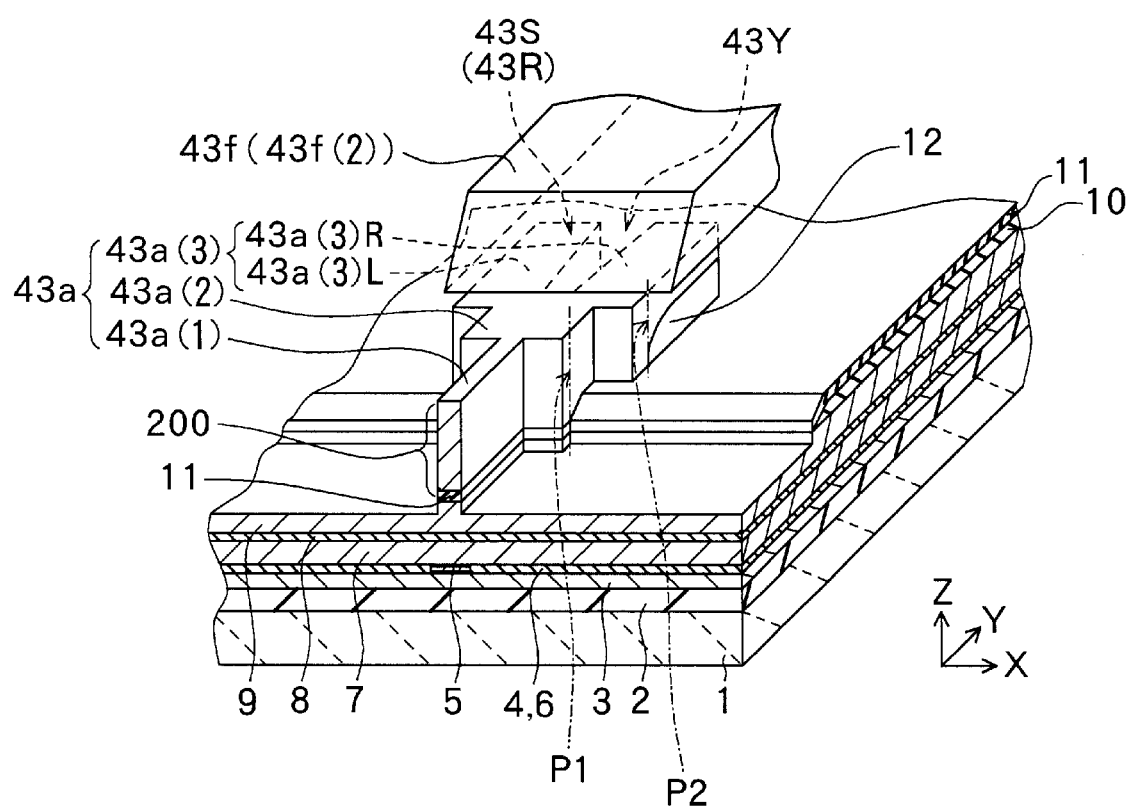
FIG. 26 is a perspective view corresponding to the cross sections shown in FIGS. 23A and 23B.

First, by referring to FIGS. 20A to 26, a method of manufacturing a composite thin film magnetic head as a method of manufacturing a thin film magnetic head according to the second embodiment of the invention will be described. FIGS. 20A, 21A, 22A and 23A show cross sections, each perpendicular to the air bearing surface. FIGS. 20B, 21B, 22B and 23B show cross sections, each parallel to the air bearing surface of the pole part. FIGS. 24 to 26 are perspective views corresponding to main manufacturing processes. FIG. 24 corresponds to the state shown in FIGS. 20A and 20B. FIG. 25 corresponds to the state shown in FIGS. 21A and 21B. FIG. 26 corresponds to the state shown in FIGS. 23A and 23B. In FIG. 26, the insulating film 44, the overcoat layer 45 and the like in FIG. 23 are omitted. In FIGS. 20 to 26, the X, Y and Z axis directions in each of the drawings denote the directions similar to those in the above-described first embodiment. In each of the drawings, the same components as those in the first embodiment are designated by the same reference numerals.

Figures 20A, 20B:
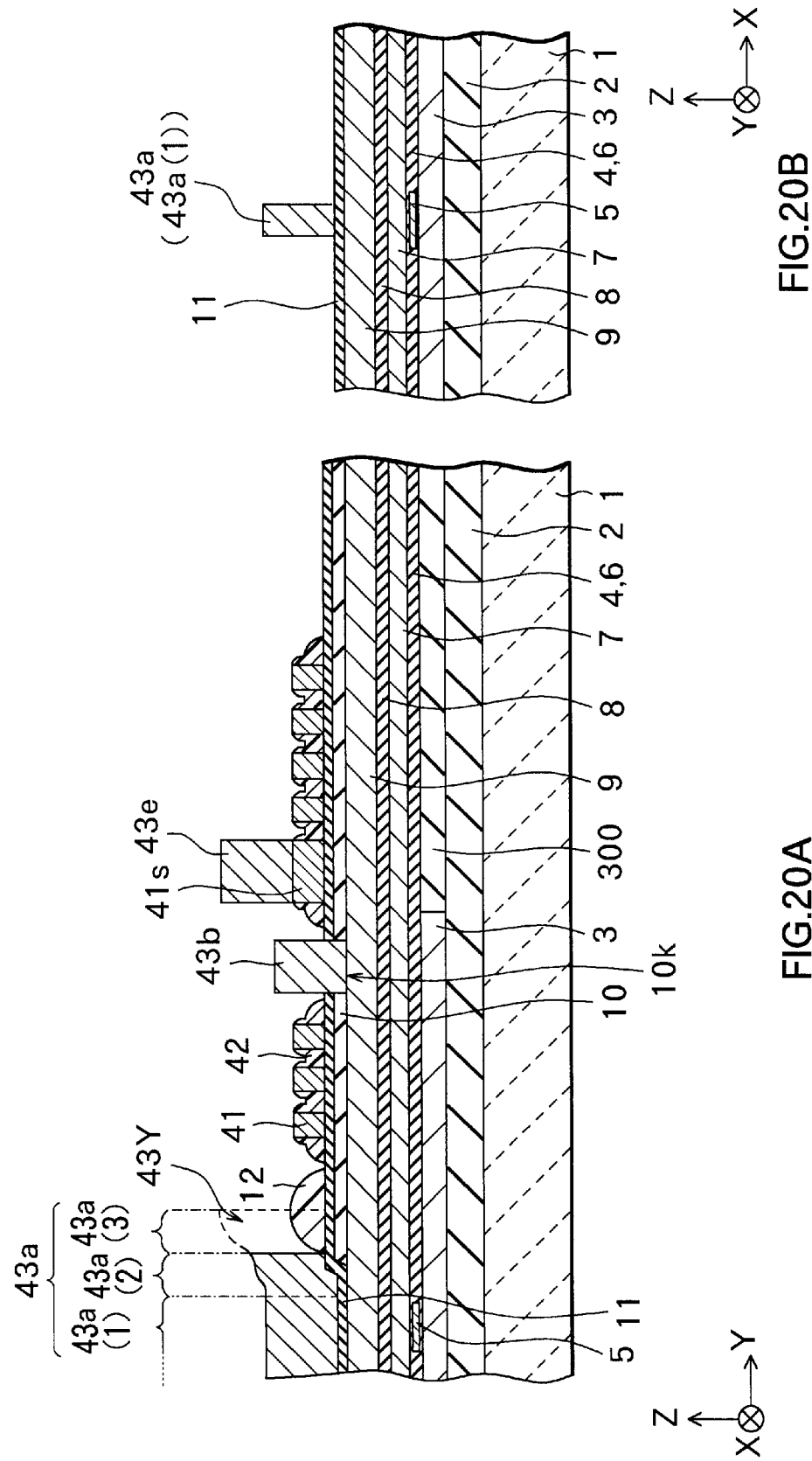
FIGS. 20A and 20B are cross sections for explaining a process in a method of manufacturing a thin film magnetic head according to a second embodiment of the invention.

In the method of manufacturing the thin film magnetic head according to the embodiment, since the processes until the non-magnetic layer pattern 12 is formed in FIGS. 20A and 20B are similar to those shown in FIGS. 3A and 3B in the first embodiment, the description is omitted here.

In the embodiment, after forming the non-magnetic layer pattern 12, as shown in FIGS. 20A and 20B, a thin film coil 41 for an inductive-type recording head made of copper (Cu) or the like is selectively deposited in a thickness of about 1.0 to 1.5 $\mu$m on the region rearward of the non-magnetic layer pattern 12 in the flat upper region of the write gap layer 11 by, for example, electrolytic plating. The thin film coil 41 has a structural characteristic similar to, for example, that of the thin film coil 15 in the first embodiment. In the case of forming the thin film coil 41, simultaneously, for example, on the write gap layer 11 at the inner terminating end, a wiring connection portion 41s is formed integrally with the thin film coil 41. The wiring connection portion 41s is used to electrically connect the thin film coil 41 to a coil connection wiring 43fh (refer to FIG. 23A) formed in the following process. The wiring connection portion 41s corresponds to an example of "coil end" in the invention.

Subsequently, as shown in FIGS. 20A and 20B, in spacing between turns of the thin film coil 41 (including the wiring connection portion 41s) and the peripheral region thereof, an insulating film 42 made of photoresist or the like is formed so as to be in a predetermined pattern by high-precision photolithography. The structural characteristic and the forming method of the insulating film 42 are similar to those in the case of the insulating films 16 and 19 in the first embodiment.

Figure 27:
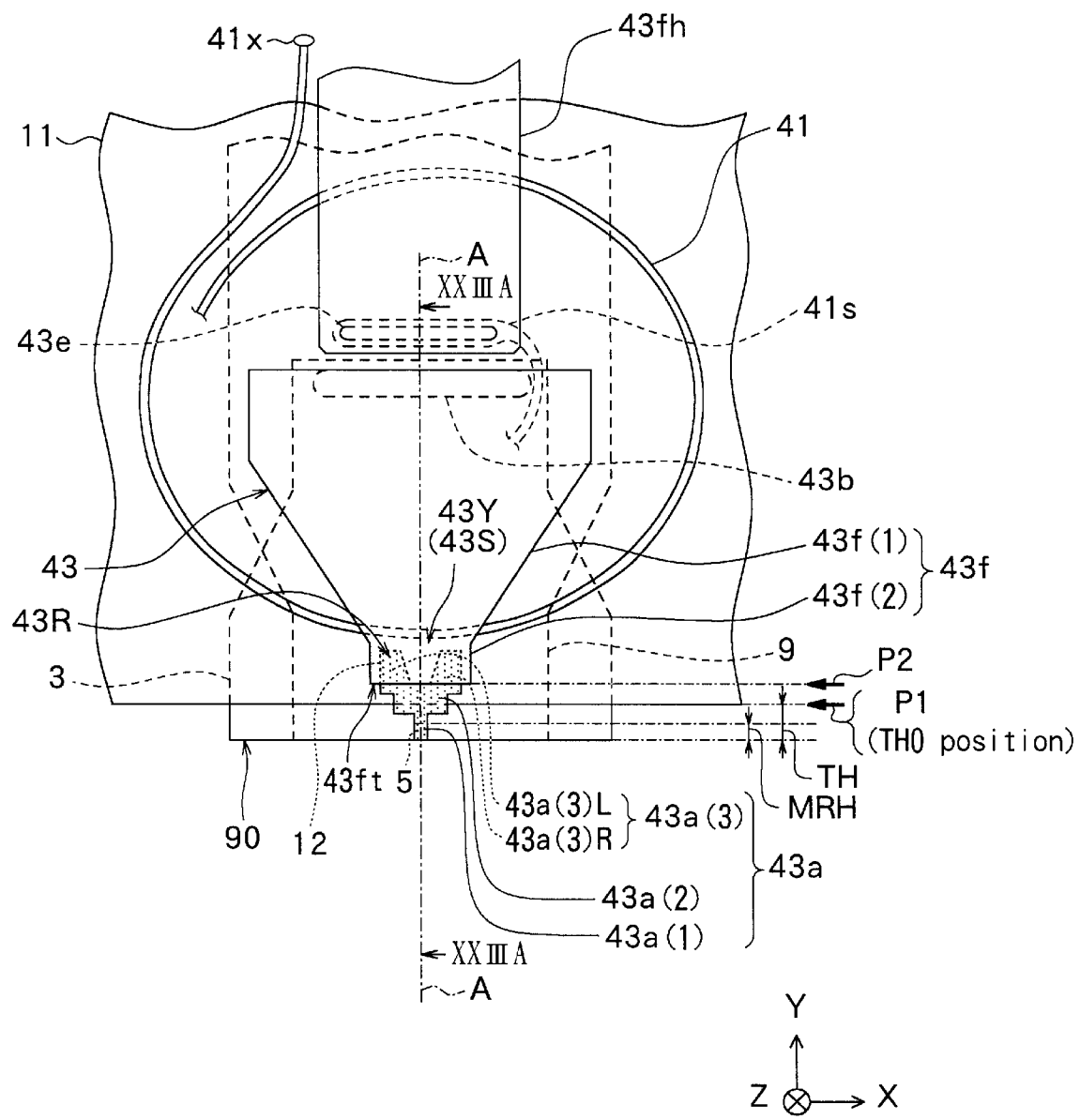
FIG. 27 is a plan view showing the plane structure of the thin film magnetic head according to the second embodiment of the invention.

Subsequently, as shown in FIGS. 20A, 20B and 24, on the region from the front slope of the non-magnetic layer pattern 12 to the flat lower region of the write gap layer 11, a top pole tip 43a which will constitute part of a top pole 43 is selectively formed in a thickness of about 2.5 to 3.5 μm by, for example, frame plating. The top pole tip 43a, for example, has a plane shape as shown in FIG. 27 which will be described hereinafter, and includes a front end part 43a(1), an intermediate part 43a(2), and a rear end part 43a(3) consisting of a right rear end part 43a(3)R and a left rear end part 43a(3)L which are disposed so as to be separated from each other in the width direction. In the case of forming the top pole tip 43a, for example, the position of the end edge of the intermediate part 43a(2) on a region 43Y surrounded by the intermediate part 43a(2) and two rear end parts (the right rear end part 43a(3)R and the left rear end part 43a(3)L) is made to almost coincide with the position of the front end of the non-magnetic layer pattern 12. The structural characteristics of the top pole tip 43a will be described hereinafter. In the case of forming the top pole tip 43a, simultaneously, a magnetic path connection portion 43b which will constitute part of the top pole 43 is formed in the opening 10k, and an intermediate connection pattern 43e is formed on the wiring connection portion 41s (not shown in FIG. 24). The intermediate connection pattern 43e is used to electrically connect the thin film coil 41 and the coil connection wiring 43fh (refer to FIG. 23A) which will be formed in the following process.

The top pole tip 43a corresponds to an example of "first magnetic layer portion" in the invention. The magnetic path connection portion 43b corresponds to an example of "third magnetic layer portion" in the invention. The front end part 43a(1) corresponds to an example of "uniform width portion" in the invention. The intermediate part 43a(2) corresponds to an example of "coupling portion" in the invention. The rear end part 43a(3) consisting of the right rear end part 43a(3)R and the left rear end part 43a(3)L corresponds to an example of "at least two connection portion" in the invention. Further, the intermediate connection pattern 43e corresponds to an example of "coil connection pattern" in the invention. The thin film coil 41, the wiring connection portion 41s and the intermediate connection pattern 43e correspond to an example of "thin film coil" in the invention.

In the case of forming the top pole tip 43a by the frame plating method, as similar to the case of forming the top pole tip 13a in the above first embodiment, for example, it is preferable that the exposure process on the photoresist film to form the photoresist pattern is performed by being divided into a plurality of times. The details of the method of forming such a photoresist pattern will be described hereinafter. As the forming material of the top pole tip 43a, the magnetic path connection portion 43b and the intermediate connection pattern 43e, in a manner similar to that of the top pole tip 13a and the like in the first embodiment, for example, a magnetic material having a high saturation magnetic flux density such as Permalloy (Ni: Fe=45 percent by weight: 55 percent by weight) or an amorphous alloy (cobalt iron alloy, cobalt iron nickel alloy, zirconium cobalt iron alloy oxide or the like) is used.

Figures 21A, 21B:
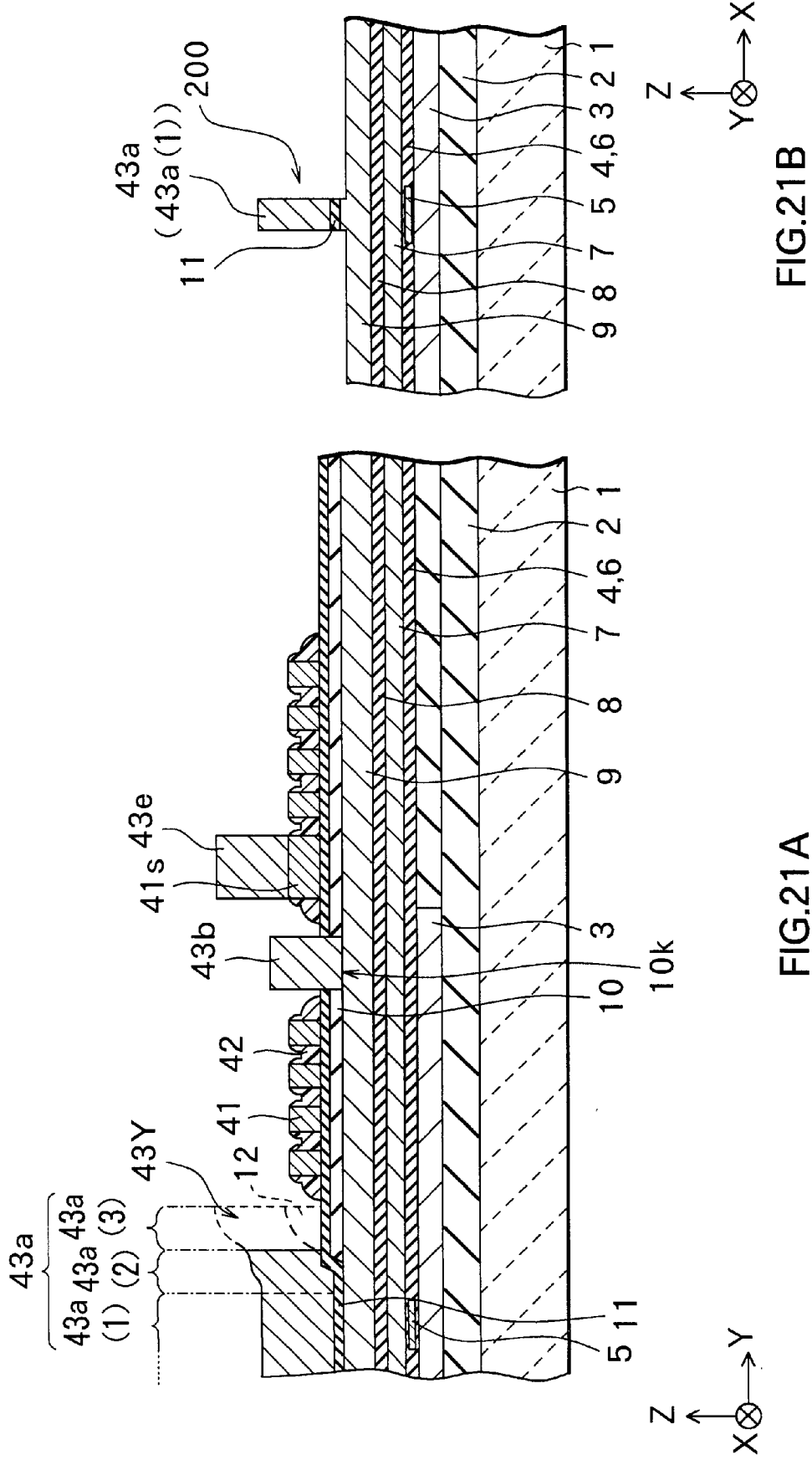
FIGS. 21A and 21B are cross sections for explaining a process subsequent to FIGS. 20A and 20B, respectively.

Subsequently, as shown in FIGS. 21A, 21B and 25, by using both of a photoresist film (not shown) selectively formed in the region rearward of the position of the front end of the insulating film 42 and the top pole tip 43a as a mask, the entire surface of the layer structure as mentioned above is etched by about 0.3 to 0.4 μm through the RIE similar to that in the case of forming the pole part 100 in the first embodiment. By the etching process, part of each of the write gap layer 11 and the bottom pole 9 in the region forward of the position of the front end of the non-magnetic layer pattern 10 is selectively removed and etched. When performing the above etching process, by adjusting the etching conditions, part of the non-magnetic layer pattern 12 except for the disposing region of the top pole tip 43a is selectively removed. As a matter of course, part of the non-magnetic layer pattern 12 in the region 43Y is removed. By the etching process, a pole part 200 having the trim structure is formed.

Figures 22A, 22B:
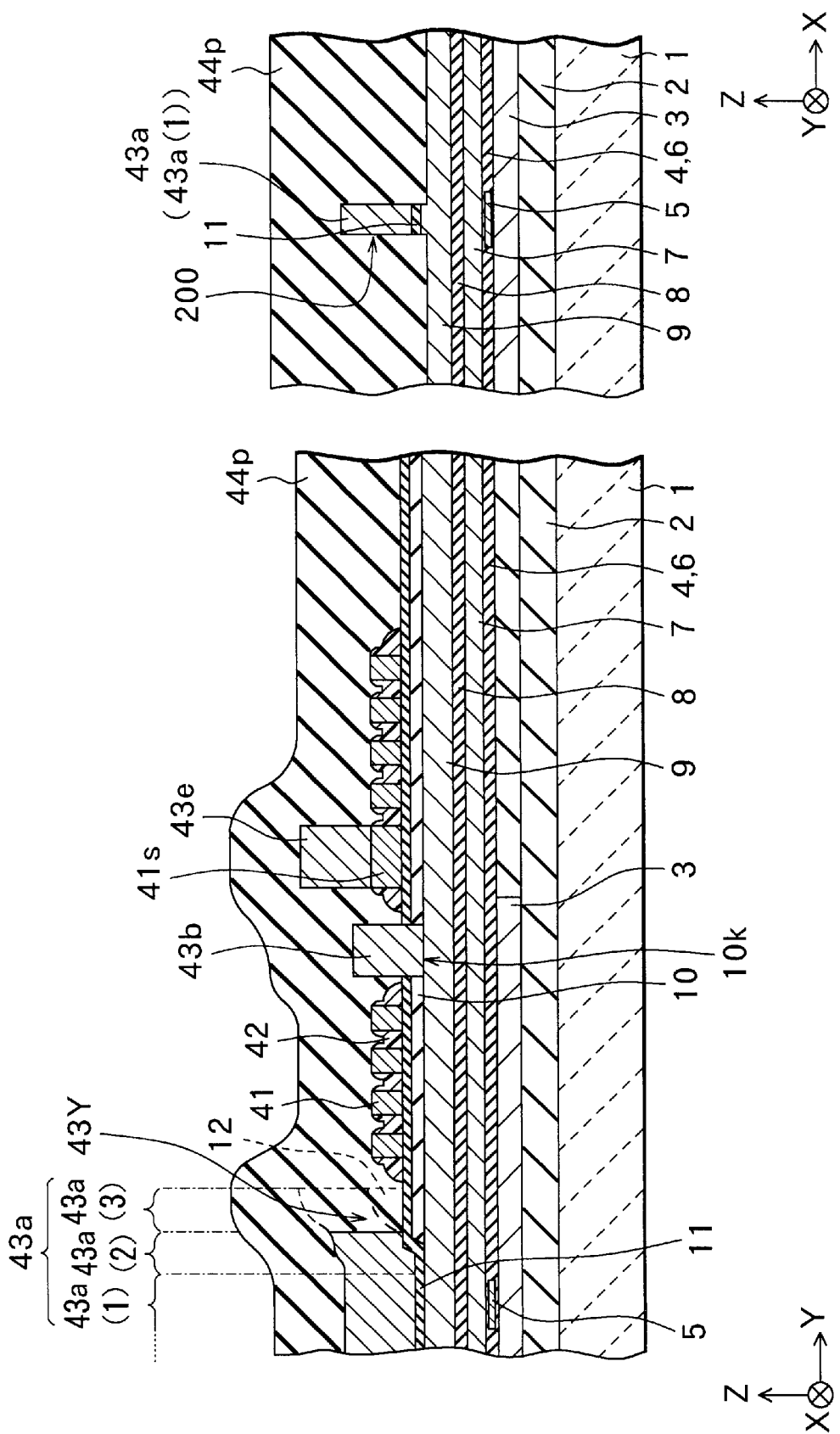
FIGS. 22A and 22B are cross sections for explaining a process subsequent to FIGS. 21A and 21B, respectively.

Subsequently, as shown in FIGS. 22A and 22B, for example, an alumina layer 44p is deposited in a thickness of about 3.0 to 4.0 μm so as to cover the entire surface of the layer structure as mentioned above by sputtering or the like, thereby embedding the uneven region constituted by the top pole tip 43a, the magnetic path connection portion 43b, the intermediate connection pattern 43e, the thin film coil 41 and the like. The insulating layer 42 and the alumina layer 44p correspond to an example of "coil embedding layer" in the invention.

Subsequently, by polishing the entire surface of the alumina layer 44p by, for example, the CMP so as to planarize the surface, as shown in FIGS. 23A and 23B, an insulating film 44 which embeds the thin film coil 41 and the like is formed. The polishing process at this time is performed at least until the top pole tip 43a, the magnetic path connection portion 43b and the intermediate connection pattern 43e are exposed. In the region 43Y, part (44H) of the insulating film 44 is buried. A group of the insulating films 42 and 44 corresponds to an example of "insulating layer" in the invention, and the part (44H) of the insulating film 44 filling the region 44Y corresponds to an example of "third non-magnetic layer pattern" in the invention.

Subsequently, as shown in FIGS. 23A and 23B, a top yoke 43f which will constitute part of the top pole 43 is selectively formed in a thickness of about 2.0 to 3.0 μm on the region from the magnetic path connection portion 43b to the rear end part 43a(3) of the top pole tip 43a. The top yoke 43f has, for example, the structural characteristic similar to that of the top yoke 13f in the first embodiment. In the case of forming the top yoke 43f, simultaneously, the coil connection wiring 43fh is selectively formed on the region from the intermediate connection pattern 43e to an external circuit (not shown). The material, the method and the like of forming the top yoke 43f and the coil connection wiring 43fh are similar to those in the case of forming the top yoke 13f and the coil connection wiring 13fh in the first embodiment. The top yoke 43f is formed so that, for example, the position of the front end coincides with the position of the end edge of the intermediate part 43a(2) constructing the region 43Y in the top pole tip 43a and the surface of the end edge on the front side is inclined with respect to the plane surface of the underlayer. The stereoscopic structure on the periphery of the top yoke 43f at this time is as shown in FIG. 26. The top yoke 43f corresponds to an example of "second magnetic layer portion" in the invention, and the top pole 43 consisting of the top pole tip 43a, the magnetic path connection portion 43b, and the top yoke 43f corresponds to an example of "first magnetic layer" in the invention.

Subsequently, as shown in FIGS. 23A and 23B, an overcoat layer 45 made of alumina or the like is formed by, for example, sputtering so as to cover the whole surface of the layer structure as mentioned above. After that, the air bearing surface 90 is formed by machining and polishing, and thereby a thin film magnetic head according to the embodiment is completed.

FIG. 27 is a plan view schematically showing the structure in plane of the thin film magnetic head manufactured by the method of manufacturing the thin film magnetic head according to the embodiment. In FIG. 27, the same components as those shown in FIG. 17 of the first embodiment are designated by the same reference numerals. In FIG. 27, the insulating films 42 and 44, the overcoat layer 45 and the like are omitted. With respect to the thin film coil 41, only the outermost peripheral part is shown. FIG. 23A corresponds to a cross section taken along the line XXIIIA—XXIIIA in FIG. 27.

As shown in FIG. 27, for example, the top pole 43 is constituted by the top pole tip 43a, the magnetic path connection portion 43b and the top yoke 43f which are separately formed. The top yoke 43f has a plane shape similar to that of the top yoke 13f (refer to FIG. 17) in the first embodiment, and includes a yoke part 43f(1) and a connection portion 43f(2) corresponding, respectively, to the yoke part 13f(1) and the connection portion 13f(2) that constitute the top yoke 13f. The position of the front edge face 43ft of the top yoke 43f almost coincides with, for example, the position of the end edge of the intermediate part 43a(2) constructing the region 43Y in the top pole tip 43a.

The top pole tip 43a includes, in accordance with the order from the air bearing surface 90 side, a front end part 43a(1), an intermediate part 43a(2) and a rear end part 43a(3). The centers in the width direction of these parts coincide with each other. The front end part 43a(1) has an almost uniform width in the length direction, corresponding to the front end part 13a(1) of the top pole tip 13a in the first embodiment. The intermediate part 43a(2) includes, for instance, a front part wider than the front end part 43a(1) and a rear part wider than the front part. The rear end part 43a(3) includes, for example, two parts disposed so as to be separate in the width direction, that is, the right rear end part 43a(3)R and the left rear end part 43a(3)L. The right rear end part 43a(3)R and the left rear end part 43a(3)L are, for example, disposed symmetrically with respect to the center line A of the front end part 43a(1) and the intermediate part 43a(2). Their shapes are symmetrical with respect to the center line A as a reference. The width of the rear end part 43a(3) specified by the right rear end part 43a(3)R and the left rear end part 43a(3)L almost coincides with, for example, the width of the rear part of the intermediate part 43a(2).

As shown in FIGS. 23, 26 and 27, the front end part 43a(1) in the top pole tip 43a extends on the flat lower region of the write gap layer 11; the intermediate part 43a(2) extends from the lower region to the upper region of the write gap layer 11; and the rear end part 43a(3) extends on the inclined surface of the non-magnetic layer pattern 12. The non-magnetic layer pattern 12 is, for example, disposed in the region under the rear end part 43a(3), that is, the right rear end part 43a(3)R and the left rear end part 43a(3)L in the top pole tip 43a.

As shown in FIGS. 23A, 23B and 27, the top yoke 43f is magnetically coupled to the bottom pole 9 sandwiching the magnetic path connection portion 43b in the opening 10k. As shown in FIGS. 23A, 23B, 26 and 27, the top yoke 43f is also partially overlapped with and magnetically coupled to part (the rear end part 43a(3)) of the top pole tip 43a. That is, by connecting the top pole 43 (the top pole tip 43a, the magnetic path connection portion 43b and the top yoke 43f) and the bottom pole 9, a magnetic path is formed.

As shown in FIG. 27, the thin film coil 41 and the wiring connection portion 41s have the structural characteristics similar to, for example, those of the thin film coil 15 and the coil connection portion 15s in the first embodiment. The thin film coil 41 is electrically connected to the coil connection wiring 43fh sandwiching the intermediate connection pattern 43e. A terminal 41x provided at the outer terminating end of the thin film coil 41 and part (not shown) of the rear side of the coil connection wiring 43fh are connected to an external circuit (not shown). Via the external circuit, current can be passed through the thin film coil 41.

The structural characteristics of the other disposed members shown in FIG. 27 are similar to those in the case of the first embodiment (FIG. 17).

In the present embodiment, part of each of the non-magnetic layer patterns 10 and 12 is disposed in a region between the top pole tip 43a and the bottom pole 9, especially, in a region 43S corresponding to the magnetic coupling face 43R with which the rear end part 43a(3) of the top pole tip 43a and the top yoke 43f are overlapped and in contact. As a result, by the action similar to that in the case of the first embodiment, the propagation of the magnetic flux between the rear end part 43a(3) of the top pole tip 43a and the bottom pole 9 can be suppressed.

Moreover, in the embodiment, part (44H) of the insulating film 44 which embeds the thin film coil 41 and the like is buried in a region 43Y as part of the region 43S. The part (44H) of the insulating film 44 buried in the region 43Y plays a role of suppressing the leakage of the magnetic flux in the region 43S in a manner similar to the non-magnetic layer pattern 12 and the like. By disposing the non-magnetic layer patterns 10 and 12 and by burying the part (44H) of the insulating film 44 in the region 43Y, the leakage of the magnetic flux in the region 43Y can be more certainly suppressed through the action as follows. That is, the tendency of the leakage of the magnetic flux in the region 43S is conspicuous, especially, in the center region (region including the region 43Y), because the magnetic flux flows with a concentration to the center region of the region 43S in the magnetic flux propagation process from the top yoke 43f to the top pole tip 43a. Consequently, by burying the part (44H) of the insulating film 44 into the region 43Y, the concentration of the magnetic flux onto the center region can be suppressed. Therefore, in the embodiment, the overwrite characteristic superior to that in the case of the first embodiment can be assured.

Moreover, in the embodiment, the rear end part 43a(3) of the top pole tip 43a is constituted by the two parts (the right rear end part 43a(3)R and the left rear end part 43a(3)L) disposed so as to be separated from each other in the width direction. The overwrite characteristic can be therefore improved by the action as described hereinbelow. Specifically, the magnetic flux generated by the thin film coil 41 at the time of an information recording operation propagates through the top yoke 43f, so as to almost evenly flows into the rear end part 43a(3)R and the rear end part 43a(3)L of the top pole tip 43a. And then, the magnetic flux flowed into both of the parts propagates through the intermediate part 43a(2) and is merged together in the intermediate part 43a(2). The resultant flux further propagates through the front end part 43a(1). By constructing such a propagation path of the magnetic flux, especially, a magnetic flux saturating phenomenon which occurs when the magnetic flux flows from a region (the rear end part 43a(3)) of a large magnetic volume to a region (the intermediate part 43a(2)) of a small magnetic volume can be suppressed. Consequently, the propagation loss of the magnetic flux in the top pole tip 43a can be reduced, and the magnetic flux of a necessary and sufficient volume can be supplied to the front end part 43a(1) of the top pole tip 43a.

Furthermore, in the embodiment, the intermediate connection pattern 43e is formed on the wiring connection portion 41s provided at the end of the thin film coil 41 by the same process as forming the top pole tip 43a. Consequently, by the action similar to that in the case of forming the intermediate connection pattern 13e (refer to FIGS. 7A and 8A) in the first embodiment, the process of connecting the thin film coil 41 and the coil connection wiring 43fh is simplified. Thus, the number of manufacturing steps can be reduced.

Furthermore, since the front edge face of the top yoke 43f is inclined with respect to the flat surface of the underlayer in the embodiment, the flow of the magnetic flux from the top yoke 43f into the top pole tip 43a can be smoothed.

Referring now to FIGS. 28A to 29B, the method of forming the top pole tip 43a in the embodiment will be described. In the following, with respect to details similar to those of the first embodiment, the description will be omitted as appropriate.

In the method of manufacturing the thin film magnetic head according to the embodiment, as in the case of the first embodiment, for example, by performing the exposing process twice on one and the same photoresist film with two kinds of photo masks that are different from each other, the photoresist pattern which is used for forming the top pole tip 43a is formed. By using such a technique, the top pole tip 43a can be formed with accuracy almost as high as that in the case of forming the top pole tip 13a in the first embodiment.

Figures 28A, 28B:
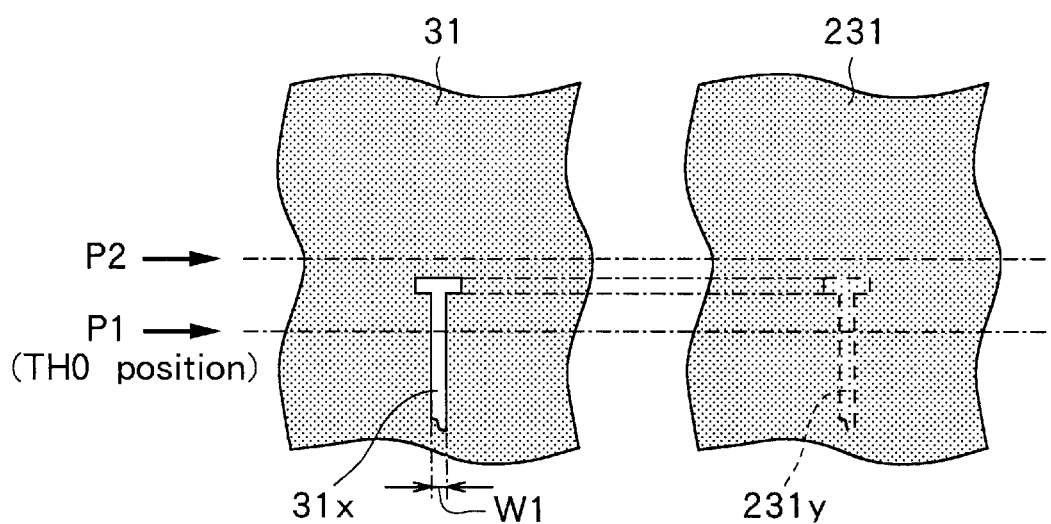
FIGS. 28A to 28D are plan views for explaining processes of forming a top pole tip in the method of manufacturing the thin film magnetic head according to the second embodiment of the invention.
Figures 28C, 28D:
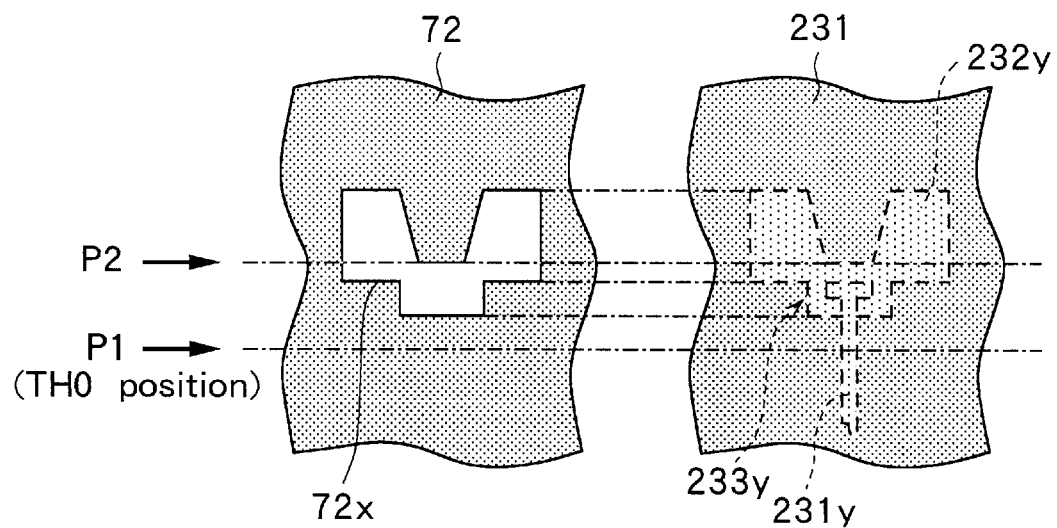
Figure 30:
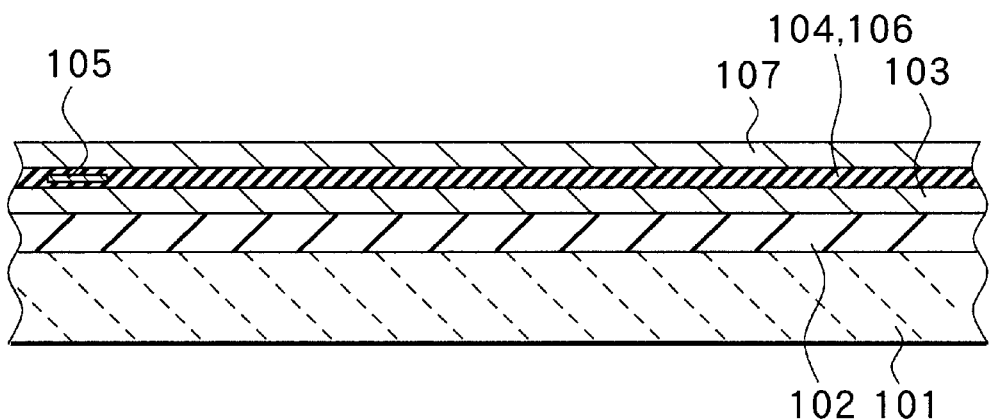
FIG. 30 is a cross section for explaining a process in a method of manufacturing a thin film magnetic head of the related art.
Figure 31:
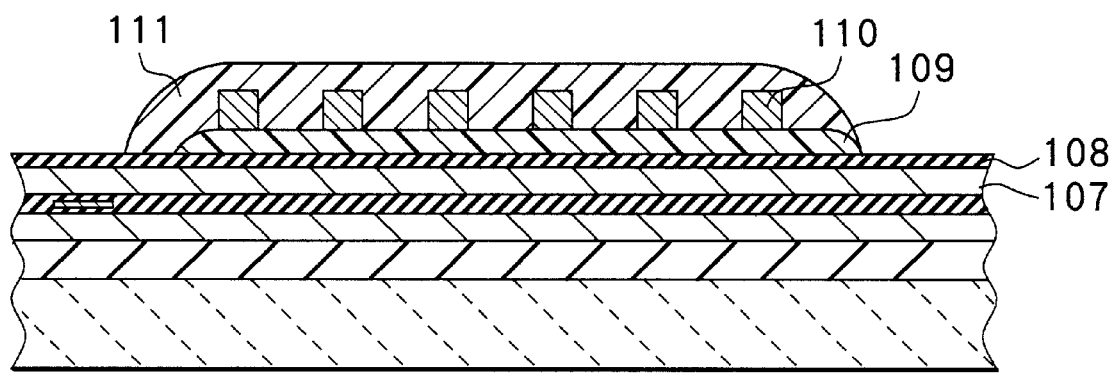
FIG. 31 is a cross section for explaining a process subsequent to FIG. 30.

FIG. 28A shows the shape in plane of the first photo mask 31 used in the first exposing process, and FIG. 28B shows a shape in plane of a region (an first exposure region 231 y) of a photoresist film 231 exposed by the first exposing process. FIG. 28C shows a shape in plane of a second photo mask 72 used in the second exposing process, and FIG. 28D shows a shape in plane of a region (an second exposure region 232y) of a photoresist film 231 exposed by the second exposing process. FIG. 29A shows a shape in plane of a photoresist pattern 233 obtained by developing the whole exposure region (synthetic exposure region 233y) in the photoresist film 231 shown in FIG. 28D, and FIG. 29B shows a shape in plane of the top pole tip 43a formed by using the photoresist pattern 233.

In the first exposing process, almost as in the case of the first embodiment, the first photo mask 31 is disposed at a predetermined position on the photoresist film 231, so that a predetermined region of the photoresist film 231 is selectively exposed through the opening 31x of the first photo mask 31. At the time of disposing the first photo mask 31 on the photoresist film 231, alignment is performed on the photoresist film 231 so that the rear end of the opening 31x is positioned on the front side with respect to the "position P2". By the first exposing process, the first exposure region 231y is formed in the photoresist film 231 (refer to FIG. 28B). The first exposure region 231y corresponds to an example of "first region" in the invention.

The second photo mask 72 shown in FIG. 28C has an opening 72x of a shape corresponding to the shape in plane of the intermediate part 43a(2) and the rear end part 43a(3) in the top pole tip 43a (refer to FIG. 27). As shown in FIG. 28D, in the second exposing process, the second photo mask 72 is disposed at a predetermined position on the photoresist film 231 so that part of the opening 72x of the second photo mask 72 and part of the first exposure region 231y formed on the photoresist film 231 partially overlap with each other. After that, a predetermined region on the photoresist film 231 is selectively exposed through the opening 72x of the second photo mask 72. By the second exposing process, the second exposure region 232y is formed on the photoresist film 231, and the synthetic exposure region 233y where part of the first exposure region 231y and part of the second exposure region 232y partially overlap with each other is thereby formed. The plane shape of the synthetic exposure region 233y corresponds to the plane shape of the top pole tip 43a. The second exposure region 232y corresponds to an example of "second region" in the invention.

Finally, by developing the synthetic exposure region 233y of the photoresist film 231 in a lump, the photoresist pattern 233 having the opening 233z as shown in FIG. 29A is formed. The plane shape of the opening 233z corresponds to the plane shape of the top pole tip 43a, and approximately reflects the plane shape of the synthetic exposure region 233y shown in FIG. 28D.

By performing the frame plating with the photoresist pattern 233 formed through such a series of processes, by an action similar to that in the case of the first embodiment, especially, the top pole tip 43a can be formed so that the front end part 43a(1) has a ultra-minute uniform width throughout the entire area.

Since the action, effects, modification and the like except for the above-described with respect to the method of manufacturing the thin film magnetic head according to the embodiment are similar to those in the case of the first embodiment, their description is omitted.

With respect to the invention described by giving some embodiments, although the top pole tip having the shape shown in each of FIGS. 17 and 27 has been described above in the first and second embodiments, the shape of the top pole tip is not necessarily limited to the above. For example, the shape of the top pole tip, that is, the number, the shape, the dimensions and the like of the members constructing the top pole tip can be freely changed as far as the propagation of the magnetic flux that flows inside thereof is not interfered. However, in order to suppress the leakage of the magnetic flux from the top pole tip to the bottom pole, for example, it is preferable that the rear end part 43a(3) is constructed of two parts (the right rear end part 43a(3)R and the left rear end part 43a(3)L) which are separated from each other in the width direction, and the part (44H) of the insulating film 44 is buried in the region (the region 43Y) between the two parts, like the top pole tip 43a shown in FIG. 27. Of course, the rear end part 43a(3) is not always constructed of two parts, but may be, for example, constructed of three or more parts. In such a case, the effects similar to those in the case of the second embodiment can be obtained.

Furthermore, for example, although the method of manufacturing the composite thin film magnetic head has been described in each of the embodiments and its modification, the invention can be also applied to a recording-only thin film magnetic head having an inductive magnetic transducer for writing and a thin film magnetic head having an inductive magnetic transducer for recording and reproducing. Furthermore, the invention can be also applied to a thin film magnetic head of a structure in which an element for writing and an element for reading are stacked in the opposite order.

As described above, according to the thin film magnetic head or the method of manufacturing the thin film magnetic head of the invention, between the first magnetic layer portion in the first magnetic layer and the second magnetic layer, there are provided the first non-magnetic layer pattern extending so that the rear part is connected to the insulating layer and the front end terminates in a predetermined position recessed from the recording-medium-facing surface, and the second non-magnetic layer pattern extending so that the rear end is connected to the insulating layer and the front end terminates in a position rearward of the front end of the first non-magnetic layer pattern, in the order from a side close to the second magnetic layer. Consequently, due to the existence of the first non-magnetic layer pattern and the second non-magnetic layer pattern, the leakage of the magnetic flux from the first magnetic layer to the second magnetic layer is suppressed, so that the flow of the magnetic flux in the first magnetic layer portion is smoothed. As a result, an effect such that the excellent overwrite characteristic can be assured is achieved.

Especially, in the case where a surface of the vicinity of the front end of the first non-magnetic layer pattern and a surface of the vicinity of the front end of the second non-magnetic layer pattern are inclined with respect to the flat surface of the gap layer, an effect such that the flow of the magnetic flux in the first magnetic layer portion can be more smoothed is achieved.

Moreover, in the case where there is further provided the third non-magnetic layer pattern that is connected to the insulating layer in a region surrounded by the connection portion in the first magnetic layer portion and at least the two coupling portions, due to the existence of the third non-magnetic layer pattern, an effect such that the leakage of the magnetic flux from the first magnetic layer portion to the second magnetic layer can be more certainly suppressed is achieved. In this point, the invention also contributes to the assurance of the excellent overwrite characteristic.

Moreover, in the case where a material including one of nickel iron alloy, iron nitride and amorphous alloy (cobalt iron alloy, cobalt iron nickel alloy and zirconium cobalt iron alloy oxide) is used as a material of forming at least one of the first magnetic layer and the second magnetic layer, an effect such that the flow of the magnetic flux in at least one part of the first magnetic layer and the second magnetic layer can be more smoothed is achieved.

Moreover, in the case where a step of forming the photoresist pattern for forming the first magnetic layer portion includes: a step of forming the photoresist layer so as to cover at least all of the flat surface of the gap layer, the inclined surface of the first non-magnetic layer pattern and the inclined surface of the second non-magnetic layer pattern; a first exposing step of selectively exposing a first region in the photoresist layer of a region extending from the flat surface of the gap layer to the inclined surface of the first non-magnetic layer pattern, the first region including a region corresponding to the planar shape of the uniform width portion of the first magnetic layer portion; a second exposing step of selectively exposing a second region, in the photoresist layer of a region extending from the flat surface of the gap layer to the inclined surface of the second non-magnetic layer pattern, the second region corresponding to the planar shape of a part other than the uniform width portion of the first magnetic layer portion; and a step of forming a photoresist pattern by developing, in a lump, both of the first region and the second region in the photoresist layer, an effect such that the photoresist pattern can be formed with high precision on the underlayer including the flat portion and the inclined portion is achieved.

Moreover, in the case where the first region and the second region are partially overlapped with each other in the second exposing step, even if an influence by the light reflected from the underlayer is exerted in the photolithography step, an effect such that the first magnetic layer portion can be formed almost in a designed shape is achieved.

Moreover, in the case where the steps of: forming the third magnetic layer portion and a coil connection pattern simultaneously with the step of forming the first magnetic layer portion, the coil connection pattern being part of the thin film coil and being located at the end of the thin film coil; forming a coil embedding layer as a preparatory layer of the insulating layer so as to cover at least all of the first magnetic layer portion, the third magnetic layer portion and the coil connection pattern; planarizing a surface of the coil embedding layer by polishing until at least all of the first magnetic layer portion, the third magnetic layer portion and the coil connection pattern are exposed; and forming the second magnetic layer portion so as to be in magnetic contact with exposed faces of each of the first magnetic layer portion and the third magnetic layer portion on the surface planarized by the polishing and, simultaneously, forming a conductive layer pattern so as to be in electrical contact with an exposed face of the coil connection pattern are included, different from the case where the coil connection pattern is not formed on the coil end, the step of forming an opening by removing a part of the coil embedding layer so as to electrically connect the coil end and the conductive layer pattern is unnecessary. Thus, an effect such that the number of manufacturing steps can be reduced is achieved.

Obviously many modifications and variations of the present invention are possible in the light of the above teachings. It is therefore to be understood that within the scope of the appended claims the invention may be practiced otherwise than as specifically described.

What is claimed is:

1. A thin film magnetic head comprising:
    a first magnetic layer and a second magnetic layer magnetically coupled to each other and having two magnetic poles which face each other with a gap layer having a flat surface in between near and in a recording-medium-facing surface to be faced with a recording medium, the first magnetic layer including a first magnetic layer portion having a uniform width portion which extends from the recording-medium-facing surface in a direction so as to be apart from the recording-medium-facing surface and which defines a recording track width of the recording medium; and
    a thin film coil provided between the first magnetic layer and the second magnetic layer with an insulating layer in between,
    wherein
        a first non-magnetic layer pattern and a second non-magnetic layer pattern are disposed between the first magnetic layer portion of the first magnetic layer and the second magnetic layer in order from the second magnetic layer, the first non-magnetic layer pattern extending in a manner that a rear part thereof is connected to the insulating layer and a front end thereof terminates at a predetermined position recessed from the recording-medium-facing surface; and
        the second non-magnetic layer pattern extending in a manner that a rear end thereof is connected to the insulating layer and a front end thereof terminates at a position rearward of the front end of the first non-magnetic layer pattern.

2. A thin film magnetic head according to claim 1, wherein the front end of the first non-magnetic layer pattern is positioned rearward of the uniform width portion of the first magnetic layer portion.

3. A thin film magnetic head according to claim 1, wherein a surface of the vicinity of the front end of the first non-magnetic layer pattern and a surface of the vicinity of the front end of the second non-magnetic layer pattern are inclined with respect to a flat surface of the gap layer.

4. A thin film magnetic head according to claim 2, wherein a surface of the vicinity of the front end of the first non-magnetic layer pattern and a surface of the vicinity of the front end of the second non-magnetic layer pattern are inclined with respect to a flat surface of the gap layer.

5. A thin film magnetic head according to claim 1, wherein at least the uniform width portion in the first magnetic layer portion extends on a flat surface of the gap layer.

6. A thin film magnetic head according to claim 4, wherein at least the uniform width portion in the first magnetic layer portion extends on a flat surface of the gap layer.

7. A thin film magnetic head according to claim 1, wherein the first magnetic layer portion further comprises:
    at least two connection portions disposed so as to be separated from each other in a track width direction; and
    a coupling portion for magnetically coupling the uniform width portion to at least the two connection portions.

8. A thin film magnetic head according to claim 7, wherein a third non-magnetic layer pattern connected to the insulating layer is disposed in a region surrounded by the coupling portion and at least the two connection portions in the first magnetic layer portion.

9. A thin film magnetic head according to claim 6, wherein the first magnetic layer portion further comprises:
    at least two connection portions disposed so as to be separated from each other in a track width direction; and
    a coupling portion for magnetically coupling the uniform width portion to at least the two connection portions.

10. A thin film magnetic head according to claim 9, wherein a third non-magnetic layer pattern connected to the insulating layer is disposed in the region surrounded by the coupling portion and at least the two connection portions in the first magnetic layer portion.

11. A thin film magnetic head according to claim 1, wherein the first magnetic layer further includes:
    a second magnetic layer portion which is magnetically coupled to the first magnetic layer portion so as to be partially overlapped with each other; and
    a third magnetic layer portion for magnetically coupling the second magnetic layer portion and the second magnetic layer.

12. A thin film magnetic head according to claim 10, wherein the first magnetic layer further includes:
    a second magnetic layer portion which is magnetically coupled to the first magnetic layer portion so as to be partially overlapped with each other; and
    a third magnetic layer portion for magnetically coupling the second magnetic layer portion and the second magnetic layer.

13. A thin film magnetic head according to claim 1, wherein at least one part of both of the first magnetic layer and the second magnetic layer is made of a material containing either a nickel iron alloy or an iron nitride.

14. A thin film magnetic head according to claim 1, wherein at least one part of both of the first magnetic layer and the second magnetic layer is made of a material containing an amorphous alloy.

15. A thin film magnetic head according to claim 14, wherein the amorphous alloy is one of a group consisting of a cobalt iron alloy, a cobalt iron nickel alloy and a zirconium cobalt iron alloy oxide.

16. A thin film magnetic head according to claim 12, wherein at least one part of both of the first magnetic layer and the second magnetic layer is made of a material containing either the nickel iron alloy or the iron nitride.

17. A thin film magnetic head according to claim 12, wherein at least one part of both of the first magnetic layer and the second magnetic layer is made of a material containing the amorphous alloy.

18. A thin film magnetic head according to claim 17, wherein the amorphous alloy is one of a group consisting of a cobalt iron alloy, a cobalt iron nickel alloy and a zirconium cobalt iron alloy oxide.

19. A method of manufacturing a thin film magnetic head comprising:
    a first magnetic layer and a second magnetic layer magnetically coupled to each other and having two magnetic poles which face each other with a gap layer having a flat surface in between near and in a recording-medium-facing surface to be faced with a recording medium, the first magnetic layer including a first magnetic layer portion having a uniform width portion which extends from the recording-medium-facing surface in a length direction so as to be apart from the recording-medium-facing surface and which defines a recording track width of the recording medium; and
    a thin film coil provided between the first magnetic layer and the second magnetic layer with an insulating layer in between,
    wherein the method comprises:
        a step of selectively forming a first non-magnetic layer pattern so as to extend on the second magnetic layer so that a rear end thereof is connected to the insulating layer and a front end thereof terminates at a predetermined position recessed from the recording-medium-facing surface;
        a step of selectively forming a second non-magnetic layer pattern so as to extend on the first non-magnetic layer pattern so that a rear end thereof is connected to the insulating layer and a front end thereof terminates at a position rearward of the front end of the first non-magnetic layer pattern; and
        a step of forming the first magnetic layer portion so as to cover at least both of the first non-magnetic layer pattern and the second non-magnetic layer pattern.

20. A method of manufacturing a thin film magnetic head according to claim 19, wherein a step of forming a photoresist pattern in the step of forming the first magnetic layer portion includes:
    a step of forming a photoresist layer so as to cover at least all of the flat surface of the gap layer, an inclined surface of the first non-magnetic layer pattern and an inclined surface of the second non-magnetic layer pattern;
    a first exposing step of selectively exposing a first region in the photoresist layer of a region extending from the flat surface of the gap layer to the inclined surface of the first non-magnetic layer pattern, the first region including a region corresponding to a planer shape of the uniform width portion of the first magnetic layer portion;
    a second exposing step of selectively exposing a second region in the photoresist layer of a region extending from the flat surface of the gap layer to the inclined surface of the second non-magnetic layer pattern, the second region corresponding to a planer shape of a part other than the uniform width portion of the first magnetic layer portion; and a step of forming the photoresist pattern by developing, in a lump, both of the first region and the second region in the photoresist layer.

21. A method of manufacturing a thin film magnetic head according to claim 20, wherein, the second exposing step is performed so that the first region and the second region are partially overlapped with each other.

22. A method of manufacturing a thin film magnetic head according to claim 19, wherein, in the case where the first magnetic layer further includes: a second magnetic layer portion which is magnetically coupled to the first magnetic layer portion so as to be partially overlapped with each other; and a third magnetic layer portion for magnetically coupling the second magnetic layer portion to the second magnetic layer, the method comprises:

a step of forming the third magnetic layer portion and a coil connection pattern simultaneously with the step of forming the first magnetic layer portion, the coil connection pattern being part of the thin film coil and being located at the end of the thin film coil;

a step of forming a coil embedding layer as a preparatory layer of the insulating layer so as to cover at least all of the first magnetic layer portion, the third magnetic layer portion and the coil connection pattern;

a step of planarizing a surface of the coil embedding layer by polishing until at least all of the first magnetic layer portion, the third magnetic layer portion and the coil connection pattern are exposed; and a step of forming the second magnetic layer portion so as to be in magnetic contact with exposed faces of each of the first magnetic layer portion and the third magnetic layer portion and, simultaneously, forming a conductive layer pattern so as to be in electrical contact with an exposed face of the coil connection pattern on the surface planarized by the polishing.

23. A method of manufacturing a thin film magnetic head according to claim 21, wherein, in the case where the first magnetic layer further includes: the second magnetic layer portion which is magnetically coupled to the first magnetic layer portion so as to be partially overlapped with each other; and the third magnetic layer portion for magnetically coupling the second magnetic layer portion to the second magnetic layer, the method comprises:

a step of forming the third magnetic layer portion and the coil connection pattern simultaneously with the step of forming the first magnetic layer portion, the coil connection pattern being part of the thin film coil and being located at the end of the thin film coil;

a step of forming a coil embedding layer as a preparatory layer of the insulating layer so as to cover at least all of the first magnetic layer portion, the third magnetic layer portion and the coil connection pattern;

a step of planarizing a surface of the coil embedding layer by polishing until at least all of the first magnetic layer portion, the third magnetic layer portion and the coil connection pattern are exposed; and a step of forming the second magnetic layer portion so as to be in magnetic contact with exposed faces of each of the first magnetic layer portion and the third magnetic layer portion and, simultaneously, forming a conductive layer pattern so as to be in magnetic contact with an exposed face of the coil connection pattern on the surface planarized by the polishing.

24. A method of manufacturing a thin film magnetic head according to claim 19, wherein a material containing either nickel iron alloy or iron nitride is used as a material for forming at least one part of both of the first magnetic layer and the second magnetic layer.

25. A method of manufacturing a thin film magnetic head according to claim 19, wherein a material containing an amorphous alloy is used as a material for forming at least one part of both of the first magnetic layer and the second magnetic layer.

26. A method of manufacturing a thin film magnetic head according to claim 25, wherein one of a group consisting of cobalt iron alloy, cobalt iron nickel alloy and zirconium cobalt iron alloy oxide is used as the amorphous alloy.

27. A method of manufacturing a thin film magnetic head according to claim 23, wherein a material containing either nickel iron alloy or iron nitride is used as a material for forming at least one part of the first magnetic layer and the second magnetic layer.

28. A method of manufacturing a thin film magnetic head according to claim 23, wherein a material containing an amorphous alloy is used as a material for forming at least one part of both of the first magnetic layer and the second magnetic layer.

29. A method of manufacturing a thin film magnetic head according to claim 28, wherein one of a group consisting of cobalt iron alloy, cobalt iron nickel alloy and zirconium cobalt iron alloy oxide is used as the amorphous alloy.

* * * * *